(12) United States Patent
San et al.

(10) Patent No.: US 6,646,653 B2
(45) Date of Patent: *Nov. 11, 2003

(54) PROGRAMMABLE GRAPHICS PROCESSOR FOR USE IN A VIDEO GAME SYSTEM OR THE LIKE

(75) Inventors: Jeremy E. San, London (GB); Ben Cheese, Melbourn Royston (GB); Carl N. Graham, London (GB); Peter R. Warnes, London (GB)

(73) Assignee: A/N Inc., Redmond, WA (US)

( * ) Notice: Subject to any disclaimer, the term of this patent is extended or adjusted under 35 U.S.C. 154(b) by 88 days.

This patent is subject to a terminal disclaimer.

(21) Appl. No.: 09/725,561

(22) Filed: Nov. 30, 2000

(65) Prior Publication Data

US 2001/0040577 A1 Nov. 15, 2001

Related U.S. Application Data

(60) Continuation of application No. 08/920,871, filed on Aug. 29, 1997, now abandoned, which is a division of application No. 08/385,160, filed on Feb. 7, 1995, now Pat. No. 5,850,230, which is a division of application No. 07/827,098, filed on Jan. 30, 1992, now Pat. No. 5,388,841.

(51) Int. Cl.[7] .................................................. G09G 5/00
(52) U.S. Cl. ..................... 345/649; 345/418; 463/31; 463/32; 463/43
(58) Field of Search ................................ 345/649, 653, 345/418, 530; 463/31, 32, 43

(56) References Cited

U.S. PATENT DOCUMENTS

| | | | |
|---|---|---|---|
| 4,053,740 A | 10/1977 | Rosenthal | |
| 4,127,849 A | 11/1978 | Okor | |
| 4,179,124 A | 12/1979 | Margolin | |

(List continued on next page.)

FOREIGN PATENT DOCUMENTS

| | | |
|---|---|---|
| AU | 654727 | 8/1993 |
| AU | 657147 | 8/1993 |

(List continued on next page.)

OTHER PUBLICATIONS

Motorola, MC68030 Enhanced 32–bit Microprocessor User's Manual, Second Edition, Prentice–Hall, 1989.
NEC Super Computer SX–3 Series, Description of the System Version 2, NEC, May 31, 1991, p. 217 (Figs. 7–4).

*Primary Examiner*—Jeffery Brier
*Assistant Examiner*—Faranak Fouladi
(74) *Attorney, Agent, or Firm*—Nixon & Vanderhye, P.C.

(57) ABSTRACT

A fully programmable, graphics microprocessor is disclosed which is designed to be embodied in a removable external memory unit for connection with a host information processing system. In an exemplary embodiment, a video game system is described including a host video game system and a pluggable video game cartridge housing the graphics microprocessor. The game cartridge also includes a read-only program memory (ROM) and a random-access memory (RAM). The graphics coprocessor operates in conjunction with a three bus architecture embodied on the game cartridge. The graphics processor using this bus architecture may execute programs from either the program ROM, external RAM or its own internal cache RAM. The fully user programmable graphics coprocessor has an instruction set which is designed to efficiently implement arithmetic operations associated with 3-D graphics and, for example, includes special instructions executed by dedicated hardware for plotting individual pixels in the host video game system's character mapped display which, from the programmer's point of view, creates a "virtual" bit map by permitting the addressing of individual pixels—even though the host system is character based. The graphics coprocessor interacts with the host coprocessor such that the graphics coprocessor's 16 general registers are accessible to the host processor at all times.

11 Claims, 23 Drawing Sheets

U.S. PATENT DOCUMENTS

| | | |
|---|---|---|
| 4,296,476 A | 10/1981 | Mayer et al. |
| 4,386,773 A | 6/1983 | Bronstein |
| 4,388,620 A | 6/1983 | Sherman |
| 4,425,559 A | 1/1984 | Sherman |
| 4,432,067 A | 2/1984 | Nielsen |
| 4,442,488 A | 4/1984 | Hall |
| 4,450,535 A | 5/1984 | de Pommery et al. |
| 4,462,076 A | 7/1984 | Smith, III |
| 4,471,216 A | 9/1984 | Herve |
| 4,471,465 A | 9/1984 | Mayer et al. |
| 4,492,582 A | 1/1985 | Chang et al. |
| 4,523,297 A | 6/1985 | Ugon et al. |
| 4,644,495 A | 2/1987 | Crane |
| 4,658,247 A | 4/1987 | Gharachorloo |
| 4,725,831 A | 2/1988 | Coleman |
| 4,757,468 A | 7/1988 | Domenik et al. |
| 4,757,469 A | 7/1988 | Domenik et al. |
| 4,799,635 A | 1/1989 | Nakagawa |
| 4,824,106 A | 4/1989 | Ueda et al. |
| 4,829,295 A | 5/1989 | Hiroyuki |
| 4,862,156 A | 8/1989 | Westberg et al. |
| 4,862,392 A | 8/1989 | Steiner |
| 4,865,321 A | 9/1989 | Nakagawa |
| 4,866,637 A | 9/1989 | Gonzalez-Lopez et al. |
| 4,908,610 A | 3/1990 | Yamamuro et al. |
| 4,914,729 A | 4/1990 | Omori et al. |
| 5,004,232 A | 4/1991 | Wong et al. |
| 5,016,876 A | 5/1991 | Loffredo |
| 5,070,479 A | 12/1991 | Nakagawa |
| 5,136,664 A | 8/1992 | Bersack et al. |
| 5,170,468 A | 12/1992 | Shah et al. |
| 5,190,285 A | 3/1993 | Levy et al. |
| 5,208,904 A | 5/1993 | Sasaki |
| 5,214,753 A | 5/1993 | Lee et al. |
| 5,214,758 A | 5/1993 | Ohba et al. |
| 5,231,383 A | 7/1993 | Diepstraten et al. |
| 5,251,909 A | 10/1993 | Reed et al. |
| 5,317,714 A | 5/1994 | Nakagawa et al. |
| 5,357,604 A | 10/1994 | San et al. |
| 5,388,841 A | 2/1995 | San et al. |
| 5,392,385 A | 2/1995 | Evangelisti et al. |
| 5,457,775 A | 10/1995 | Johnson, Jr. et al. |
| 5,504,917 A | 4/1996 | Austin |
| 5,608,424 A | 3/1997 | Takahashi et al. |
| 5,724,497 A * | 3/1998 | San et al. .................. 345/469 |
| 5,774,133 A | 6/1998 | Neave et al. |
| 5,850,230 A * | 12/1998 | San et al. .................. 345/501 |
| 2002/0050999 A1 * | 5/2002 | San et al. .................. 345/530 |

FOREIGN PATENT DOCUMENTS

| | | |
|---|---|---|
| CN | 1076378 A | 9/1993 |
| CN | 1080200 A | 1/1994 |
| EP | 0114522 | 8/1984 |
| EP | 0 217 668 | 4/1987 |
| EP | 0 402 067 | 12/1990 |
| EP | 0 431 724 A2 | 6/1991 |
| GB | 2 215 948 | 9/1989 |
| GB | 2 215 952 | 9/1989 |
| JP | 60-52885 | 4/1985 |
| JP | 62-82987 | 4/1987 |
| JP | 62-221239 | 9/1987 |
| JP | 63-81558 | 4/1988 |
| JP | 63-163577 | 7/1988 |
| JP | 64-84295 | 3/1989 |
| JP | 2-15381 | 1/1990 |
| JP | 3-63085 | 3/1991 |
| JP | 03-94389 | 4/1991 |
| JP | 3-222197 | 10/1991 |
| JP | 03-222197 | 10/1991 |
| JP | 4-25962 | 1/1992 |
| KR | 270198 | 8/1993 |
| KR | 280939 | 8/1993 |
| TW | 214588 | 10/1993 |
| TW | 226448 | 7/1994 |
| WO | WO 90/13085 | 11/1990 |

* cited by examiner

FIG. 8A
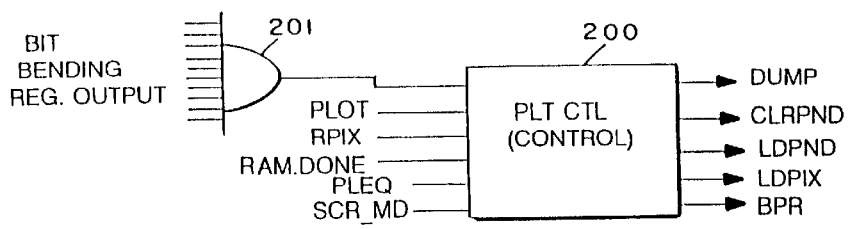
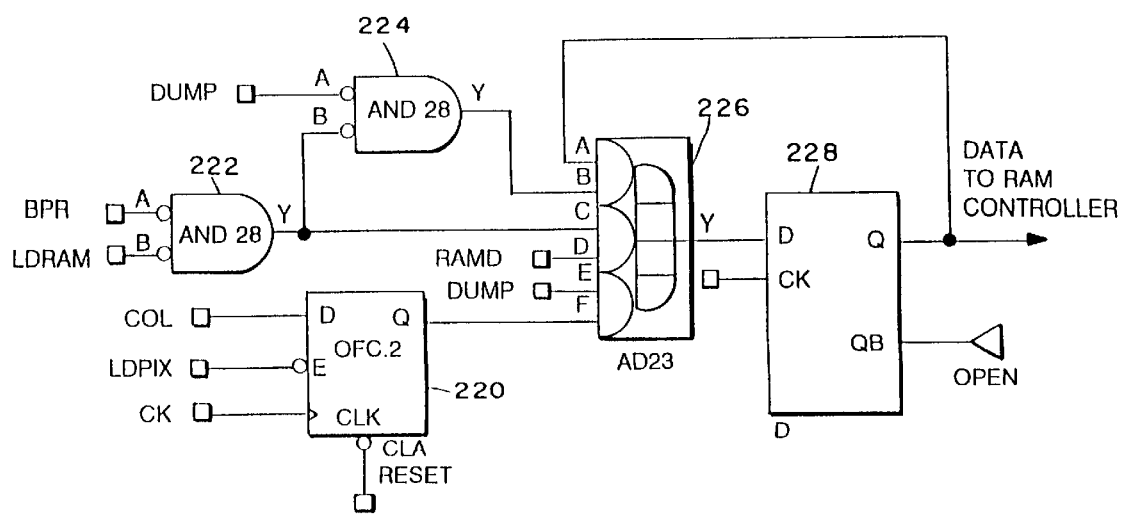
FIG. 8B

FIG. 12
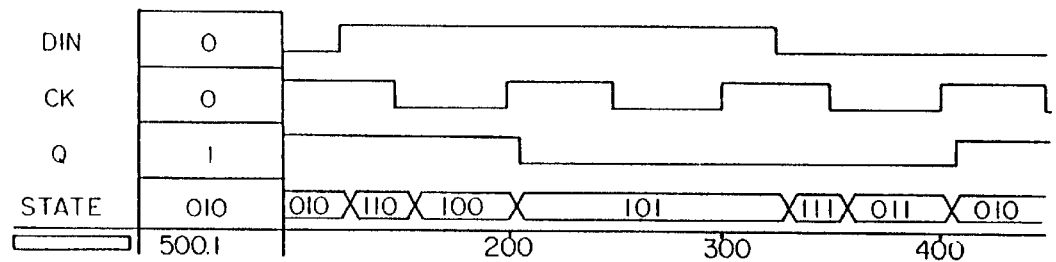
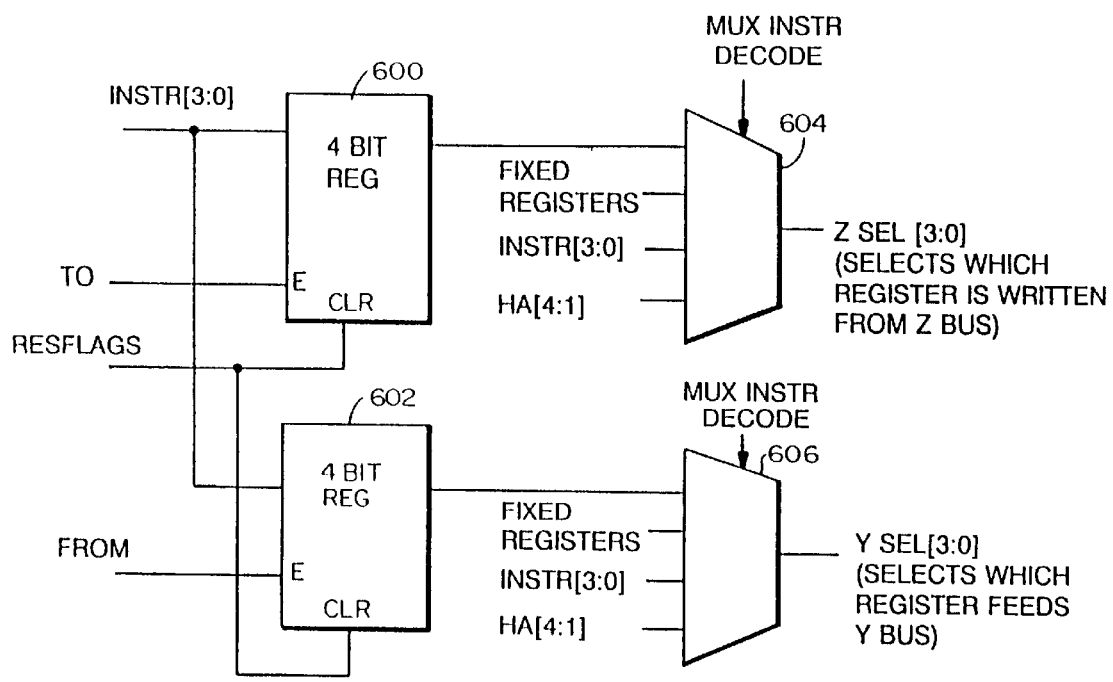
FIG. 16

PROGRAMMABLE GRAPHICS PROCESSOR FOR USE IN A VIDEO GAME SYSTEM OR THE LIKE

This is a continuation of application Ser. No. 08/920,871, filed Aug. 29, 1997, abandoned, the entire content of which is hereby incorporated by reference in this application, which in turn is a division of application Ser. No. 08/385,160, filed Feb. 7, 1995, U.S. Pat. No. 5,850,230, which in turn is a division of application Ser. No. 07/827,098, filed Jan. 30, 1992, U.S. Pat. No. 5,388,841.

CROSS REFERENCE TO RELATED APPLICATIONS

This application is related to the concurrently filed application Ser. No. 07/827,201 by San et al, entitled "Programmable Graphics Processor Having Pixel To Character Conversion Hardware For Use In A Video Game System Or The Like" and concurrently filed application Ser. No. 07/828,459, by San et al, entitled "Graphics Processor with Enhanced Memory Control Circuitry For Use In A Video Game System Or The Like".

FIELD OF THE INVENTION

The invention generally relates to an information processing apparatus including a unique, external memory unit having a programmable processor embodied therein. More particularly, the invention relates to a removable, external memory unit having a program memory storing a program to be executed in part by a host processing system, e.g., a video game system, and in part by a programmable microprocessor designed to enhance the high speed graphics processing capabilities of the host system.

BACKGROUND AND SUMMARY OF THE INVENTION

Prior art video game machines having an 8-bit microprocessor and an associated display processing subsystem embodied in a video game control deck typically generate graphics by prestoring characters in a game cartridge in the form of 8-bit by 8-bit matrices and by building a screen display using various programmable combinations of these prestored characters. Such prior art video game systems typically have the capability of moving the entire display background as well as a number of player-controlled "moving objects" or "sprites".

Such prior art systems do not have the capability of practically implementing video games which include moving objects made up of combinations of polygons which must be manipulated, e.g., rotated, and "redrawn" f or each frame. The prior art 8-bit processor and associated display processing circuitry in such systems are not capable, for example, of performing the calculations required to effectively rotate three-dimensional, polygon-based objects or to appropriately scale such rotating objects to generate 3-D type special effects. The present inventors have recognized that sophisticated graphics require updating the screen on a pixel-by-pixel basis and performing complex mathematics on a real time basis. Such prior art character based video game machines are not capable of performing such tasks.

The prior art 8-bit video game machines also can not effectively perform other graphics techniques which require rapidly updating the screen on a pixel-by-pixel basis. For example, such systems can not effectively map an object onto a displayed polygon which is part of yet another displayed object (hereinafter referred to as "texture mapping") in three-dimensional space.

In an effort to improve the graphics capabilities over prior art 8-bit machines, video game systems have been designed using more powerful 16-bit processors. Such 16-bit processors provide the video game system with a mechanism for performing the mathematics required for more sophisticated graphics. Such systems, for example, permit more sophisticated color generation and better graphics resolution. Such 16-bit video game machines are character-based systems which permit the implementation of a wide range of video games that can be pre-drawn into character-based or sprite graphics. Such 16-bit video game systems also permit the movement of multiple colored background planes at high speeds with moving objects disposed in back, or in front, of such planes.

However, such prior art 16-bit video game machines do not permit the practical implementation of advanced video games having 3-D type special effects which display sophisticated objects made up of polygons that must change during each frame. For example, games which require many fully rotating objects or sprites that must be enlarged and/or reduced on a frame-by-frame basis are not practically realizable in such prior art character-based 16-bit machines. The inventors have recognized that, in order to effectively implement such games involving fully rotating and scaled, polygon-based objects, it is necessary to draw the edges of polygons and fill in such polygon-based objects with appropriate data on a pixel-by-pixel basis. Such tasks, which must be done on a pixel-by-pixel basis, consume a great deal of processing time.

In the prior art, removable game cartridges have been modified to improve game sophistication by permitting existing processors to address a larger program memory address space than the existing number of address lines associated with the host microprocessor would otherwise permit. For example, such prior art 8-bit systems have utilized game cartridges including multi-memory controller chips which perform memory bank switching and other additional functions. Such memory bank switching related chips, however, are not capable of enabling the video game system to do high speed graphics processing of the nature described above.

The present invention addresses the above-described problems in the prior art by providing a unique, fully programmable, graphics microprocessor which is designed to be embodied in a removable external memory unit for connection with a host information processing system. In an exemplary embodiment described herein, the present invention is embodied in a video game system including a host video game system and a video game cartridge housing the graphics microprocessor.

The graphics microprocessor and the video game system described herein include many unique and advantageous features, some of which are summarized below.

In accordance with the present invention, a unique graphics processor is pluggably connected to a host microprocessor. In order to maximize processing speed, the graphics processor may operate in parallel with the host microprocessor. In one exemplary embodiment, the game cartridge in which the graphics coprocessor resides also includes a read-only memory (ROM) and a random-access memory (RAM).

The graphics coprocessor of the present invention arbitrates memory transactions between its own needs and data fetches from the host microprocessor. The processor is capable of executing programs simultaneously with the host microprocessor to permit high speed processing, heretofore not achievable in prior art video game systems.

The graphics coprocessor of the present invention operates in conjunction with a three bus architecture embodied on the game cartridge which permits effective utilization of the RAM and ROM cartridge memories by optimizing the ability of both the host and cartridge processors to efficiently use such memory devices.

The fully user programmable graphics coprocessor of the present invention includes a unique instruction set which is designed to permit high speed processing. The instruction set is designed to efficiently implement arithmetic operations associated with 3-D graphics and, for example, includes special instructions executed by dedicated hardware for plotting individual pixels in the host video game system's character mapped display.

Many of the instructions in the instruction set are capable of being executed in one machine cycle and are designed to be stored in one byte of program ROM. However, the instructions may be made more powerful through the use of special purpose, prefix instructions.

The instruction set includes unique pixel-based instructions which, from the programmer's point of view, create a "virtual" bit map by permitting the addressing of individual pixels—even though the host system is character based. The pixel data is converted on the fly by the graphics processor to character data of a format typically utilized by the host character based 16-bit machine. Thus, for example, although the programmer may use a unique "PLOT" instruction to plot a pixel, when related data is read to RAM, the data is converted to a character-based format which the 16 bit host machine is able to utilize. Special purpose pixel plotting hardware executes this instruction to efficiently permit high speed 3-D type graphics to be implemented.

The graphics coprocessor of the present invention also includes a unique "CACHE" instruction and a cache memory mechanism which permit program instructions stored in the program ROM to be executed at high speed by the graphics coprocessor from cache RAM. The CACHE instruction permits a programmer to automatically initiate the execution of program out of the graphics coprocessor internal cache RAM by delineating that part of the program which is to be executed at high speed.

The instruction set also includes special purpose instructions designed to aid in programming the graphic techniques required to implement video games having sophisticated 3-D type features. Such instructions include the above-described pixel PLOT instruction and a MERGE instruction, designed to permit merging of sprite data stored in different registers to more efficiently permit rotation of displayed objects or and texture mapping.

Special purpose instructions permit the buffering of data to permit parallel processing by the host microprocessor and the graphics coprocessor of the present invention. For example, a special purpose instruction is utilized for enhancing processing speeds, to compensate for the relatively slow access time ROMs utilized in game cartridges. In this regard, the graphics processor uses an instruction in which any reference to a predetermined general register (e.g., a register R14 in the exemplary embodiment) automatically initiates a data fetch from ROM. While such ROM accesses are taking place, other code may be executed. Some cycles later, the fetched data will be available. However, in the meantime, the processor did not have to wait for such data but rather was able to accomplish other tasks thereby allowing for very fast executing code to be written.

In order to efficiently handle subroutine linkage, the graphics coprocessor of the present invention also includes a LINK instruction which operates to load the address of the instruction to be executed after the subroutine has been completed into the program counter R15 at such time of completion.

The instruction set includes a RAM store-back instruction. In accordance with this instruction, after data is read from RAM and an operation is performed on such data, a RAM controller within the graphics coprocessor initiates an updated data store-back operation at the appropriate last used RAM address. This one cycle store back instruction may be advantageously used to efficiently update blocks of data.

The graphics coprocessor of the present invention also includes instructions which automatically permit the reading or writing from RAM using the least significant byte followed by the most significant byte. This mechanism serves as a programming aid in providing compatibility with data stored of either format without having to perform any data transposition.

The graphics processor of the present invention may be set to a number of different plotting modes by modifying an internal processor status register. Such modes include a dithering mode which enables the generation of programmable shading effects, where each alternate pixel contains a different color. Another selectable mode permits high and low nibble selection for colors to permit two sprites to be stored in memory in a space which would otherwise be taken up by one sprite.

The present invention includes many unique hardware features. For example, the graphics coprocessor includes special purpose plotting circuitry which includes enhanced pixel data buffering through the use of on-chip RAM. Such data buffering minimizes the amount of read or write transactions to the external data RAM and enhances the speed at which displayed polygons may be "filled" with appropriate data.

In addition to the read buffering feature which is initiated upon any access to register R14 as described above, the graphics coprocessor of the present invention also includes write buffering features in which data to be written to the game cartridge RAM is buffered to enable the central processing of the Mario chip to execute other instructions as rapidly as possible.

The graphics coprocessor of the present invention also includes sixteen registers, R0–R15, which are accessible to both the graphics processor and the host processing system. Register R0 is a default register which need not be expressly identified in an instruction and which serves as an accumulator. Register R15 serves as a program counter. Register R14 is the register referred to above which, if accessed, automatically initiates a data fetch from ROM. Special prefix instructions may be used to define the source and/or destination registers. The graphics coprocessor of the present invention interacts with the host coprocessor such that the graphics coprocessor's registers are accessible to the host processor.

A unique three bus architecture associated with the graphics coprocessor permits a high degree of parallelism. The 3 buses include the host processor bus, a ROM bus, and a RAM bus. These buses are physically separate and may be used simultaneously. Each bus includes address lines, data lines, and control lines. The host processor bus includes address lines, data lines, and control lines which supply a wide range of signals required within the graphics coprocessor. The graphics processor of the present invention using this bus architecture may execute programs from either the program ROM, external RAM or its own internal cache RAM.

The graphics coprocessor interfaces with the host microprocessor using various arbitration modes. In this regard, by loading a logical "1" in a predetermined graphics processor status register position, an arbitration mode is set by the host processor to indicate that the host processor has given up access to the game cartridge's ROM and RAM.

The present inventors have recognized that, even under circumstances where the host processor has given up access to a ROM and RAM by appropriately setting the status register, interrupts may nevertheless occur where the host processor may initiate a ROM access to fetch an address of a routine for handling such an interrupt. Under such circumstances, the graphics processor operates to provide the host microprocessor with a working RAM address instead of the program ROM address, causing the host processor to access its own internal working RAM. This technique keeps the host processor from addressing the program ROM at the time when the graphics coprocessor is executing from program ROM.

When the host processor needs to access the cartridge RAM, the graphics coprocessor status register is set such that the graphics coprocessor is unable to access RAM, thereby enabling the host processor to access whatever information is required from RAM and to thereafter switch the graphics coprocessor to a state where access to RAM is possible. However, it is desirable for the coprocessor to utilize ROM and RAM on the cartridge to the maximum extent possible due to its faster processing speed.

The graphics coprocessor of the present invention is designed to efficiently transfer pixel information loaded in the character data RAM to the host processor video RAM for display. The video RAM is not however, directly accessible to the graphics coprocessor through any cartridge bus. Such transfer must occur through using the direct memory access (DMA) circuits of the host processor.

The graphics coprocessor of the present invention receives several clock signals from the host information processing system. Timing within the graphics coprocessor is driven by one of the these clocks.

As an optional feature of the present invention, circuitry within the graphics coprocessor permits the processor to be reconfigured to account for future modifications depending upon the state of signals received via output address lines which are used as configuration setting input lines immediately after power-on reset. The values of option setting resistors coupled to these address lines are read by the graphics coprocessor. These signals are used to define, for example, the type of RAM chip that is being utilized with the graphics processor, e.g., static RAM or dynamic RAM.

These and other aspects and advantages of the present invention will become better understood from the following detailed description of the present exemplary embodiment of the present invention when taken in conjunction with the accompanying drawings of which:

BRIEF DESCRIPTION OF THE DRAWINGS

FIG. 8A is a block diagram showing the input signals received by the plot controller and the output signals generated by the plot controller;

FIG. 8B is a color matrix element contained within the color matrix in the pixel plot circuitry;

FIG. 12 illustrates timing signals associated with the resynchronizing circuitry of FIG. 11;

FIGS. 16 and 17 are block diagrams showing the register control logic of the graphics coprocessor in accordance with an exemplary embodiment of the present invention;

DETAILED DESCRIPTION OF THE EXEMPLARY EMBODIMENT OF THE PRESENT INVENTION

In accordance with the present exemplary embodiment, the graphics coprocessor of the present invention interacts with a 16-bit video game system commercially sold by Nintendo of America, Inc. as the Super Nintendo Entertainment System (Super NES). The Super Nintendo Entertainment System is described in part in U.S. application Ser. No.

07/651,265, entitled "Video Processing Apparatus" which was filed on Apr. 10, 1991 and U.S. application Ser. No. 07/749,530, filed on Aug. 26, 1991, entitled "Direct Memory Access Apparatus and External Storage Device Used Therein". These applications are expressly incorporated herein by reference. It should be understood that the present invention is not limited to Super NES related applications and may be used with other video game systems or other, non-video game, information processing apparatus.

For ease of reference purposes only, the graphics processor in accordance with the present exemplary embodiment is referred to hereinafter as the "Mario chip". The Mario chip is described in the presently preferred exemplary embodiment as being packaged within a video game cartridge. It should be understood that it is not essential to the present invention for the Mario chip to be housed in the same cartridge case as the program memory as long as it is connected, in use, to a program memory and to the host processing unit.

Figure 1:
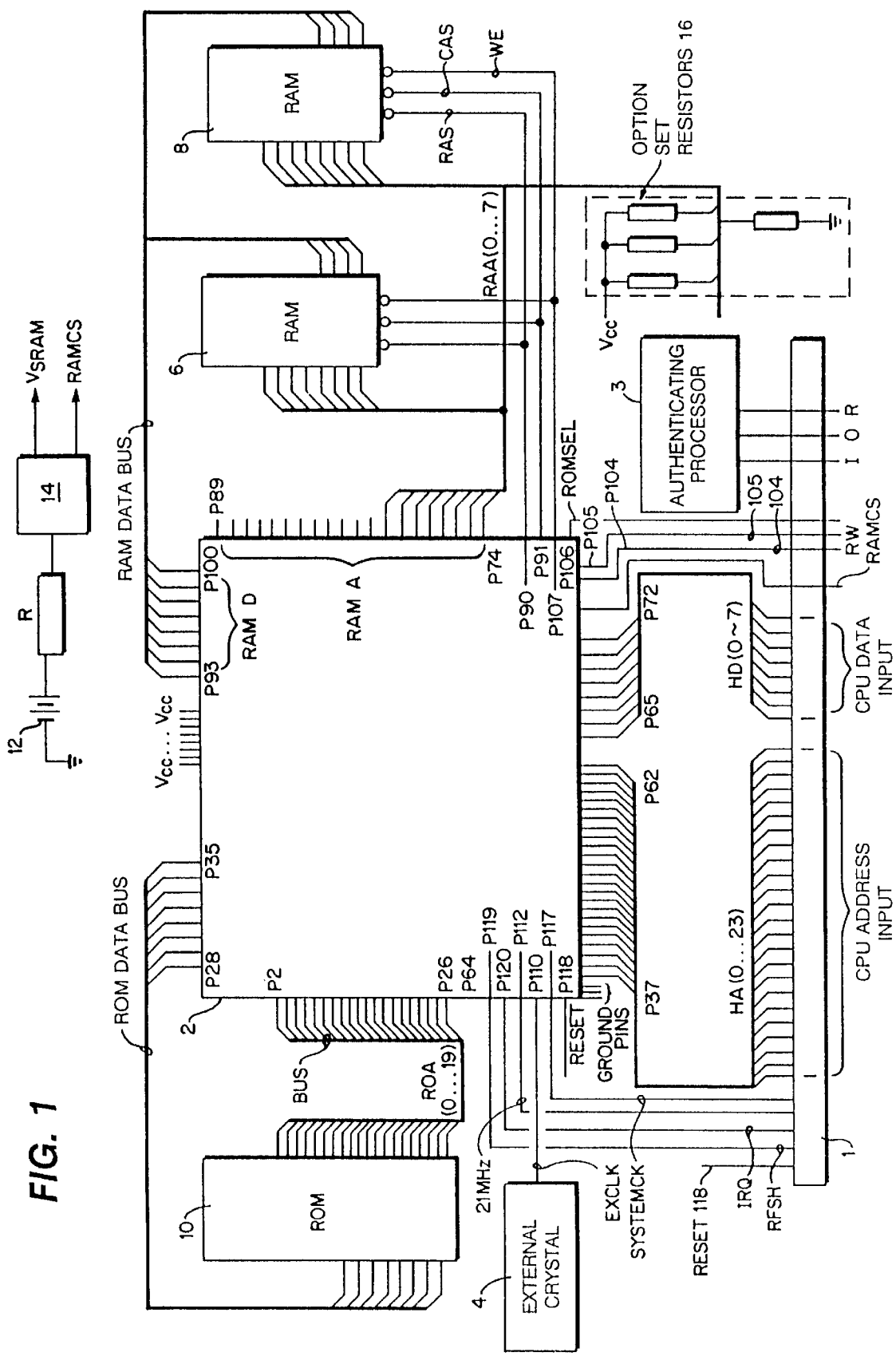
FIG. 1 is a block diagram of an exemplary external memory system in accordance with an exemplary embodiment of the present invention.

FIG. 1 shows an exemplary video game cartridge/external memory system in accordance with an exemplary embodiment of the present invention. The game cartridge includes a printed circuit board (not shown) on which all of the FIG. 1 components are mounted. The cartridge includes an array of connector electrodes 1 disposed at an insertion end of the printed circuit board for transmitting signals to and from the Super NES main control deck. The array of connector electrodes 1 is received by a mating connector disposed in the Super NES main control deck.

In accordance with the present exemplary embodiment, the Mario chip (graphics coprocessor) 2 embodied on the game cartridge is a 100 to 128 pin integrated circuit chip. The Mario chip receives many control, address and data signals from the host processing system (e.g., the Super NES). For example, the Mario chip 2 receives a 21 MHz clock input from the host processing system via pin P112; and a system clock input which may be 21 MHz (or another predetermined frequency) via pin P117. The system clock input may be used, for example, to provide the Mario processor with memory timing information for host CPU memory accesses and to provide clock signals for timing operations within the Mario chip. The Mario chip 2 also includes an optional, external clock input (pin P110) which couples the Mario chip to an external crystal 4, to drive the Mario CPU, for example, at a higher frequency clocking rate than the 21 MHz received from the host system.

Host CPU address inputs (HA) are coupled to the Mario chip 2 via pins P37 to pins P62 from the host processing system (e.g., Super NES CPU/Picture Processing Unit PPU) address bus. Similarly, data inputs (HD) from the host system are coupled to the Mario chip 2 via pins P65–P72 from the host CPU data bus. The Mario chip 2 additionally receives from the host CPU a memory refresh signal RFSH via P119, a reset signal via pin P118 read and write control signals via pins P104, P105. The Mario chip generates an interrupt request signal IRQ and couples the signal IRQ to the Super NES via pin P120. Other control signals are received from the Super NES such as a ROMSEL signal via pin P106 which may, for example, initiate a host program ROM 10 access. Additionally, the cartridge includes an authentication processor 3 which exchanges data with a Super NES authenticating processor on input I, output O, and reset R lines. The authenticating processor 3 and the security system used to authenticate game cartridges may be of the type shown in U.S. Pat. No. 4,799,635, which patent is incorporated herein by reference.

The Mario chip is coupled to RAMs 6 and 8 via the RAM address bus (RAM A), and RAM address pins P74–P91 and the RAM data bus (RAM D) and data pins P93–P100. These RAMs may be dynamic memory devices controlled in part using row address and column address strobe signals (RAS, CAS) coupled via pins P90 and P91, respectively. One or more static RAMs may be utilized instead of dynamic RAMs and pins P90 and P91 would then be used to couple address signals to their respective REMs without the row address and column address strobe signals. A write enable control signals WE is appropriately coupled to RAM 6 and 8 via pin P107.

The read and write control signals (R, W) are generated by the host CPU and coupled to the Mario chip via pins P104 and P105. By monitoring these read and write lines, the Mario chip can determine the nature of the memory access operation the Super NES CPU is attempting to perform. Similarly, virtually all address and control lines from the host system are monitored by the Mario chip to keep track of what the host CPU is attempting to do. The ROM and RAM addressing signals received by the Mario chip are monitored and passed on to the appropriate memory device. In this regard, the ROM addresses are coupled to program ROM 10 via the ROM address bus and pin P2 to P26 and the RAM address is coupled to RAMs 6 and 8 via pins P74 to pins P91. The ROM and RAM data inputs from the host CPU are appropriately coupled to ROM 10 via the ROM data bus and pins P28–P35 and via pins P93 to P100, respectively.

It should be recognized that the Mario chip may be utilized in conjunction with a wide range of different memory devices in addition to the ROM and RAM's described herein. For example, it is contemplated that the Mario chip may be advantageously utilized in conjunction with video game systems using CD ROM's.

For example, in FIG. 1, instead of using ROM 10, a CD ROM (not shown) may be used to store character data, program instructions, video, graphic, and sound data. A conventional-type CD player (also not shown) suitably connected to the Mario chip 2 to receive memory address signals over address bus P2–P26 for accessing data and/or instructions over data bus P28–P35. The specific structural and operational details of CD players and CD ROM storage systems are well known to those skilled in the art. One advantage provided by CD ROM storage is a significant reduction in the cost of storage per byte of information. Data may be stored at a cost between 100 to 1000 percent less than storage on semiconductor ROM. Unfortunately, the memory access/read time for CD ROM is even slower than that for semiconductor ROM.

The Mario chip uses a three bus architecture which permits information on at least three buses to be utilized in parallel. In this regard, in the game cartridge shown in FIG. 1, the Mario chip 2 is coupled to a ROM bus (including ROM data lines, ROM address lines and control lines), a RAM bus (including RAM address lines, data lines, and control lines) and a host processor bus (including host address, data and control lines).

The Mario chip architecture permits pipelined operations to occur to optimize throughput. In this regard, the Mario chip can be reading a data byte from ROM, while processing other data, while writing yet further data to RAM to permit 3-D related graphics to be performed very efficiently. As is described further below, the Mario chip 2 uses a 16-bit architecture internally and yet is designed to interface with 8-bit ROM 10 and RAM 6, 8 chips. Internally, all internal data buses and internal registers are 16-bits. Reads from ROM 10 and writes to RAM 6, 8 are "buffered" and typically do not slow down program execution.

Similarly, the Mario chip 2 may access instructions and graphics data from CD ROM and write that information into RAM 6, 8 for subsequent DMA transfer into the video RAM of the host processor, e.g., Super NES picture processing unit (PPU). Those skilled in the art will appreciate that the Mario chip 2 may be programmed to coordinate transfer of data from the CD ROM directly to the video RAM of the PPU, bypassing the RAM storage and access operations.

The extremely fast processing speed of the Mario chip 2 makes CD ROM storage practical for graphics applications despite the long read access time of CD ROMs. Video and audio data are compressed using conventional data compression techniques before storage on CD ROM. Data compression and decompression techniques are well known to those skilled in the art. After accessing compressed data from the CD ROM, the Mario chip 2 decompresses the data using conventional data decompression algorithms in much shorter time periods than can be achieved by conventional graphics processors. Because it operates with a 21 MHz clock, the Mario chip 2 completes decompression within prescribed time periods for data transfer to RAM 6, 8.

Thus, large amounts of video and audio data are accessed (in compressed form) in typical CD ROM access time periods. However, the effect of those relatively long access times is minimized because after data decompression by the Mario chip 2, the actual access time per data byte is significantly reduced. With the Mario chip 2 performing decompression, the host graphics processor, e.g. the Super NES PPU, is free to perform other processing tasks. Of course, if speed is not an issue for a particular application, the Mario chip 2 can access data from CD ROM in uncompressed form.

The cartridge may also include a battery backup when static RAM is used. A backup battery 12 is coupled to a conventional backup battery circuit 14 via a resistor R to provide a backup voltage (RSRAM) for static RAM and a static RAM chip select signal RAMCS in case of loss of power to provide a data saving feature.

Additionally, coupled to the RAM address bus, are option setting resistors 16. In normal operation, the Mario chip address lines are output to RAMs 6 and 8. However, during reset or power-on operations, these address lines are used as input lines to generate either a high or low signal depending upon whether they are tied to a predetermined voltage VCC or ground. In this fashion, a "1" or "0" is appropriately read into an internal Mario chip register. After reset, depending upon the setting of these resistors, the Mario chip can determine (during program execution), for example, the multiplier clocking rate, the RAM access time to which the Mario chip is coupled, the clocking rate to be used with other operations within the Mario chip, etc. Through the use of these option setting registers, the Mario chip is, for example, adaptable to be used with a number of different types of memory devices without requiring any Mario chip design modifications. For example, if a dynamic RAM setting is detected then refresh signals will be applied at appropriate times. Additionally, the option settings may be used to control the speed at which, for example, the processor multiplier circuits operate and to permit other instructions to be executed by the graphics processor at a faster rate than it is possible to execute certain multiply instructions. Thus by initiating a delayed multiply execution, the remaining instructions can run at a faster clock rate than the rate otherwise possible (e.g., the processor may, for example, be clocked at 30 megahertz, whereas the option settings would effectively cause the multiply instructions to be executed at 15 megahertz).

Figure 2:
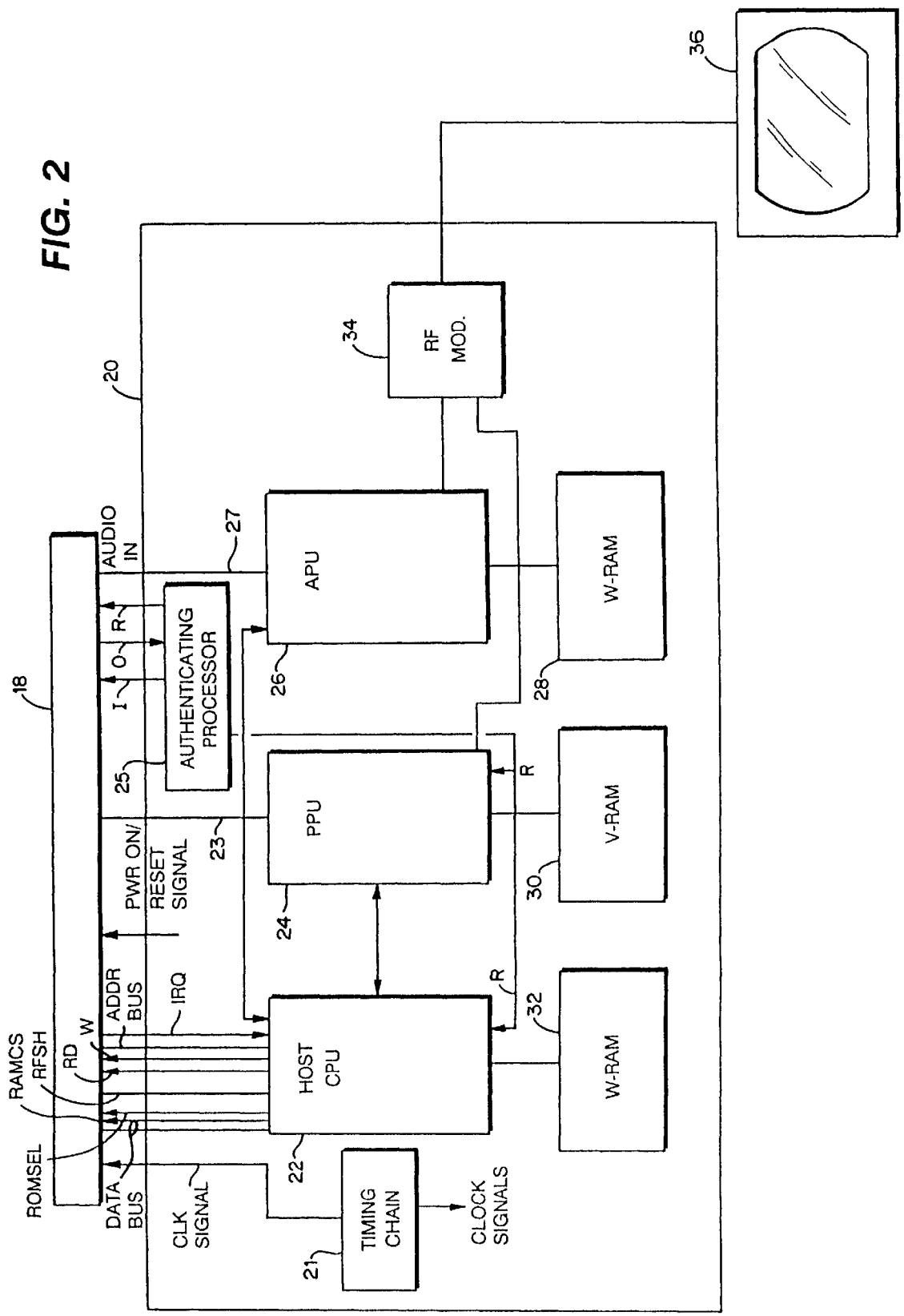
FIG. 2 is a block diagram of an exemplary host processing system for use with a graphics coprocessor of the presently preferred exemplary embodiment.

FIG. 2 is block diagram of an exemplary host video game system to which the exemplary game cartridge set forth in FIG. 1 is designed to be coupled. FIG. 2 may, for example, represent the Super NES currently sold by Nintendo of America. The present invention, however, is not limited to Super NES related applications or systems having a block diagram such as that shown in FIG. 2.

The Super NES includes within its control deck 20, a 16-bit host CPU which may, for example, be a 65816 compatible microprocessor. The CPU 22 is coupled to a working RAM 32, which may, for example, include 128K bytes of storage. The CPU 22 is coupled to a picture processing unit (PPU) 24 which in turn is coupled to a video RAM 30 which may, for example, include 32K words of storage. The CPU 22 has access to the video RAM 30 via the PPU 24 during vertical or horizontal blanking intervals. Thus, the CPU 22 can only access the video RAM 30 through the PPU 24 at times other than during active line scan when the PPU 24 is accessing video RAM. PPU 24 generates a video display on a user's television 36 from video RAM 30. CPU is also coupled to an audio processing unit APU 26 which is coupled to a working RAM 28. The APU 26 which may comprise a commercially available sound chip generates the sounds-associated with the video game program stored on the game cartridge in ROM 10. The CPU 22 can only access the working RAM 28 via APU 26. The PPU 24 and APU 26 are coupled to the user's home television 36 via RE modulator unit 34.

The video RAM 30 in the Super NES must be loaded with appropriate character data stored in the program ROM 10 in the cartridge (which stores not only the game program, but also the character data used during game play). Any moving object, e.g., sprite information, or background information to be displayed must be resident in video RAM 30 before use. The program ROM 10 is accessed by the CPU 22 host address and data buses via a mating connector 18 which is coupled to the printed circuit board edge connector 1 shown in FIG. 1. The PPU 24 is connected to the game cartridge via shared host CPU data and address buses and connector 23 so as to provide a path for PPU data and control signals to be coupled to the cartridge. The APU 26 is connected to the game cartridge via shared host CPU buses and audio bus 27.

The CPU 22 address space is mapped such that program ROM 10 locations begin at location 0 and is typically divided into 32K byte segments. The program ROM uses approximately one-half of the CPU address space. The top locations in each CPU address space 32K byte segment is typically utilized to address working REM 32 and various registers. The program ROM 10 typically is four megabytes. The CPU 22 used in the Super NES is capable of addressing the entirety of the program ROM 10. On the other hand, the Mario chip 2 only includes a 16 bit program counter and thus includes bank registers for selecting between the 32K byte banks in the program ROM 10.

In the present exemplary embodiment, the Mario chip has a full 24 bit address space that corresponds with the Super NES memory map. This contains the ROM 10 at the position starting at location $00:8000, and the RAM chip 6, 8 on the cartridge starts at location $70:0000.

Since the ROM 10 and RAM 6, 8 on the cartridge are on separate buses they can be accessed in parallel by the Mario Chip. Also RAMs 6, 8 can be accessed at a faster rate than ROM and the Mario chip is designed to utilize this performance advantage. The Mario chip has no access to any memory that is inside the Super NES, i.e., no access to the working RAM 32 or PPU video RAM 30.

In order for the Mario chip to process data, or draw into a bitmap, data must be contained within the Mario cartridge RAM chip 6, 8. Thus, any variables which are shared between the NES CPU program and the Mario chip program must be within the Mario cartridge RAM chip 6, 8. Any prestored data that the Mario chip program needs to use can be in ROM 10 and any variables will be in RAM 6, 8.

Any private variables only required by the Super NES program do not need to be in cartridge RAM 6, S. In fact, since this RAM 6, 8 is at a premium in terms of memory space, it is advisable to allocate cartridge RAM 6, 8 on a high priority requirement basis. Any non-essential variables should be stored in Super NES internal RAM 32.

The bitmap that the Mario Chip writes into is in Mario cartridge RAM 6, 8 and will be DMA transferred under control of the Super NES into the PPU's video RAM 30 when each bitmap frame has been fully rendered.

The Super NES's CPU 22 has access to all internal RAM within the Super NES control deck just as if the Mario chip were not present. The Mario chip has no access to this RAM so all data transferred between the Mario ROM/RAM chips and internal Super NES RAM must be initiated by the CPU 22 itself. Data can be transferred via CPU 22 programming, or block moved via DMA transfer. The Mario cartridge ROM 10 and RAM 6, 8 are mapped in as usual on all game programs.

The CPU 22 has control over which CPU has temporary access to the cartridge ROM or RAM chips. On power up or reset conditions, the Mario chip is turned off and the CPU 22 has total access to the cartridge ROM and RAM chips. In order for the Mario chip to run a program, it is necessary for the CPU 22 program to give up its access to either the ROM or RAM chip, preferably both, and either wait for the Mario chip to finish its given task, or alternatively the CPU 22 can copy some code into internal work-RAM 32 and execute it there.

The Mario chip has a number of registers that are programmable and readable from the Super NES CPU side. These are mapped into the CPU 22 memory map starting at location $00:3000.

As indicated in FIG. 2, the Super NES generates and receives a variety of control signals. When the Super NES CPU 22 needs to access program ROM 10, it generates a control signal ROMSEL. To initiate a memory refresh, the Super NES generates a refresh signal RFSH. When the Mario chip completes an operation, it transmits an interrupt signal IRQ on an interrupt request line associated with the Super NES CPU. The CPU 22 additionally generates read and write signals.

System timing signals are generated from timing chain circuitry 21 within the control deck 20. A power-on/reset signal is also generated within the main control deck 20 and coupled to the game cartridge.

The Super NES also includes an authenticating processing device 25 which exchanges data on input I output O, and reset R conductors with an authenticating processing device 3 on the game cartridge in accordance with the above identified U.S. Pat. No. 4,799,635. The processing device 25 an taught by U.S. Pat. No. 4,799,635 holds the CPU 22 in a reset state until authentication is established.

The Super NES video game machine which is represented in block form in FIG. 2 has only been generally described herein. Further details regarding the Super NES including PPU 24 may, for example, be found in U.S. application Ser. No. 07/651,265, entitled "Video Processing Apparatus which was filed on Apr. 10, 1991, which application has been expressly incorporated herein by reference. Still further details such as how information is transferred between the Super NES and the game cartridge may be found in U.S. application Ser. No. 07/749,530, filed on Aug. 26, 1991, entitled "Direct Memory Access Apparatus in Image Processing System and External Storage Device Used Therein" and in U.S. application Ser. No. 07/793,735, filed Nov. 19, 1991, entitled, "Mosaic Picture Display Apparatus and External Storage Unit Used Therefor", which applications are incorporated herein by reference.

In some applications, the inventors have recognized that more information may need to be transferred during vertical blanking using such host processor DMA circuits than is actually possible. Accordingly, it may be desirable to extend vertical blanking time—even if it results in slightly shrinking the picture size. By using this approach, significant advantages are realized in terms of processing speed and picture update rate.

Figure 3:
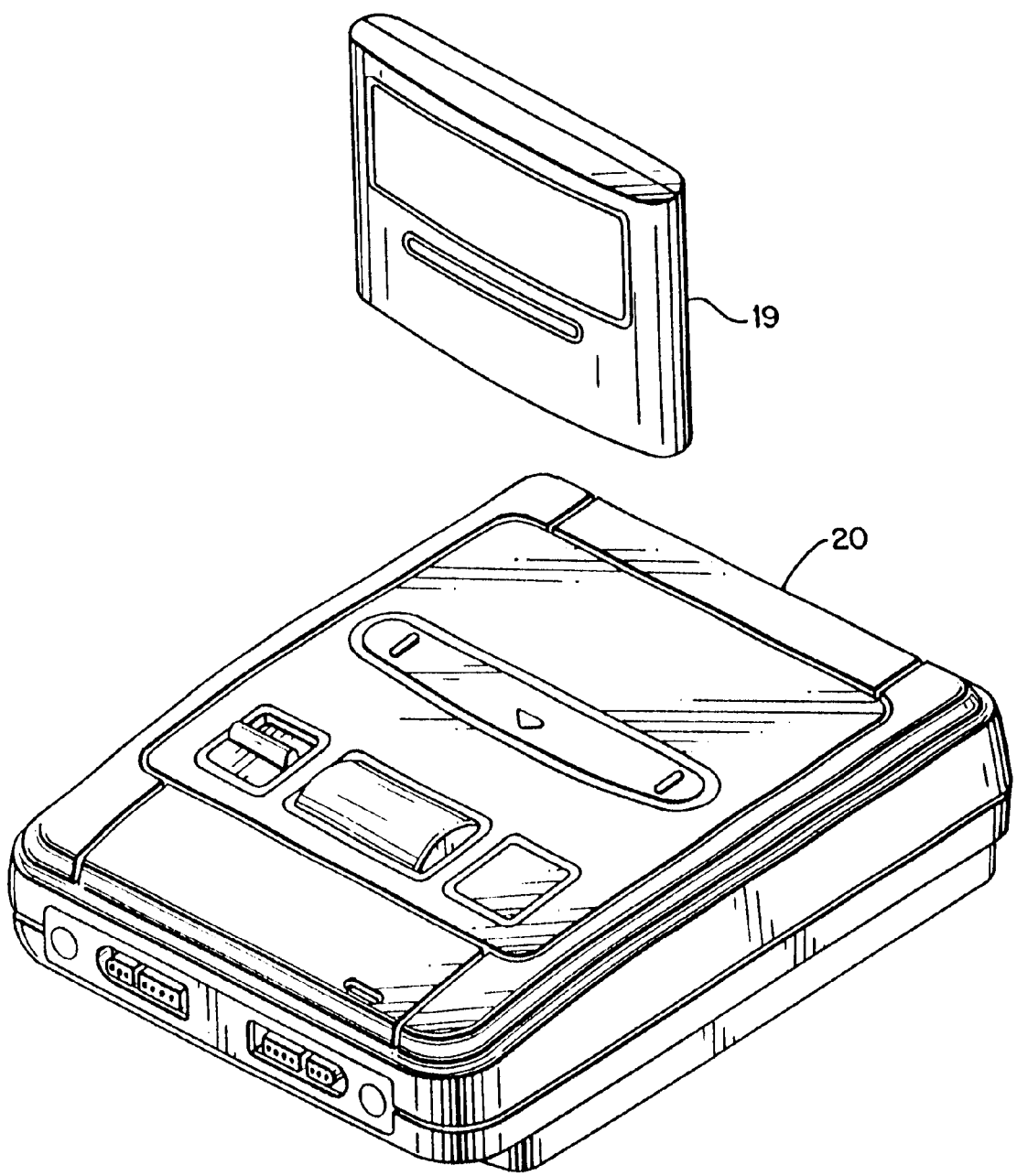
FIG. 3 is a perspective view showing an exemplary mechanical configurations of a game cartridge housing a graphics coprocessor and a base unit housing the host processing system.

FIG. 3 shows a perspective view of an exemplary mechanical design for a game cartridge case 19 for housing the Mario chip and other cartridge structure shown in FIG. 1. Similarly, FIG. 3 shows the perspective view of an exemplary exterior housing for a video game control deck 20 for housing the Super NES video game hardware shown in FIG. 2. The mechanical design for such video game control deck 20 and associated removable game cartridge 19 is shown in FIGS. 2–9 of U.S. application Ser. No. 07/748, 938, filed on Aug. 23, 1991, entitled, "TV Game Machine", which application is hereby incorporated herein by reference.

Figure 4A:
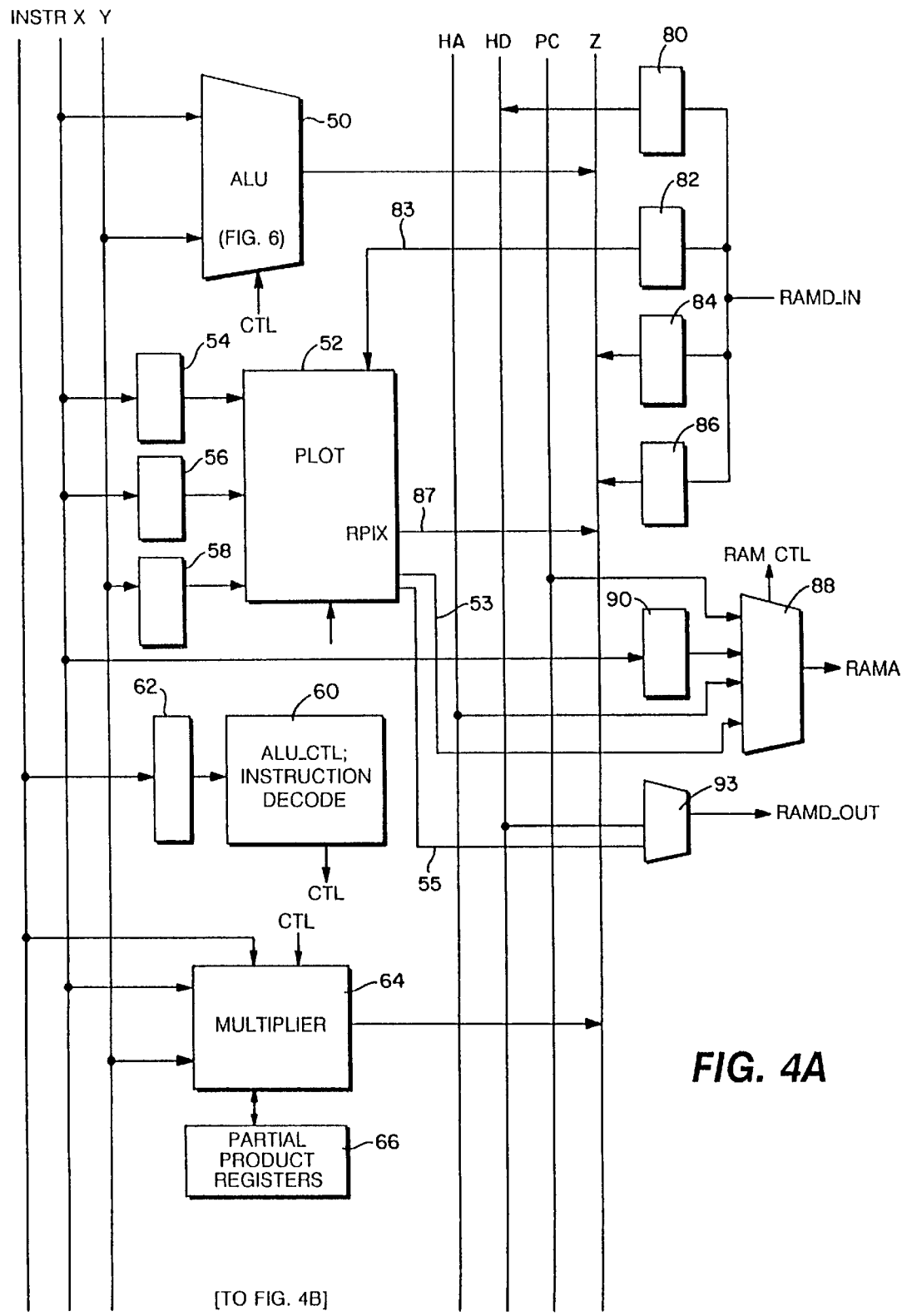
FIGS. 4A and 4B are a block diagram of the graphics coprocessor in accordance with the presently preferred exemplary embodiment.
Figure 4B:
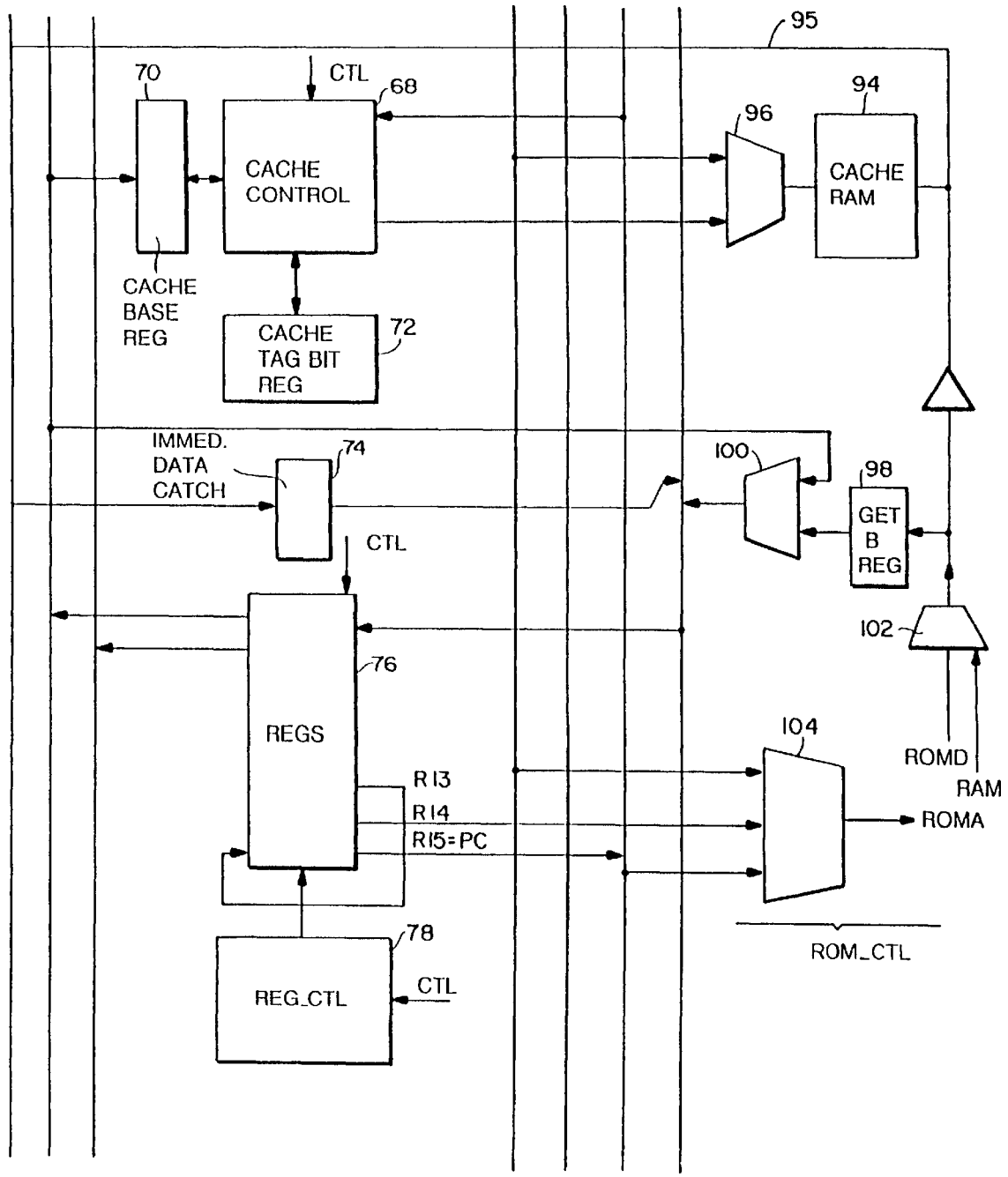

FIGS. 4A and 4B are a block diagram of the Mario chip 2 shown in FIG. 1. Focusing first on the various buses shown in FIGS. 4A and 4B, the instruction bus INSTR is an 8-bit bus that couples instruction codes to various Mario chip components. The X, Y and Z buses are 16-bit data buses. The HA bus is a 24-bit host system address bus that, in the presently preferred embodiment is coupled, in use, to the Super NES address bus. The ED bus is an 8-bit host data bus which is coupled, in use, to the Super NES data bus. The PC bus is a 16-bit bus which couples the output of the Mario chip program counter (i.e., register R15 in general register block 76) to various system components. The ROM A bus is a 20-bit ROM address bus. The ROM D bus is an 8-bit ROM data bus. The RAM A bus is a bit RAM address bus. The RAMD_IN bus is an 8-bit RAM read data bus, and RAMD_OUT is an 8-bit RAM write data bus.

The Mario chip and the Super NES share the cartridge RAM 6, 8 which serves is the main mechanism for passing data between the Mario chip and the Super NES. The Super NES accesses the Mario chip via the address and data buses HA and HD. The Mario chip registers 76 are accessed by the Super NES via the Super NES address bus HA.

The Super NES accesses the cartridge program ROM 10 and RAM 6, 8 via the Mario chip 2. The ROM controller 104 and the RAM controller 88 receive memory access related signals generated by the Super NES to respectively initiate ROM and RAM memory accesses. By way of example, a RAM select signal RAMCS is used by the Mario chip 2 to confirm that the Super NES is attempting to address the RAM.

The X, Y and Z buses shown in FIGS. 4A and 4B are the internal Mario chip data buses. The X and Y buses are source data buses and the Z data bus is a destination bus. These buses carry 16 bits of parallel data.

While executing instructions, the Mario chip 2 may place the source of data for an instruction on the X and/or Y buses and the destination data on the Z bus. For example, in executing an instruction which adds the contents of two registers and places the results in a third register, arithmetic and logic unit (ALU) 50 receives the contents of two source registers via the X and Y bus couples the result to the Z bus (which in turn is coupled to a specified register in block 76). Control signals resulting from the decoding of an instruction operation code by the instruction decoding circuitry 60 in the Mario chip 2 are coupled to the ALU 50 to initiate an ADD operation.

As noted with respect to the description of FIG. 1, the Mario chip is coupled to a ROM bus, a RAM bus and a Super NES host bus which are capable of communicating signals in parallel. The Mario chip 2 monitors the control, address and data signals transmitted via the host Super NES bus to determine the operations which the host system is performing. The cartridge ROM bus and the cartridge RAM bus may be accessed in parallel depending upon the Super NES operation being performed at any given time. In conventional Super NES game cartridges, the host CPU address and data lines are coupled directly to the RAM and ROM, such that the RAM and ROM may not be accessed in parallel.

In accordance with one aspect of the present invention, the Mario chip 2 physically separates the ROM bus and the RAM bus as shown in FIG. 1 from the Super NES buses. The Mario chip 2 monitors the signals transmitted on the Super NES buses and determines what signals need to be coupled to the ROM chip and the RAM chip via two separate ROM and RAM buses which are not time shared. By separating the ROM and RAM buses, the Mario chip 2 is able to read from ROM and write to RAM simultaneously. In this fashion, the Mario chip can efficiently operate with inexpensive ROM chips which have access times which are significantly slower than RAM access times without having to wait for the ROM accesses to be completed before accessing RAM.

Turning to FIG. 4A, as noted above, the Mario chip 2 is a fully programmable processor, and includes an ALU 50. The ALU 50 executes all the arithmetic functions embodied within the Mario chip except for multiply operations which are handled by multiplier 64 and certain pixel plotting operations handled by plot hardware 52. Upon receipt of an appropriate control signal from instruction decoder 60, the ALU 50 performs addition, subtraction, EXCLUSIVE-OR, shift and other operations. As shown in FIG. 4A, ALU 50 receives information to be operated on from the X, Y buses, performs the operation initiated by a control signal received from instruction decoder 60, and couples the results of the operation to the Z bus. The ALU is described in further detail below in conjunction with FIG. 6.

The Mario chip 2 additionally includes special purpose hardware to enable 3-D type special effects and other graphic operations to be efficiently performed so that video games utilizing these features may be practically realized. In this regard, the Mario chip 2 includes plot hardware 52 which assists in converting in real time from pixel coordinate addressing to character map addressing of the nature utilized in the Super NES. Advantageously, the Mario chip may be programmed by specifying X and Y coordinates which define the location of each pixel on the display screen.

Thus, graphic operations are performed based on a programmer specifying pixels and the plot hardware circuit 52 on the fly converts pixel specifications into properly formatted character data. The character data is then mapped into the desired place for display in the Super NES video RAM 30 shown in FIG. 2. In this fashion, the Mario chip programmer need only consider the Super NES video RAM 30 as a bit map when in reality, it is a character map.

The plot hardware 52 responds to various plotting related instructions to permit programmable selection of an X and Y coordinate on the display screen and a predetermined color for a particular pixel and to plot corresponding pixels such that the X and Y coordinate is converted into an address which corresponds to a character definition of the form which is used to drive the Super NES video RAM 30.

The plot hardware 52 has associated data latches which permit buffering of as much pixel data as possible prior to writing to cartridge RAM to minimize RAM data transactions. After the X and Y coordinate data is converted and buffered in the plot hardware 52, character definition data is then transferred to the cartridge RAM.

The plot hardware 52 receives X, Y coordinate data via a PLOT X register 56 and PLOT Y register 58, respectively. In the presently preferred embodiment, the PLOT X and PLOT Y registers are not separate registers (as shown in FIG. 4A) but rather are Mario chip general registers (e.g., registers R1 and R2 registers in register block 76 shown in FIG. 4B).

The plot hardware 52 also receives pixel color information via a color register 54. As will be described further below, the color of each pixel that is displayed is stored in an 8×8 register matrix, with each pixel color specification occupying a column of the matrix.

The plot hardware 52 processes and couples the character address and data associated with the X, Y and color input to the character RAM 6, 8. The character address is forwarded via output lines 53 to the RAM controller 88 and to a RAM address bus RAM A. The character data is coupled to the character RAM via output line 55, multiplexer 93 and RAM data bus RAMD_OUT. The plot hardware 52 permits pixels within a character to be addressed individually, to thereby provide the programmer a "virtual" bit map display system, while maintaining compatibility with the Super NES character format. The "virtual" bit map is held in the cartridge RAM and is transferred to the Super NES video RAM 30 on the completion of the display of each frame using, for example, the DMA circuitry in the above-identified application Ser. No. 07/749,530. The plot hardware 52 permits high speed individual pixel control so that certain 3-D graphics effects involving rotating and scaling objects become practically realizable.

Because of the conversion from pixel to character format, the plot hardware 52 also receives information relating to other pixels in the vicinity of the current pixel X, Y from a cartridge RAM 6, 8 via RAMD_in data latch 82 and input line 83. By using previous pixel data retrieved from RAM 6, 8 and temporarily stored in the RAM data latches, the number of writes to RAM may be minimized. The RAM data latches 80, 84, and 86 shown in FIG. 4A also serve to buffer color data received regarding a pixel which has been stored in multiple bit planes in cartridge RAM to provide plot hardware 52 with such data.

RAM data latch 80 is coupled to the Super NES data bus so that the Super NES can read the contents of the data latch. RAM data latches 80, 82, 84, and 86 are controlled by the RAM controller 88. RAM data latches 84 and 86 operate to receive data from RAM 6, 8 and couple data from RAM 6, 8 to the destination Z bus for loading into a predetermined register in register block 76. Additionally coupled to RAM controller 88 is a latch 90 which buffers RAM addresses. The address stored in latch 90 is utilized by RAM controller 88 for addressing RAM 6, 8 via the RAM A bus. RAM controller 88 may also be accessed by the Super NES via address bus HA.

The plot hardware 52 also responds to a READ PIXEL instruction which reads the pixel color information for a horizontal position defined by the contents of register R1 and the vertical position defined by the contents of register R2 and stores the result in a predetermined register in the register block 76 via the destination Z bus and output line 87. The PLOT hardware 52 is described in further detail in conjunction with the description of FIGS. 7, 8A, and 8B.

Pipeline buffer register 62 and an ALU controller instruction decoder 60 are coupled to instruction bus INSTR and operate to generate the control signals CTL (utilized throughout the Mario chip) to initiate operations in response to commands placed on the instruction bus. The Mario chip 2 is a pipelined microprocessor which fetches the next instruction to be executed while it is executing the current instruction. Pipeline register 62 stores the next instructions) to be executed so as to permit execution of instructions in one cycle, if possible. The instructions which are placed on the instruction bus are addressed by the contents of the program counter stored in a register, which may, for example, be register R15 in register block 76 shown in FIG. 4B.

The instructions executed by the Mario chip 2 may either be obtained from program ROM 10 as shown in FIG. 1 or the Mario chip's internal cache RAM 94 or from the cartridge RAM 6, 8. If the program is being executed out of ROM 10, the ROM controller 104 (shown in FIG. 4B) will fetch the instruction and place it on the Mario chip instruction bus INSTR. If a program instruction is stored in the cache RAM 94, then the instruction will be placed on the instruction bus directly from cache RAM 94 via cache RAM output bus 95.

The host CPU, i.e., the Super NES, is programmed to allocate portions of the program ROM 10 for Mario chip program instructions. The Super NES program commands the Mario chip to perform a predetermined function and then provides the Mario chip with the address in ROM 10 for accessing the Mario chip program code. Pipeline register 62 fetches instructions one byte ahead of the instruction being executed to provide the instruction decoder 60 with instruction related information for the decoder to be able to anticipate what is about to occur during program execution to permit look ahead related processing. The decoding and control circuitry in block 60 generates control signals for commanding the ALU 50, plot hardware 52, cache control 68, etc., to perform the operation indicated by the instruction code being executed.

The Mario chip also includes a high speed, parallel multiplier 64 that is separate from ALU 50. The multiplier 64 in response to predetermined instructions operates to multiply two 8-bit numbers received from the X and Y source buses and load the 16-bit result onto the destination Z bus. This multiply operation is performed in one cycle if possible. Either number input to the multiplier 64 may be signed or unsigned. Multiplier 64 also is capable of performing long multiply operations, whereby two 16-bit numbers are multiplied to generate a 32-bit result. The multiplier 64 also includes associated partial product registers 66 to store partial products generated during the multiplication operation. The multiplier 64 is enabled by a control signal from the instruction decoder 60 when a multiply operation code is decoded. The multiplier 64 will execute long multiply instructions involving the multiplication of 16-bit words in a minimum of four clock cycles.

The long multiply instruction has a format:

R4(low word), $DREG$ (high word)=$Sreg$*R6

This instruction is executed to multiply the source register by the contents of register R6 and store a 32-bit result in registers R4/DREG (low/high). The multiply is signed and sets zero and sign flags on the 32-bit result.

The operation takes place in accordance with the following six steps:

Step 1: Unsigned multiply R4 [0 . . . 15]=SREG [0 . . . 7]*R6 [0 . . . 7]

Step 2: X signed. R4 [0 . . . 15]=R4 [0 . . . 15]+256*SREG [8 . . . 15]*R6 [0 . . . 7]. Top eight bits of the product are ignored, but carry from addition preserved.

Step 3: X signed. R5 [0 . . . 15]=CY+(R6[8 . . . 15]*SREG [0-7])÷256; sign extended.

Step 4: X unsigned, Y signed. R4 [0 . . . 15]=R4 [0 . . . 15]+256*SREG [0 . . . 7]*R6 [8 . . . 15]. The top eight bits of the product are ignored, but carry from the addition is preserved.

Step 5: Y signed. R5 [0 . . . 15]=R [0 . . . 15]+CY+SREG [0 . . . 7]*R6 [8 . . . 15])÷256; sign extended.

Step 6: X, Y signed. R5 [0 . . . 15]=R5 [0 . . . 15]+RY [8 . . . 15]*R6 [8 . . . 15].

The multiplier 64 utilized in the present exemplary embodiment may be, for example, of the type described in *Digital Computer Arithmetic*, by Cavanaugh, published by McGraw-Hill, 1984.

Turning to FIG. 4B, cache controller 68 (which is shown in further detail in FIG. 14) permits a programmer to efficiently initiate loading into cache RAM 94 the portion of the program desired to be executed at high speed. Such "caching" is typically utilized in executing small program loops which occur frequently in graphics processing. The Mario chip instruction set includes a "CACHE" instruction. Any instructions immediately following the CACHE instruction is loaded into the cache RAM until the cache RAM is full. When the CACHE instruction is executed, the current program counter state is loaded into the cache base register 70. Thus, the contents of the cache base register 70 defines the starting location at which caching has been initiated.

Most instructions execute in one cycle. Instructions coming from relatively slow external memories like ROM 10 or RAM 6, 8 must be fetched before they are executed. This will take an extra 6 or so cycles. To enhance program execution speed, the 'cache' RAM 94 that is inside the Mario chip itself should be used.

Cache RAM 94 may be a 512-byte instruction cache. This is a relatively small size compared to the size of the average program, so the programmer must decide how best to utilize the cache memory 94. Any program loop that can fit into the 512 bytes cache size can run at full speed, one cycle for both fetch and execute. Because of the split busses, both ROM and RAM can be simultaneously accessed while executing code from internal cache 94.

The cache RAM 94 may be advantageously used to rotate a sprite by running a loop inside the cache 94 that would read the color of each pixel from ROM 10 while it is performing the rotation and scaling calculations, while it is using the PLOT instruction (to be described below) to write the pixel to RAM 6, 8. All that happens in parallel, giving very fast throughput slowed down by the slowest operation. The slowest operation is usually ROM data fetching, which is why the Mario chip is designed to use buffered access to ROM and RAM.

When compared with running from the relatively slow ROM 10, a program will run about 6 times faster from inside the cache RAM 94, but first it has to be loaded from ROM into the cache 94. This is done by placing an instruction at the start of any loop to be cached. Only the first 512 bytes of the loop will be cached, taken from the address of the CACHE instruction. While executing the code for the first iteration of the loop, the program will be coming from ROM 10 and copied into cache RAM in 16-byte chunks. All further iterations of the loop will come from the cache RAM 94 instead of ROM 10.

CACHE instructions can be used liberally in front of any repetitive program loops. Only subsequent iterations of a loop will benefit from being in cache. If a program loop is bigger than 512 bytes and overflows the cache 94, it will still work correctly, but only the first 512 bytes will run from cache 94 and the remainder will run from ROM 10 as usual. This gives a partial speed boost, but is not ideal.

A cache tag bit register 72 which, in the preferred embodiment, is part of the cache controller 68 identifies the memory locations which have been loaded in the cache RAM 94. The cache tag bits permit the Mario chip to quickly determine whether a program instruction is executable from the faster cache RAM rather than from the program ROM 10. The cache RAM 94 may be accessed by the cache controller 68 or the Super NES via the Super NES address bus HA via multiplexer 96.

The cache controller 68 is coupled to the program counter bus PC to load the cache base register 70 and perform cache memory address out-of-range checking operations.

Similar to the parallelism achievable in reading from ROM 10, the Mario chip also provides a way of writing to RAM 6, 8 in parallel. Whenever a Mario register is written to RAM 6, 8, it will initiate a separate RAM write circuit, e.g., in RAM controller 88, to do the memory transaction. This will take typically 6 cycles, but it will not delay the processor while it is doing so, provided the programmer avoids doing another RAM transaction for that time. For instance, it is faster to interleave other processing in between each store instruction. That way the RAM write circuit has time to do its job. If two writes are used in a row, the second one would delay the processor while the first one is being written.

For example (using instructions from the instruction set to be described below):

| FROM | R8 | ; Store R8 into (R13) |
|------|------|------|
| SM | (R13) | |
| SM | (R14) | ; Store R0 into (R14) |
| TO | R1 | |
| FROM | R2 | |
| ADD | R3 | ; Performs: r1 = r2 + r3 |
| TO | R4 | |
| FROM | R5 | |
| ADD | R6 | ; Performs: r4 = r5 + r6 |

Notice that the two store instructions are too close to each other. The second one will take 6 cycles longer because the RAM bus is busy trying to complete the first store instruction.

A better way of writing the code that will run faster would be to space out the two store instructions with other useful code. For example:

| FROM | R8 | ; Store R8 into (R13) |
|------|------|------|
| SM | (R13) | |
| TO | R1 | |
| FROM | R2 | |
| ADD | R3 | ; Performs: r1 = r2 + r3 |
| TO | R4 | |
| FROM | R5 | |
| ADD | R6 | ; Performs: r4 = r5 + r6 |
| SM | (R14) | ; Store R0 into (R14) |

In this fashion, a few more instructions may be executed in parallel at the same time that the first store instruction results in the writing to RAM. Then the second store operation can be done a few cycles later.

The instruction set described below includes a fast instruction for writing back a register to the last used RAM address. This allows for "bulk" processing of data, by loading the value from RAM, doing some processing on it, then storing it back again fast.

Turning back to FIG. 4B, an immediate data latch 74 is coupled to the instruction bus. This data latch 74 permits the instruction itself to provide the source of data so that no source register need be specified by an instruction. The output of the immediate data latch 74 is coupled to the destination Z bus, which in turn is coupled to a predetermined one of the registers in register block 76. The instruction decoding circuit 60 decodes an "immediate" data instruction and initiates the performance of the appropriate transfer to register operation.

The GET B register 98 shown in FIG. 4B is used in conjunction with the delayed/buffered read operation described above. In this regard, given the widespread use of relatively slow access time ROMs, prior art processors have typically had to wait until a data fetch is completed, whenever executing a ROM. By utilizing the delayed/buffered fetch mechanism described below, other operations may be performed while the data fetch is accomplished. In accordance with this mechanism, if register R14 in register block 76 is accessed or modified in any way, ROM or RAM fetches are initiated automatically at the address identified by the contents of R14.

As indicated in FIG. 4B, the register R14 is coupled to ROM controller 104. Any time the contents of register R14 is modified in any way, ROM controller 104 operates to initiate a ROM access. The results of accessing the ROM are loaded into the GET B register 98 via multiplexer 102 which is coupled to the ROM data bus ROMD. Instructions identified below permit accessing the information buffered in the GET B register 98. This information is loaded onto the destination Z bus via multiplexer 100 and then into one of the registers in register block 76.

In this fashion, if a data fetch from ROM is known to take a predetermined number of processing cycles, that fetch can be initiated and instead of waiting without performing other operations, the Mario chip can execute, for example, unrelated code after such data fetch has been initiated. The GET B register 98 may also be utilized to store information retrieved from RAM 6, 8 via multiplexer 102 as shown in FIG. 4B.

Embodied within register block 76 are sixteen 16-bit registers (R0–R15). Registers R0–R13 are general purpose registers (although some of these registers are often used for special purposes to be described below). As described above, register R14 is used as a pointer for reading memory, and, when modified, a read cycle from ROM (or RAM) is initiated. The byte read is stored in a temporary buffer (GET B register 98) for later access by a GET L or GET E command. Register R15 is the program counter. At the start of each instruction it points to the next instruction being fetched.

Register R0 is a general purpose register, which typically operates as an accumulator. It is also the default source and destination register for most single cycle instructions. If, for example, the contents of R0 and R4 are desired to be added together it is only necessary to expressly specify register R4.

Registers R11, R12 and R13 are specially utilized when a loop instruction is executed. Register R13 stores an address of the instruction to be executed at the top of the loop, and register R12 stores the number of times the loop is to be executed. If the contents of register R12 is non-zero, then the instruction at the address specified by the contents of R13 is loaded into the program counter (R15) and executed. Register R11 stores the address to be returned to after the loop is completed.

Register control logic 78 is coupled to register block 76 and controls access to general registers R0 to R15. Depending upon the format of the particular instruction being executed, instruction decode logic 60 will specify one or more registers R0–R15. Register control logic 78 specifies which register the next instruction to be executed will need to utilize. The register control logic 78 couples the outputs of the appropriate register to the X and Y bus. Additionally, as indicated by FIG. 4B, the appropriate register R0–R15 receives the information from the Z bus under the control of register control 78.

ROM controller 104 upon receipt of an address from either the Super NES address bus HA or the Mario chip will access that address. ROM controller 104 is shown in further detail in FIG. 13. Accessed information from ROM 10 may be loaded into the cache RAM 94 for fast instruction execution. The ROM and RAM controllers 104, 108 both have bus arbitration units which arbitrate between Super NES and the Mario chip access attempts.

As will be described further below, the Mario chip also utilizes status registers (e.g., within register block 76 or in RAM 6, 8) which are accessible by the Super NES CPU and which store flags for identifying status conditions such as O flag, carry flag, sign flag, overflow flag, "GO" flag (where 1 indicates that the Mario chip is running and 0 indicates that the Mario chip is stopped); a ROM byte fetch-in-progress flag (indicating that register R14 has been accessed); various mode indicating flags including an ALT 1 flag, ALT 2 flag, immediate byte-low and immediate byte-high flags, and flags indicating that both a source and destination register has been set by a "WITH" prefix command, and an interrupt flag.

The Mario chip represented in block diagram form in FIGS. 4A and 4B is utilized by the Super NES which turns the Mario chip on and off to perform tasks many times a second. Initially, when the Super NES is turned on, the game program stored in ROM 10 is booted up. It is noted that prior to execution of the game program by the Super NES and Mario chip processors, the game cartridge is first authenticated. By way of example only, such authentication may take place by initially placing the Super NES CPU in a reset state and executing authenticating programs in authenticating processors associated with the game cartridge and the Super NES main control deck in accordance with the teachings in U.S. Pat. No. 4,799,635.

The Mario chip is initially in a switched-off state. At this point in time, the Super NES has unrestricted access to the game cartridge program ROM and the game cartridge RAM. When the Super NES has need to use the Mario chip processing power to perform either graphics operations or mathematical calculations, the Super NES stores the appropriate data it desires the Mario chip to process in the cartridge RAM (or in predetermined Mario registers) and loads the Mario chip program counter with the address of the Mario program to be executed. The data to be processed by the Mario chip may be predetermined X, Y coordinate data of objects which must be rotated and enlarged or reduced. The Mario chip can execute programs which implement algorithms to manipulate the background and foreground of sprites or moving objects of varying number. The use of the Mario chip speed enhancing hardware and software results in high speed performance of such operations.

The use of the Mario chip to process sprites can expand the capabilities of the overall video game system considerably. For example, the Super NES is limited to displaying 128 sprites per frame. With the use of the Super Mario chip virtually hundreds of sprites may be displayed and, for example, rotated.

When the Mario chip has completed the function requested by the Super NES, a STOP instruction is executed, and an interrupt signal is generated and transmitted to the Super NES to indicate that the Mario chip has completed its operation—which, in turn, indicates that it is ready to perform the next task.

The Mario chip may be utilized to do small tasks such as a high-speed multiplication task or may be utilized to draw a screen full of sprites. In either event, the Super NES is free to do processing in parallel with the Mario chip provided the Super NES stays off the RAM or ROM buses when such buses are being used by the Mario chip. It is noted that if the Super NES gives the Mario chip control of both the RAM and ROM buses on a game cartridge, the Super NES may, nevertheless, be able to execute programs out of its working RAM 32 shown in FIG. 2. Thus, the throughput of the entire system may be increased by copying a Super NES program to be executed from program ROM to its working RAM; while, at the same time, executing a program by the Mario chip.

Figure 5:
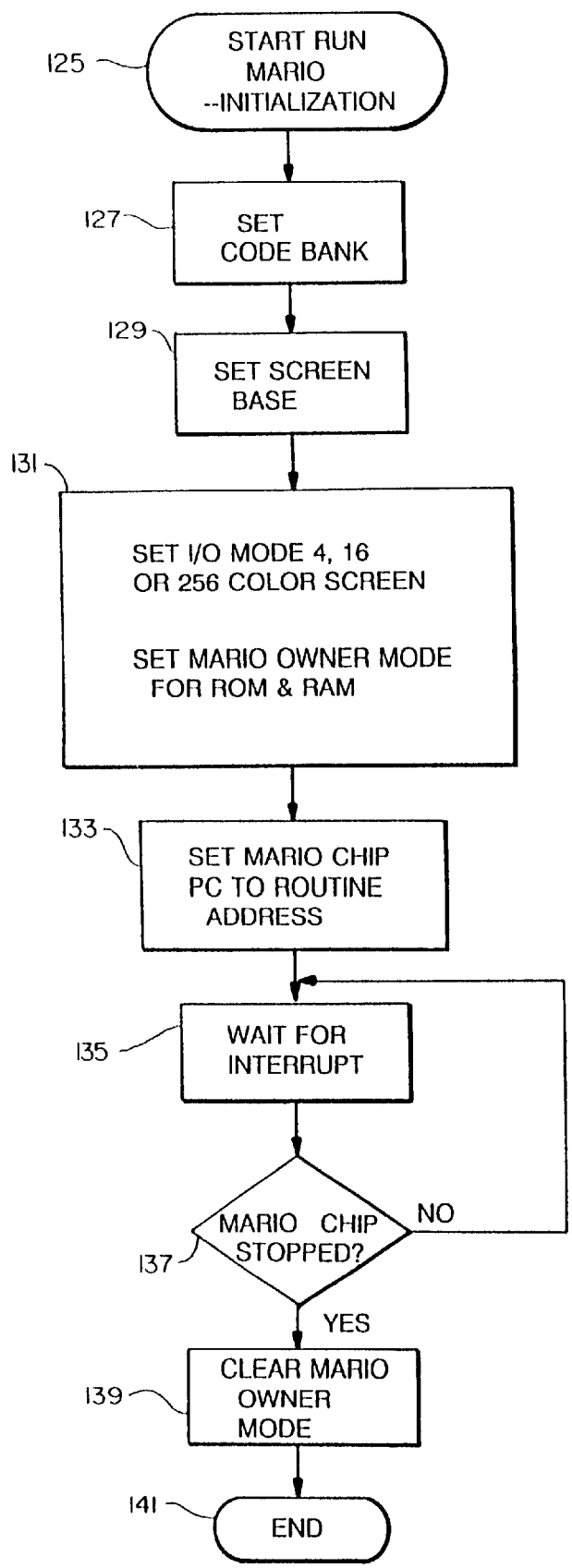
FIG. 5 is a flowchart delineating the sequence of operations performed by the host processing system for initiating graphics coprocessor operation.

A flowchart is shown in FIG. 5 which represents the sequence of operations performed by a "RUN MARIO" program executed by the host CPU (e.g., the Super NES CPU) for starting the Mario chip to fetch and execute code from ROM at the required address. The routine represented by FIG. 5 will be typically executed by the Super NES CPU after copying the routine from the program ROM 10 to its working RAM 32 shown in FIG. 2. This routine is executed by the host CPU any time the Mario chip is required to perform an operation.

As indicated in block 125 when the RUN MARIO host CPU routine is executed, initialization operations are performed including preserving the Super NES registers. During the initialization step, this routine is copied from program ROM 10 to the host CPU's working RAM 32.

As indicated at block 127, the ROM 10 code bank storing the Mario program code to be executed is loaded in a Mario chip register. Additionally, the actual address within the code bank is stored in a Mario chip screen base register as indicated at block 129.

Thereafter, as indicated in block 131, I/O input/output modes are set in the Mario chip by identifying whether 4, 16 or 256 color modes will be used. These modes correspond to the color modes with which the host CPU operates. Additionally, a mode is set defining the height of the screen in terms of number of characters that may be displayed.

Additionally, mode bits are set which give the control of the ROM and RAM buses to the Mario chip. Control of the ROM and RAM buses are separately selectable so that the Mario chip may be set to a mode where it has access to the ROM bus, the RAM bus, or both. Thus, if the "Mario owner" mode is set for both the ROM and the RAM, then the host CPU cannot read or write from or to the ROM or RAM. It is noted that, if the host CPU attempts to access the program ROM while the Mario chip is using the program ROM bus, a mechanism is provided whereby the Mario chip returns dummy addresses to the Super NES. The branching to such addresses will keep the Super NES occupied until the Mario chip no longer requires access to the cartridge ROM bus.

As indicated at block 133, the Mario chip begins operation after the Mario chip program counter is loaded with an address which stores the first instruction that the Mario routine must execute.

The host CPU then waits for an interrupt signal from the Mario chip (block 135). When an interrupt signal is received, the Super NES is informed that the Mario chip has completed its operation and has stopped (block 137). If no such interrupt signal is received, then the host CPU continues to wait for an interrupt (block 135). The Super NES may, during this time period, execute program code in parallel with Mario chip operations by executing out of its working RAM 32 shown in FIG. 2.

The Super NES then checks the status register (e.g., in the Mario chip register block 76) to determine whether the Mario chip "GO" flag has been set which indicates that the Mario chip is in operation (137). Additionally, an interrupt flag is set in the Mario chip status registers to indicate that the Mario chip is the source of the interrupt signal received by the host CPU. Thus, after an interrupt signal is received by the host CPU (135), the appropriate Mario status register is tested to determine whether the Mario chip is the source of the interrupt (as opposed to the interrupt signal being indicative, for example, of a vertical blanking interval). If the Mario chip has stopped (137), then the Mario owner mode bits for the RAM and ROM are cleared and the Super NES has full access to the ROM and RAM. The Super NES exits the routine (141) and returns to the point in its program which it was executing prior to entering the Run Mario routine.

When the CPU 22 game program has put the Mario chip into ROM Mario owner mode, it must voluntarily stop accessing the ROM. Whenever the CPU 22 needs to access the ROM for some reason, it simply turns ROM Mario owner mode off. The Mario chip will automatically hold on when it next needs to access the ROM until it is given ROM Mario owner mode back again. If it was running from internal cache RAM this may not be required at all.

If the Mario chip is in the Mario owner mode for ROM, it is important that the CPU 22 game program does not even try to read anything from ROM. When any interrupt occurs, e.g., due to vertical blanking, it causes an NMI, then the CPU 22 automatically tries to fetch its interrupt vectors from the ROM. This is not desirable, because the CPU 22 has explicitly told the Mario chip that it will stay away from the ROM, and then an interrupt occurs and it fetches from the ROM anyway. In this situation, i.e., a ROM access from the CPU 22 despite being in the Mario owner mode will cause the Mario chip to assume that this was an interrupt vector request.

During an interrupt vector fetch in ROM Mario owner mode, the Mario chip will relocate the interrupt vectors into Super NES internal work RAM 32 at the bottom of the stack area. For instance, if the usual interrupt vector was $00:FFEC then it will cause a JUMP to location $00:010c.

Similarly, all interrupt vectors from $00:ffeX cause the CPU 22 to JUMP to their corresponding locations at $00:010X. This technique avoids the CPU 22 from accessing the ROM 10 when its not supposed to, and diverts it into on-board Super NES RAM 32 instead. It is noted that the RAM based interrupt vectors must contain jumps or branches to interrupt handlers, i.e., actual code should be resident there not simply vector addresses. When the Mario chip is not in the Mario owner mode ROM, the normal ROM interrupt vectors are in use, so it is advisable to keep the same addresses pointed in these locations to go to the same place as the RAM based interrupt vectors.

Instruction Set

The Mario chip instruction set provides an efficient means for programming high speed graphics and other processing algorithms. A brief description of certain instructions is set forth below followed by a description of certain registers used by various instructions. A detailed listing of the instruction in the instruction set is also included.

Instructions are 8-bit instructions and typically execute in a single clock cycle. However, the instructions can be modified by 8-bit prefix instructions. The Mario chip instruction set includes a unique register override system allowing the programmer to specify the destination and both source registers in front of any instruction. Without such "prefixed" overrides, instructions would operate only on the accumulator. Thus, the instruction set is a variable length instruction set with a myriad of combinations. There are some basic instructions that are one byte long which operate in one cycle. By providing prefixed instructions, a programmer can extend the power of the instructions. An instruction can be 8, 16 or 24 bits, depending upon the programmer's desire.

The Mario processor utilizes instructions to initiate high speed, on-board cache RAM program execution and delayed/buffered I/O to memory. Graphics processing is efficiently enabled through the use of a single cycle pixel plot command which initiates operation using the pixel plot hardware described above.

Prior to identifying the Mario instruction set, various memory mapped registers which are set or accessed by the processor in executing instructions are described below. Initially, the status flag register is identified. The status register is a 16-bit register and the flags associated with each of the 16 bits in the register are identified below.

| bit | Flags | STATUS FLAGS REGISTER 16 BIT |
|---|---|---|
| 0 | — | Reserved |
| 1 | z | Zero flag |
| 2 | c | Carry flag |
| 3 | s | Sign flag |
| 4 | v | Overflow flag ([bit 14 into 15] XOR [15 into Carry]) |
| 5 | g | Go flag: 1 Mario chip running 0 stopped |
| 6 | r | (R14) ROM byte fetch in progress |
| 7 | — | Reserved |

The "GO" flag (bit 5) is a flag that is set to a "1" state to indicate that the Mario chip is running and to a "0" state to indicate that the Mario chip has stopped (which results in the generation of an interrupt signal which is coupled to the Super NES). This flag bit is checked by the Super NES processor. Bit 6 is set to indicate that a ROM byte fetch is currently in progress. The GET byte instruction listed below cannot be executed until this flag is cleared which indicates that the data fetch has been completed. These least significant bits of the status register may be read independently or in combination with the remaining 8 bits by either the Mario chip processor or the host CPU. The most significant bits of the status flag register are set by predetermined prefix instructions and define various modes of instruction interpretation.

| bit | Mode | |
| --- | --- | --- |
| 8 | alt1 | Alter (ADD->ADC,SUB->SBC etc . . . ) |
| 9 | alt2 | Alter (ADD->ADD#,SUB->SUB# etc . . . ) |
| 10 | il | Immediate byte low (done before ih) |
| 11 | ih | Immediate byte high (low byte buffered until hi ready) |
| 12 | b | Both SReg & DReg set. Set by WITH |
| 13 | — | Reserved |
| 14 | — | Reserved |
| 15 | irq | Interrupt flag |

In the ALT 1 mode identified above, an ADD instruction will be interpreted as an ADD WITH CARRY and a SUBTRACT instruction will be interpreted as SUBTRACT WITH CARRY. An instruction ALT 1 initiates this mode.

An ALT 2 instruction modifies the interpretation of the ADD instruction to ADD WITH IMMEDIATE DATA and modifies, SUBTRACT to SUBTRACT IMMEDIATE DATA. The "immediate" data is set fort in the byte immediately following the instruction. It is noted that the instruction ALT 3 will set both bits 8 and 9 to the logic "1" level. Bits 10 and 11 are set depending upon whether the immediate data is immediate high byte or immediate low byte. Bit 12 of the status register defines a "b" mode, where both source and destination register are set by the use of a prefix instruction "WITH". Bit 15 of the status register stores the Mario interrupt signal which is set after the Mario chip has stopped running.

The Mario chip includes many registers in addition to the above-described status register. As described above, the Mario chip includes 16 registers which are 16 bits wide as indicated in the discussion of register block 76 in FIGS. 4A and 4B. Most of these registers are general purpose registers and can be used for data or address storage. As noted above, register R15 is, however, utilized at all times as the program counter. Typically, registers serve dual purposes and are used for communication with the host CPU and for controlling the executing program. Additionally, other registers are utilized in the Mario chip, the functions of which are set forth in the table below.

| Register | Special Function |
| --- | --- |
| r0 | Default DReg and SReg |
| r1 | X coord for PLOT instruction |
| r2 | Y coord for PLOT instruction |
| r3 | None |
| r4 | Low word of LMULT instruction result |
| r5 | None |
| r6 | Word multiplier for FRMULT and LMULT instructions |
| r7 | Source 1 for MERGE instruction |
| r8 | Source 2 for MERGE instruction |
| r9 | NONE |

-continued

| | |
| --- | --- |
| r10 | NONE |
| r11 | Link register for subroutine calls |
| r12 | Count for LOOP instruction |
| r13 | Address for LOOP instruction to branch to |
| r14 | ROM address, when modified starts a byte read from ROM |
| r15 | Program counter |

OTHER REGISTERS

| | |
| --- | --- |
| 8 bit PCBANK | Program code bank register |
| 8 bit ROMBANK | Program data ROM bank register 64kbank |
| 8 bit RAMBANK | Program data ROM bank register 64kbank |
| 16 bit SCB | Screen base |
| 8 bit NBP | Number of bit planes |
| 8 bit SCS | Screen Column size select: 256, 320, 512, 640, 1024, 1280 (screens 16 & 20 chars high, in 2,4 & 8 bit planes) |

The Mario chip also includes a color mode CMODE register. Four of the bits in this registers are used in the exemplary embodiment to create the special effects described below. The effect created by setting a CMODE register bit varies based on whether the 16 or 256 color resolution mode has been set as demonstrated in the examples below.

CMODE register bits are as follows:-

CMODE bit 0

Plot colour 0 bit (the NOT Transparent bit)
In 18 colour mode:
It bit 0 = 1 and selected colour nibble = 0 then do not plot
In 258 colour mode arid bit 3 = 0:
if bit 0 = 1 and colour byte = 0 then do not plot
In 258 colour mode and bit 3 = 1:
If bit = 1 and colour lo nibble = then do not plot
N.B. transparency ON = 0
   transparency OFF = 1
Only use for transparency OFF is to fill an area with 0
(used for clearing the screen)
CMODE bit 1

Dithering bit
Dithering in 16 colour mode. (hi/low nibble give two colours)
Lo nibble selected if (xpos XOR ypos AND 1) = 0
Hi nibble selected if (xpos XOR ypos AND 1) = 1
If transparency is on and selected colour nibble is zero
then do not plot.
Dithering in 256 colour mode should have no effect.
CMODE bit 2

High nibble colour bit
In 16 colour mode or 256 colour mode with CMODE bit 3 set.
When this bit set, COLOUR command sets to nibble of colour
register to hi nibble of source byte
(Used to unpack 18 colour sprites stored as hi nibble of
another sprite).
If the lo nibble of colour register is zero then do not plot
if transparency on.
CMODE bit 3

Complicated bit
In 258 colour mode only. When bit is set the hi nibble of the
colour is locked and COLOUR commands only change the lo nibble.
Transparency is calculated from low nibble only.
In normal 256 colour mode transparency is calculated from
all bits if on.
    ; 16 colour mode example ibt     r0, $C0

-continued

CMODE register bits are as follows:-

```
Colour                      ; set colour $C0
ibt     r0, %0000   ; set 0
cmode
ibt     r0, $97
colour
plot                        ; plots colour $7
ibt     r0, $30
colour
plot                        ; no plot, as colour is $0
                            ; (transparency on and lo nibble = 0)
ibt     r0, %0001   ; set bit 1
cmode
ibt     r0, $40
colour
plot                        ; plots colour $0
                            ; (transparency off)
stop
; 16 colour mode, bit 2 set example ibt     r0, $C0
colour                      ; set colour $C0
    ; 256 colour mode, bit 3 set example ibt     r0, $C0
        colour              ; set colour $C0
        ibt     r0, %1000   ; set bit 3
        cmode
        ibt     r0, $47
        colour
        plot                ; plots colour $C7
        ibt     r0, $50
        colour
        plot                ; no plot, as colour is $C0
                            ; (transparency on and lo nibble = 0)
        ibt     r0, %1001   ; set bit 3 and bit 1
        cmode
        ibt     r0, $60
        colour
        plot                ; plots colour $C0
                            (transparency off)
        stop
        ; 256 colour mode, bit 3 and bit 2 set example ibt     r0, $C0
        colour              ; set colour $C0
        ibt     r0, %1100   ;set bit 3 and bit 2
        cmode
        ibt     r0, $74
        colour
        plot                ; plots colour $C7
        ibt     r0, $03
        colour
        plot                ; no plot, as colour is $C0
                            ; (transparency on and lo nibble = 0)
        ibt     r0, %1101   ; set bit 3, bit 2 and bit 1
        cmode
        ibt     r0, $08
        colour
        plot                ; plots colour $C0
                            ; (transparency off)
        stop
```

Many of the Mario chip registers have associated special functions. As indicated in the above table, if not otherwise specified, the system defaults to register R0 as the destination register or source register required by a particular instruction. Register R0 is also utilized as the ALU accumulator. The multiply instruction, as indicated above, returns a 32 bit result. The least significant 16 bits are stored in register in R4. Register R6 is used in conjunction with a fractional signed multiply instruction (FRMULT) and a long multiply instruction (LMULT).

Registers R7 and R8 are utilized in executing a MERGE instruction. The instruction takes two predetermined registers (i.e., Register R7, R8) and merges them together to form sprite coordinate data. Such coordinate data is utilized in addressing a ROM table for mapping a predetermined sprite onto a predetermined polygon. This instruction is an aid to efficiently performing texture mapping operations by combining portions of two registers to define the address of the color for the next pixel which is to the contained within a sprite mapped onto a polygon.

Registers R11 through R13 are used for controlling subroutine execution. The register R11 is used as a link register for subroutine calls and stores the contents of the program counter plus one. The content of register R11 defines the address that must be accessed after a loop has been completed. The register R12 is used to store a count defining the number of times the loop is to be executed. The address of the loop is stored in register R13.

As indicated above, whenever the contents of register R14 are modified, a byte is read from ROM 10 at the address stored in register R14. In this fashion, a delayed or buffered READ operation is implemented in conjunction with the GET byte instructions identified below.

Turning to the "Other Registers" in the above table, the program ROM location from which the program is being executed is addressed using a 24 bit address. The least significant 16 bits of this address are found in the program counter. The most significant bits defining the program bank are stored in a program code bank (PC Bank) register.

The ROM bank register (ROMBANK) stores the most significant bits for permitting the Mario chip processor to address program data stored in ROM 10 and is appended to the 16 bit ROM address stored in register R14. Similarly, the RAM bank register (RAMBANK) stores the higher order address bits for permitting the Mario chip processor to access program data in RAM. The contents of the RAM and ROM bank register are used in association with Mario chip ROM and RAM accessing instructions for effectively extending the Mario processor's addressing range.

The screen base register (SCB) is used to store the address of the virtual bit map of sprites or objects which are being created, and rotated, enlarged or reduced. When a PLOT pixel instruction is executed, the screen base register SCB stores the address in the RAM which is accessed and to which information is written.

Register NBP is utilized to store the number of bit planes that are being used. It typically indicates either the use of 2, 4, or 8 bit planes. Additionally, a screen column size register SCS is utilized to specify information regarding the virtual bit map in terms of the number of characters contained in a column therein.

The Mario chip instruction set is listed below specifying the instruction mnemonic and the associated function performed upon decoding the associated instruction. Initially, brief comments are set forth below for certain functions of an associated instruction which are not believed to be self explanatory.

The STOP instruction is executed when the Mario chip has finished its operation and operates to set the "GO" flag to zero while also generating any interrupt signal to the host CPU.

The CACHE instruction operates to define the portion of program ROM which is to be copied into the Mario chip cache RAM and executed therefrom. When the CACHE instruction is executed, the contents of the program counter is loaded into the cache base register and the cache tags to be described below are reset.

The Mario chip includes a series of delayed branch instructions in which the instruction following the branch is executed as indicated in the table below. The address to which branching occurs is relative to the contents of the program counter. The instruction set includes a wide variety of delayed branches based on the conditions outlined in the table below.

The Mario chip includes a number of "prefix" instructions, i.e., to/with/from. These prefix instructions imply a data distribution for subsequent instructions. For example, the "TO" prefix sets the destination register (DReg) for the next instruction. The 'FROM' prefix sets the source register (SReg) for the next instruction. The 'WITH' prefix sets both.

Most instructions name a second source register in the opcode. If SReg and DReg are not set by prefix instructions they default to R0. Both SReg & DReg are set to R0 after every instruction that is not a prefix instruction. If the Dreg is set to R15, the program counter, thereby causing the next instruction to store its contents in R15, then a one cycle delayed branch is initiated.

Other prefix instructions set flags in the high byte of the status register to change the operation of following instruction. All non prefix instructions clear the high byte of the status word. The following are examples as to how subsequent instructions may be modified through prefix instructions.

```
1sr              ; r0 = r0 shift right 1
to r4
1sr              ; r4 = r0 shift right 1
from r4
1sr              ; r0 = r4 shift right 1
alt 1
from r6
to r5
add r7           ; r5 = r6 + r7 + carry
alt 1
with r3
add r3           ; r3 = r3 + r3 +carry (6502 rol)
```

If the "b" flag is set in the status register, the "TO" instruction is modified to operate as a "MOVE" instruction. The TO instruction specifies the register to which the information is moved and the FROM instruction specifies the information source.

The STW instruction stores a particular word in a buffer such that it is not necessary to wait until a storage operation is completed before executing the following instructions. In this fashion, the use of a RAM that is slower than the processor doesn't unnecessarily slow the processor down.

The execution of the LOOP instruction operates to decrement the contents of general register R12. If the contents of R12 is non-zero, then a jump is initiated to the address specified in R13.

Alt 1, Alt 2, and Alt 3 are prefix instructions which set the above-mentioned flags in the status register so as to cause executed instructions to be interpreted in different fashions as indicated in the table below.

The PLOT instruction identifies the X and Y screen coordinates of the pixel to be plotted and plots the color specified by the COLOR instruction at screen location corresponding to the X and Y coordinates (as indicated in registers R1 and R2). The PLOT pixel instruction includes an automatic incrementation of the contents of R1 which assists in plotting horizontal lines at high speed and eliminates including an extra increment instruction.

If the Alt 1 flag is set then the plot instruction is interpreted as a READ PIXEL instruction (RPIX). By executing the read pixel instruction RPIX, the color of the pixel at the specified screen location is read which also may be used to flush unwanted pixel information from the plot hardware.

The read pixel instruction RPIX in essence uses the plot hardware in reverse to read from a matrix of a character to determine the color of a particular pixel that is specified in the instruction. The COLOR instruction provides to the color hardware, the color of the next pixel which may be defined by the contents of a specified source register.

The "CMODE" instruction sets the color mode and can be used to generate different special effects as demonstrated in the examples provided above. For example, a dithering effect can be generated using the CMODE instruction which alternates different colors in alternate pixels to produce a shading effect. The CMODE instruction can also be used to control transparency so that the display of a sprite will then block out the background display. The transparency is determined by the setting of a color mode related flag as shown in the above examples.

The instruction set also includes a fractional signed multiply which is used in calculations for rotating polygons to determine gradients or slopes of objects to be displayed.

The increment instruction, if used in conjunction with register R14, will initiate a read from ROM. The GETC instruction will take the byte accessed from ROM and load it into the color register.

The following table specifies an exemplary Mario chip instruction set in accordance with the presently preferred embodiment including those instruction which have been discussed above.

Instruction Set.

| Hex    | Mnemonic | Function |
|--------|----------|----------|
| $00    | STOP     | Stop mario chip and generate 65816 IRQ g = 0 |
| $01    | NOP      | 1 cycle no operation |
| $02    | CACHE    | Set cache base to pc & reset cache flags (only if pc is nor equal to current cache base) if cache base <> r15 then cache base = r15 reset cache flags |
| $03    | LSR      | Logical shift right DReg = SReg LSR 1 |
| $04    | ROL      | Rotate left with carry DReg = SReg ROL 1 |
| $05 nn sbyte | BRA | Delayed branch relative always r15 = r15 + signed byte offset |
| $06 nn sbyte | BGE | Delayed branch relative if greater than or equal if(s XOR v) = 1 then r15 = r15 + signed byte offset |
| $07 nn sbyte | BLT | Delayed branch relative if less than if (s XOR v) = 0 then r15 = r15 + signed byte offset |
| $08 nn sbyte | BNE | Delayed branch relative if equal if z = 1 then r15 = r15 + signed byte offset |
| $09 nn sbyte | BEQ | Delayed branch relative if nor equal if z = then r15 = r15 + signed byte offset |
| $0a nn sbyte | BPL | Delayed branch relative if positive if s = 0 then r15 = r15 + signed byte offset |
| $0b nn sbyte | BMI | Delayed branch relative if minus if s = 1 then r15 = r15 + signed byte offset |
| $0c nn sbyte | BCC | Delayed branch relative if carry clear if c = then r15 = r15 + signed byte offset |
| $0d nn sbyte | BCS | Delayed branch relative if carry set if c = 1 then r15 = r15 + signed byte offset |
| $0e nn sbyte | BVC | Delayed branch relative if overflow clear if v = 0 then r15 = r15 + signed byte offset |
| $0f nn | BVS | Delayed branch relative if overflow set |

-continued

| Hex | Mnemonic | Function |
|---|---|---|
| | sbyte | if v = 1 then r15 = r15 + signed byte offset |
| $10–$1f | TO r0 . . . r15 | (Prefix) set DReg to rn (destination register for next op) DReg = rn |
| if b: $20–$2f | MOVE WITH r0 . . . r15 | rn = SReg (No flags set) (Prefix) set DReg & SReg to rn (src & dest. & b flag) DReg = rn SReg = rn b = 1 |
| $30–$3b | STW (rn) | Store SReg at address in rn RAM[rn] = SReg (word lo/hi buffered) (Words on even addresses normally) |
| if alt1: | STB (rn) | Store low byte of SReg at address in rn RAM[rn] = SReg.1 (byte buffered) |
| $3c | LOOP | Decrement r12 and if r12 <> 0 then delayed jump to address in r13 r12 = r12 − 1 if r12 <> then r15 = r13 (TO/WITH/FROM ignored) |
| $3d | ALT1 | (Prefix) set alt1 flag alt1 = 1 |
| $3e | ALT2 | (Prefix) set alt2 flag alt2 = 1 |
| $3f | ALT3 | (Prefix) set alt1 & alt2 flags alt1 = 1 alt2 = 2 |
| $40–$4b | LDW (rn) | Load DReg from address in rn DReg = RAM[rn](word lo/hi waits) (Words on even addresses normally) |
| if alt1 | LDB (rn) | Load DReg (unsigned byte) from address in rn DReg.h = 0 DReg.l = RAM[rn] (byte waits) |
| $4c | PLOT | Plot pixel at r1, r2 (x, y) and increment r1 (N.B. r1 and r2 are not checked for being on screen, and will draw anywhere in RAM) plot(r1, r2) r1 = r1 + 1 |
| if alt1: | RPIX | Read colour of pixel at r1 · r2 (x · y) DReg = point(r1, r2) |
| $4d | SWAP | Swap bytes DReg.h = SReg.l DReg.l = SReg.h |
| $4e | COLOUR | Set PLOT colour plot colour = SReg |
| if alt1: | CMODE | Set PLOT colour mode plot colour mode = SReg |
| $4f | NOT | DReg = NOT SReg |
| $50–$5f | ADD r0 . . . r15 | DReg = SReg + rn |
| if alt1: | ADC | DReg = SReg + rn + c |
| if alt2: | ADD | DReg = SReg + #n |
| if alt1 + alt2: | ADC | DReg = SReg + #n + c |
| $60–$6f | SUB r0 . . . r15 | DReg = SReg − rn |
| if alt1: | SBC | DReg = SReg − rn − c |
| if alt2: | SUB | DReg = SReg − #n |
| if alt1 + alt2: | CMP | SReg − rn (zero, sign, carry, overflow) |
| $70 | MERGE | Merge high bytes of r7 and r8 into DReg DReg.h = r7.h DReg.l = r8.h Flags set on result: s = b15 OR b7 v = b14 OR b6 OR s c = b13 OR b5 OR v z = b12 OR b4 OR c |
| $71–$7f | AND r1 . . . r15 | DReg = SReg AND rn |
| if alt1: | BIC | DReg = SReg AND NOT rn |
| if alt2: | AND | DReg = SReg AND #n |
| if alt1 + alt2: | BIC | DReg = SReg AND NOT #n |
| $80–$8f | MULT r0 . . . r15 | DReg = SReg * Rn (signed 8 by 8 bit) |
| if alt1: | UMULT | DReg = SReg * Rn (unsigned 8 by 8 bit) |
| if alt2: | MULT | DReg = SReg * #n (signed 8 by 8 bit) |
| if alt1 + alt2: | UMULT | DReg = SReg * #n (unsigned 8 by 8 bit) |
| $90 | SBK | Store SReg back to last RAM address used |
| $91–$94 | LINK 1 . . . 4 | Link return address to r11 r11 = r15 + 1 . . . 4 |
| $95: | SEX | Sign extend low byte to word DReg.[b15 − b7] = SReg.[b7] DReg.l = SReg.l |
| $96 | ASR | Arithmetic shift right DReg = SReg ASR 1 |
| if alt1: | DIV2 | Divide by 2 with rounding DReg = SReg ASR 1 if DReg = −1 then DReg = 0 |
| $97 | ROR | Rotate right with carry DReg = SReg ROR 1 |
| $98–$9d | JMP r8 . . . r13 | Jump to address in rn r15 = rn (delayed branch) |
| if alt1: | LJMP | Long jump to address in rn (ROM Bank from SReg) and reset cache r15 = rn (delayed branch) Program ROM bank reg = SReg |
| $9e | LOB | Low byte DReg.h = 0 DReg.l = SReg.l |
| $9f | FMULT | Fractional signed multiply DReg = (SReg * r6) · hw (signed 16 by 16 bit multiply) c = (SReg) * r6) · b15 |
| if alt1: | LMULT | Long signed multiply DReg = (SReg * r6) · hw (signed 16 by 16 bit multiply) r4 = (SReg * r6)· lw c = (SReg) * r6) · b15 |
| $a0–$af nn | IBT r0 . . . r15, byte | Load rn with sign extended byte rn = immediate byte (sign extended) |
| if alt1: | LMS r0 . . . r15, sbyte | Load rn from absolute shifted byte address rn = RAM[byte << 1] (word data) |
| if alt2: | SMS r0 . . . r15, byte | Store rn to absolute shifted byte address RAM[byte << 1] = rn (word data) |
| $b0–$bf | FROM r0 . . . r15 | (Prefix) Set SReg = rn SReg = rn |
| if b: | MOVES | DReg = rn (zero, sign & overflow(sign lo byte) flags) |
| $c0 | HIB | High byte DReg.h = 0 DReg.l = SReg.l |
| $c1–$cf | OR r0 . . . r15 | DReg = SReg OR Rn |
| if alt1: | XOR | DReg = SReg XOR Rn |
| if alt2: | OR | DReg = SReg OR #n |
| if alt1 + alt2: | XOR | DReg = SReg XOR #n |
| $d0–$de | INC r0 . . . r14 | Increment rn rn = rn + 1 (TO/WITH/FROM ignored) |
| $df | GETC | Get byte from ROM buffer to PLOT colour |
| if alt1: | RAMB | RAM data bank reg = SReg |
| if alt1 +alt2: | ROMB | ROM data bank reg = SReg |
| $e0–$ee | DEC r0 . . . r14 | Decrement rn rn = rn − 1 (TO/WITH/FROM ignored) |
| $d | GETB | Get unsigned byte from ROM buffer to Dreg DReg = ROM buffer byte. zero extended |
| if alt1: | GETBH | Get from ROM buffer to high byte of Dreg DReg = ROM buffer byte. merge with low DReg = (SReg & $FF) + (byte << 8) (use WITH) |
| if alt2: | GETBL | Get from ROM buffer to low byte of Dreg DReg = ROM buffer byte. merge with high (use WITH) |
| if alt1 + alt2: | GETBS | Get signed byte from ROM buffer to Dreg DReg = ROM buffer byte. sign extended |
| $f0–$ff nnnn | IWT r0 . . . r15, word | Load immediate word to rn rn = immediate word (buffered) |

-continued

| Hex | Mnemonic | Function |
|---|---|---|
| if alt1: | LM r0 ... r15, word | Load in from absolute word address rn = RAM[word addr] (word data) |
| if alt2: | SM r0 ... r15, word | Store m to absolute word address |

FIGS. 6 through 17 show the block diagram depicted component parts of FIGS. 4A and 4B in further detail. In order to more clearly present the unique features of the present invention, circuit details which are believed to be conventional or apparent to those skilled in the art and which tend to obfuscate these unique features are not shown in the figures which follow.

Figure 6:
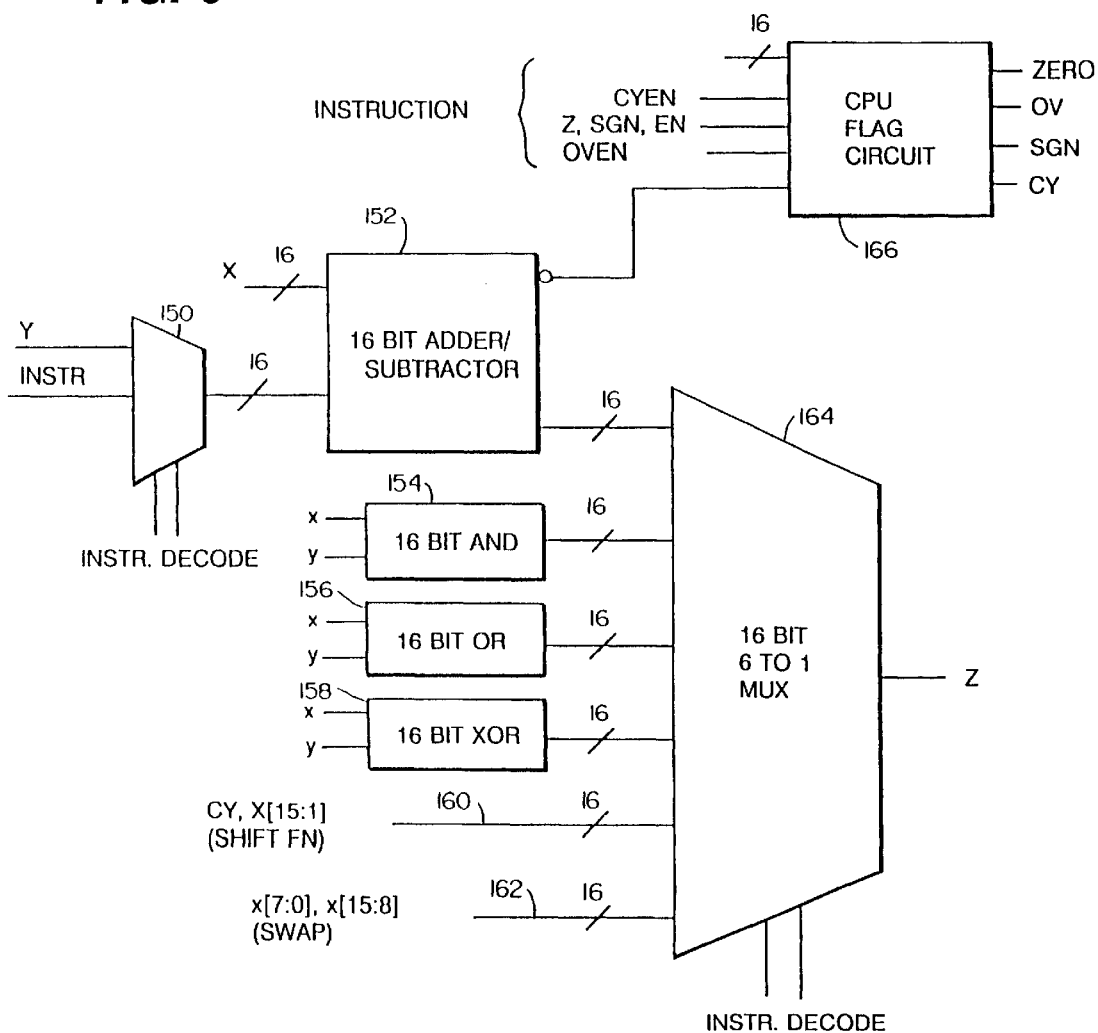
FIG. 6 is a more detailed block diagram of the arithmetic and logic unit shown in FIG. 4A.

An exemplary arithmetic and logic unit which may be used as ALU unit 50 is shown in FIG. 6. The ALU 50, as shown in FIG. 4A and FIG. 6, is coupled to X, Y, and Z buses. Thus, the Mario chip general registers R0 to R15 are coupled to the ALU.

The ALU 50 performs addition and subtraction functions via a 16 bit adder/subtractor 152. The ALU 50 also includes conventional "AND" logic circuitry 154, "OR" logic circuitry 156, and "EXCLUSIVE OR" logic circuitry 158.

The ALU also includes conventional shift function circuitry, in which any carry bit is shifted into the most significant bit position and the result coupled to one input of multiplexer 164 via line 160. Additionally, ALU 50 performs conventional byte swap operations whereby the least significant byte and the most significant byte carried on the bus may be swapped and the result coupled to multiplexer 164 on line 162. The X and Y buses are coupled to circuits 152, 154, 156 and 158 as shown in FIG. 6.

The output from each of the adder/subtractor 152, circuits 154, 156, 158, the shift output, and swap function output is coupled to the 16 bit, six input-to-one "result" multiplexer 164. Depending upon the instruction that is decoded, the appropriate result is output to the destination bus Z.

The adder/subtractor 152 in addition to receiving the 16 bits from the X bus also receives information being forwarded on the Y bus or the information in the instruction itself depending upon the instruction decoder input to multiplexer 150.

ALU 50 additionally includes a CPU flag generation circuit 166. The CPU flag circuit 168 generates zero overflow, sign, and carry signals for loading into at least one flag register within circuit 166. The CPU flags may be set from the instruction decoding circuit 60 which decodes the carry enable, zero enable, sign enable and overflow enable signals generated by instructions, which cause flags to be set depending upon the corresponding condition as determined by adder/subtractor 152. The flags may also be set based on the contents of the destination (or result) bus Z which are input to flag circuit 166. Flags are used, for example, to trigger conditional branching operations based on a wide range of conditions.

Figure 7:
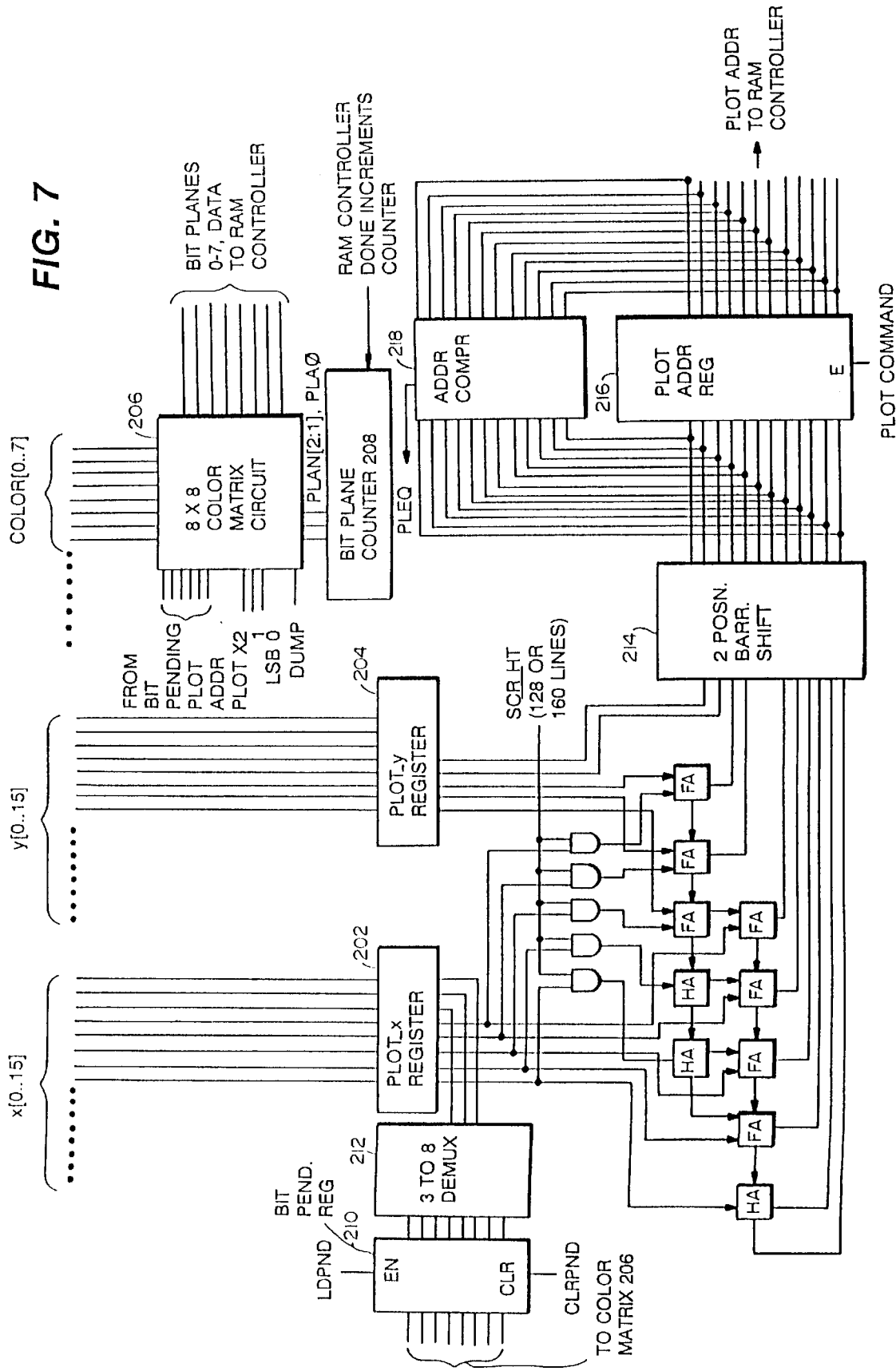
FIG. 7 is a more detailed block diagram of exemplary pixel plot circuitry of the type shown in FIG. 4A.
Figure 8C:
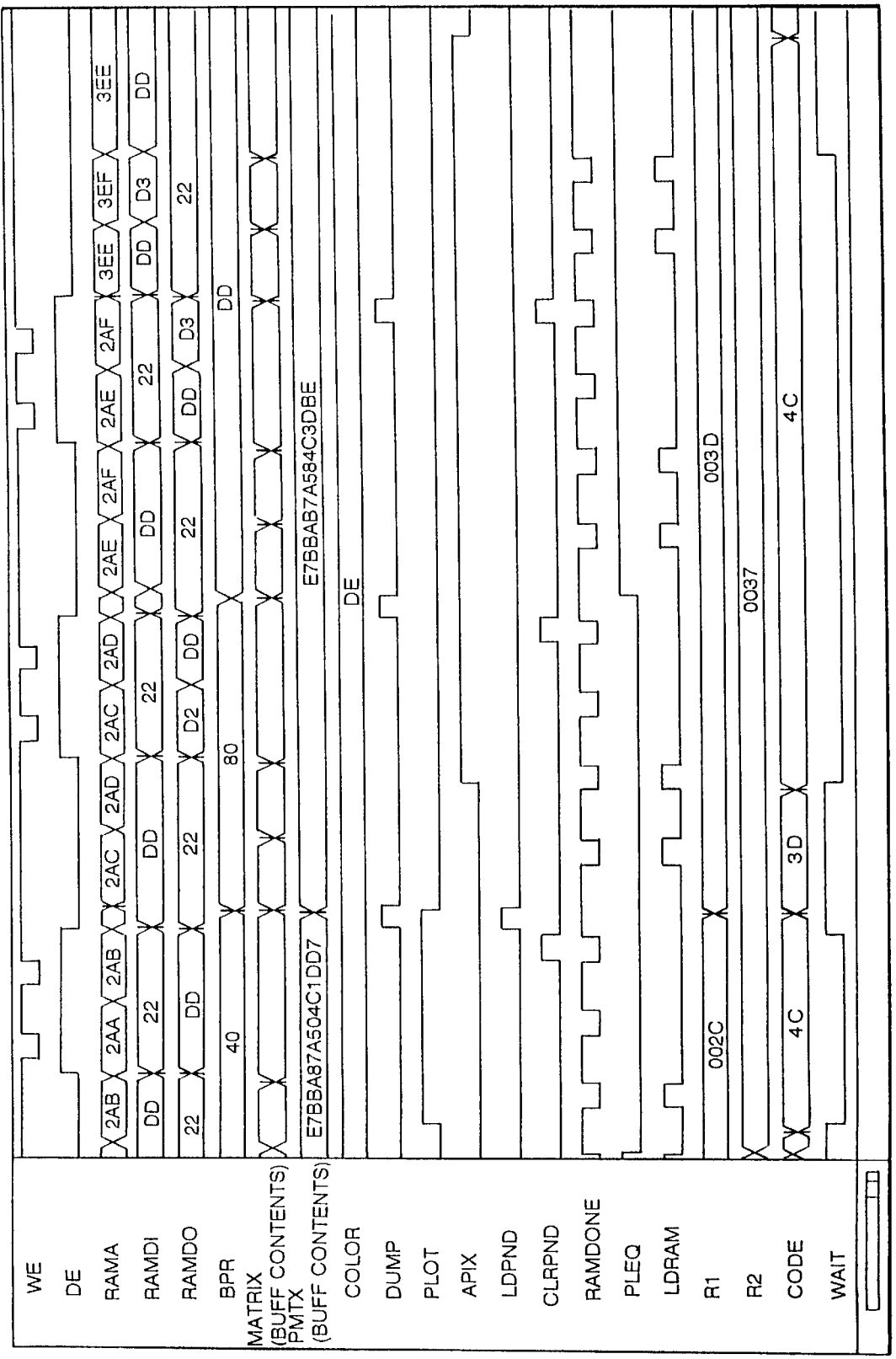
FIG. 8C depicts timing, control and data signals associated with the pixel plot circuitry.

FIGS. 7, 8A, and 8B shows the pixel plot circuitry (52, 54, 56, and 58) shown in FIG. 4A in further detail. This circuitry executes the PLOT command which takes a specified X coordinate and Y coordinate and plots a pixel at those screen coordinates in the color specified by the contents of the color register 54 which is loaded by a COLOR command.

As noted above, the Super NES utilizes a character mapped display screen. The plot hardware operates to convert pixel coordinate address data into character mapped address data.

The Super NES characters are defined in bit planes. Characters can have either 2, 4, or 8 bit planes for defining 4, 16, or 256 colors. Each byte of the character definition includes a bit plane of one pixel row of the character. The pixels are defined left to right, high bit to low bit. For a 256 color mode of operation, there are 8 RAM locations which need to be updated.

The pixel plot hardware includes a local buffering mechanism including a color matrix 206 which stores all the bits in a particular byte to be displayed since all such bits may ultimately need to be updated. A bit plane counter 208 is coupled to the color matrix circuit 208. The pixel coordinates are loaded into plot X and plot Y registers 202, 204 from the X and Y buses. In the present exemplary embodiment, general registers R1 and R2 are used as the plot X register 202 and the plot Y register 204 shown in FIG. 7. These registers receive the X and Y coordinates of the pixel to be plotted as specified by the PLOT command.

The plot X and plot Y registers 202, 204 are coupled to full and half adder based character address calculating circuitry which outputs on address to a 2 position barrel shifting circuit 214 which, in turn, is coupled to a plot address register 216 and an address comparator 218. The three least significant bits of the plot X register are coupled to demultiplexer 212 which, in turn, is coupled to a bit pending register 210.

Plot controller 200 shown in FIG. 8A receives signals indicating that a PLOT pixel (PLOT) or READ pixel (RPIX) command has been decoded as well as other control signals described below. Plot controller 200 generates plot circuit control signals used in the manner set forth below.

As indicated above, the plot control circuit 200 generates control signals utilized within the pixel plot hardware 52. As indicated in FIG. 8A, the pixel control circuit 200 receives the output from the bit pending register 210 which output is coupled to the pixel control circuit 200 through AND gate 201. If all eight bits of the bit pending register 210 are set, the pixel control logic 200 is informed that a reading cycle may be skipped and the information in the color matrix 206 may be written out to RAM.

The pixel control circuit 200 is also responsive to the PLOT command to initiate its operation. The pixel control logic 200 also responds to the READ pixel command RPIX to initiate virtually identical operations, except that new information is not written into the color matrix 206 for outputting to RAM. As noted above, the READ pixel command is executed if there is a need to know the color of a particular pixel on the screen and is also used to flush out the existing information in the color matrix 206.

The controller 200 also receives a RAM done control signal RAMDONE, which indicates that the RAM access has been completed. The RAM done signal, as noted above, is also used to increment the bit plane counter 208, which identifies a bit plane in the color matrix 206. The plot controller 200 also receives the PLEQ signal from address comparator 218, which indicates that there has been an address match and there is no need to write out the contents of the color matrix 206 to RAM, to thereby indicate that updating should continue with respect to the current color matrix contents. The plot controller 200 also receive the screen mode SCR.MD control signal which informs the plot controller 200 as to how many bytes must be read and written.

The plot control circuit 200 generates a dump control signal DUMP referred to in conjunction with FIGS. 7 and 8B which causes the contents of the color matrix 206 to be buffered in its second buffering section. The controller 200 additionally generates a clear bit pending register signal CLRPND and a load bit pending register control signal LDPND and couples such signals to the bit pending register 210. Additionally, the controller 200 generates the LDPIX and BPR control signals associated with the color matrix elements described in conjunction with FIG. 8B.

The decoding of the PLOT command by the instruction decoder and the PLOT signal input to the plot controller 200 initiates the generation of the load pending signal LDPND presuming that the pixel plot hardware is not otherwise busy. The LDPND signal is coupled to the bit pending register 210 to enable the loading of the data into the bit pending register 210 from the demultiplexer 212. The clear pending signal CLRPND is generated in response to the RAM done signal RAMDONE which indicates that the pending data has been written out to RAM. Thereafter, the bit pending register is freed for the next pixel plot information.

A timing diagram depicting the relationship between the signals received by the plot controller 200, various address and data signals, other related control signals and the plot controller generated output control signals described above are shown in FIG. 8C. Exemplary address value, data value, etc., are shown for purposes of illustration only.

The plot hardware 52 operates as follows. When the plot controller 200 determines that the plot hardware 52 is not busy, the contents of the color register 54 shown in FIG. 4A is loaded into a horizontal row of the 8 by 8 color matrix circuit 206. Color matrix 200 is loaded by rows and read out by columns. The contents of the color register 54 are updated by a COLOR command. The color register 54 is the register through which any subsequent PLOT command will load color data into the color matrix.

The vertical position in the color matrix 206 to which the color register bits are loaded is determined by the three least significant bits stored in the plot X register 202. Thus, the three least significant bits of the plotting address define a row of bits which is to be updated in the color matrix 206.

Bit pending register 210 is used to record which particular bits of the section of the screen character is being updated. The register 210 include 16 register flags which indicate that bits have been written into the associated portion of the screen. The bit pending register 210 is loaded in response to a signal LDPND and cleared by a signal CLRPND generated by the plot controller 210.

If a subsequent plot command is to be executed for updating the screen map in the same area, the operation for a given bit is repeated together with additional color data corresponding to a pixel which is loaded into the 8 by 8 color matrix 206. Another bit is then set into bit pending register 210 via the least significant bits of the plot address stored in the plot X register 202. A particular bit is loaded into the bit pending register 210 via a 3 to 8 demultiplexer 212 which is coupled to plot X register 202. If the pixel to be updated is more than 8 pixels away horizontally or if it occupies a different vertical position, then the data which has been written into matrix 206 must be read out to RAM 6 (or 8). The color matrix 206 is thereafter free to receive new color data. Until a subsequent plot command is received which requires writing to RAM, the current content of color matrix 206 is buffered within the pixel plotter hardware, e.g., within the color matrix 206.

When data from the color matrix 206 is written to RAM 6 or 8, address transformation calculations are made to convert the X, Y coordinate to a RAM address by using the logic gates, full and half adder circuits of the type shown in FIG. 7. The actual address calculation is to be made in accordance with the explanation and exemplary code set forth below. Such calculations will vary depending upon whether 4, 16, or 256 color mode is being used. Exemplary calculations are given for the 256 color mode.

These 256 color characters have 4 blocks of 16 bytes, each defining pairs of bit planes for a total of 64 bytes.

A bit map is constructed by placing a unique character on every position of the required screen area. When plotting in association with the Super NES, it is best to organize the characters in columns.
eg. (128 pixel high screen)
Char Numbers

| 0 | 16 | 32 | ... | ... |
|---|----|----|-----|-----|
| 1 | 17 | 33 | ... |     |
| 2 | 18 | 24 | ... |     |
| . | .  | .  |     |     |
| . | .  | .  |     |     |
| . | .  | .  |     |     |
| 15| 31 | 47 | ... |     |

The Super NES is not limited to 256 characters, so bit map size is mainly constrained by memory and DMA transfer time. The Mario chip is able to plot on, for example, 128 and 160 pixel high screens. The maximum screen width is 32 characters or 256 pixels.

The following algorithm exemplifies how pixel plotting is controlled using a virtual bit map organized in columns.

First Calculate a pixel mask for all bit planes, from least significant 3 bits of x coord.

| Pixel num. | Mask |
|------------|------|
| 0 | %10000000 |
| 1 | %01000000 |
|   | ... |
| 7 | %00000001 |

Next Calculate offset down column using y coordinate with low 3 bits removed, to give characters down column, & then multiply by size of character.

| Screen colors | Character size in bytes |
|---------------|------------------------|
| 4   | 16 |
| 16  | 32 |
| 256 | 64 |

Next calculate offset of top of character column from x coordinate with low 3 bits removed, multiplied by column size. Column size is number of characters in column multiplied by character size.

| | Normal column size | | |
|---|---|---|---|
| | Chars high | | |
| | 16 | 20 | |
| 4 colors | 256 byte | 320 byte | |
| 16 | 16 | 512 byte | 640 |
| 256 | 1024 byte | 1280 byte | |

The low 3 bits of the y coordinate give byte offset down the character. The total of all offsets plus pointer to current bit map gives address of byte holding first bit plane of pixel. Following bit planes are alternately 1 byte on, then 15 bytes on from the last. Pixel bits can then be set or cleared using the pixel mask. The bit in each bit plane is set or cleared to the state of the corresponding bit in the color number stored in the color register 54 required for the pixel.

EXAMPLE CODE

```
;Plot on 4 bit planes in 65816 code, as used in our game
demo.
;The routine is mostly table driven.
;Registers A,X and Y are 16 bit.
SetColour
;Get colour and double
        lda     Colour
        asl     a
        tax
;set colour mask for bit planes 0 and 1
        lda     mask1tab,x
        sta     mask1
;set colour mask for bit planes 2 and 3
        lda     mask2tab,x
        sta     mask2
        rts
Plot
;Get horizontal & vertical coords
;double both and move to Y & X rags
        lda     plotx1
        asl     a
        tay             ;Y is x coord * 2
        lda     ploty1
        asl     a
        tax             ;X is y coord * 2
;Get offset down column
        lda     pyoftab,x
;Add start of column offset
        clc
        adc     pxoftab,y
;Add double buffer pointer (select bitmap)
        clc
        adc     drawmap
        tax
; X is offset of word holding required pixel from
bitmapbase.
; Y is x coord of pixel * 2
;Do bit planes 0 and 1
        lda.l   bitmapbase,x    ;get word holding pixel
        and     pbittabn,y      ;mask out old pixel colour
        sta     pmask
        lda     mask1           ;Mask colour and
        and     pbittab,y       ;pixel mask together
        ora     pmask           ;join with other pixels
        sta.l   bitmapbase,x    ;store to bitmap
;Do bit planes 2 and 3
        lda.l   bitmapbase+16,x
        and     pbittabn,y
        sta     pmask
        lda     mask2
        and     pbittab,y
        ora     pmask
        sta.l   bitmapbase+16,x
        rts
;256 word table of pairs of pixel bit masks
pbittab
        rept 32         ;num_col
        dw      $8080, $4040,$2020,$1010,$0808,$0404,$0202,$0101
        endr
;table above with words inverted
pbittabn
        rept 32         ;num_col
        dw      $7f7f,-$4040,-$2020,-$1010,-$808,-$404,-$202,
-$101
        endr
;colour masks for bit planes 0 & 1 (colours 0 to 15)
mask1tab
        dw      $0000,$00ff,$ff00,$ffff,$0000,$00ff,$ff00,$ffff
        dw      $0000,$00ff,$ff00,$ffff,$0000,$00ff,$ff00,$ffff
;colour masks for bit planes 2 & 3 (colours 0 to 15)
mask2tab
        dw      $0000,$0000,$0000,$0000,$00ff,$00ff,$00ff,$00ff
```

EXAMPLE CODE -continued

```
        dw      $ff00,$ff00,$ff00,$ff00,$ffff,$ffff,$ffff,$ffff
col_size equ    Number_char_rows * 8 * Number_bit_planes
;                       (16)        (4)
;Offset to start of char column table
pxoftab
temp =  0
        rept 32         ;number of char columns
        dw      temp,temp,temp,temp,temp,temp,temp,temp
temp -  temp+col_size
        endr
;Offset down column table
pyoftab
temp =  0
        rept 16         ;Number of char rows
        dw      temp
        dw      temp+2
        dw      temp+4
        dw      temp+6
        dw      temp+8
        dw      temp+10
        dw      temp+12
        dw      temp+14
temp =  temp+32
        endr
```

Turning back to FIG. 7 in more detail, the X and Y coordinates on the screen defining the position of the pixel to be plotted is loaded into PLOT X and Y registers 202 and 204 (which registers may actually be the R1 and R2 registers in register block 76). The least significant three bits of the plotting address loaded into the PLOT X register 202 define which bit within a bit plane byte is to be written to by the specified X and Y coordinate. The contents of the accumulator R0 is loaded to the column of the color matrix 206 selected by the least significant bits of plot X register 202.

If the plot X register 202 is 0, then the least significant bit will be updated in each of the 8 bits defining the pixel. With plot X register 202 being 0, the 3 to 8 demultiplexer 212 will set the least significant bit and in the bit pending register 210 to a logical "1".

The bit pending register 210 is utilized by the RAM controller 88 to indicate gaps which do not need to be written out from RAM since the corresponding bits in bit pending register 210 indicate that no modification is required.

The bit pending register 210 operates as a pixel mask buffer to prevent overwriting new data from RAM, if such new data is not desired. In order to perform this function, the contents of the bit pending register 210 as indicated in FIG. 7 is coupled as an input to the color matrix circuit 206.

If the BIT_PENDING register 210 is zero, the screen address of the pixel is computed, and loaded into the a plot address register 216 and the pixel position within the byte is used to set the same bit in the BIT_PENDING register 210. If the BIT_PENDING register 210 is non-zero, then the BUSY flag is set.

If the new computed address equals the contents of the PLOT_ADDR register 216, then the new pixel bit position is set within the BIT_PENDING register 210 and the BUSY flag is reset.

If the new address differs from the contents of the PLOT_ADDR register, then the following steps are taken:
Step 1 If the BIT_PENDING register 210 contains FFh then go directly to step 3.
Step 2 Read byte from RAM at PLOT_ADDR+scr. base into a temporary data buffer, PLOT_BUFF.
Step 3. If the bits in the data buff masked by the BIT_PEND register 210 are all equal to row 0 of the PLOT_COLOR register array, then go straight to Step 5.

Step 4. Write row 0 of the PLOT_COLOR register array into all the bits in PLOT_BUFF enabled by the BIT_PENDING register. Write data_buff back to RAM at PLOT_ADDR.

Step 5. Do the same operation (PLOT_ADDR+1) and row 1 of the PLOT_COLOR register array.

Step 6. If a or 256 color mode, do the same operation on (PLOT_ADDR+16) and row 2 of the PLOT_COLOR register array.

continue until all color bits are updated.

The contents of the plot X and plot Y register 202, 204 are processed by the full adder and half adder circuitry represented in FIG. 7. The configuration of full and half adders FA and HA and the associated logic circuitry have been simplified for the purposes of the FIG. 7 block diagram. The address calculation may be accomplished as follows:

Address=$scr\_base+2* y[0 \ldots 2]+(y[3 \ldots 7]+x[3 \ldots 7]*16+ ((x[3 \ldots 7]*4)$ && $scr\_ht)*char\_siz$.

The middle term is:

|     |     |     |     | y7 | y6 | y5 | y4 | y3 |
|-----|-----|-----|-----|----|----|----|----|----|
|     |     | x7  | x6  | x5 | x4 | x3 | 0  | 0  |
| x7  | x6  | x5  | x4  | x3 | 0  | 0  | 0  | 0  |
| px9 | px8 | px7 | px6 | px5 | px4 | px3 | px2 | px1 | px0 | to thereby generate a 10 bit partial result px[0 . . . 9]; using, for example, 6 full adders and 4 half adders.

This result is fed into a 12×3 way multiplexer controlled by the char_size value in order to shift the partial result into the correct precision for the screen mode selected. This combined with the y lower bits y[0 . . . 2] forms a 16 bit screen address. To complete the address calculation, this is then added to the screen_base value scr[9 . . . 22] which allows the screen to be placed on 1 k boundaries.

This address is then coupled to a two position barrel shifter 214 which operates to multiply the address information input thereto by 1 or 2 or 4 to correspond to whether 4, 16, or 256 color resolution has been selected.

The output of the shift circuit 214 is coupled to a plot address register 216 which serves as a buffer storage for the RAM address. The address needs to be buffered since after the plot command is executed, the contents of registers R1 and R2, i.e., plot X and plot Y registers, may change.

The address comparator 218 compares the new address determined by the plot hardware as output from shift circuit 214 with the old address stored in the plot address register 216. If the address is different, then the address must be written out to RAM. The address comparator 218 generates a control signal PLEQ (which is coupled to plot controller 200) if the plot address stored in address register 216 is equal to the output of shifting circuit 214.

Turning back to the color matrix 206, as noted above, color matrix 206 is read out in columns. A bit plane counter 208 is coupled to the color matrix 206 and defines which column is to be read out. The bit plane counter 208 is coupled to RAM controller 88 and when a RAM operation is completed, the RAM controller 88 generates a signal which increments bit plane counter 208.

Color matrix 206 includes an array of elements such as the one shown in FIG. 8B. There are 64 such elements in one matrix element of the 8 by 8 matrix 206. When the plot command is decoded, controller 200 couples instruction control signal LDPIX to latch 220 to enable the latch to be loaded with color data COL from the color register 54. The generation of the control signal DUMP by controller 200 indicates that the first level of buffering within the color matrix 206 is completed and the data needs to be output to the screen. Once the DUMP signal is generated, the data stored in latch 220 is coupled to gating circuitry 226 and to latch 228. When the DUMP signal is actively coupled to gating circuitry 226, that gating circuitry couples the data to latch 228. At the same time, gate 224 is deactivated, which in turn prevents the feedback loop from the non-inverting output of latch 228 from maintaining storage of the previous stored data.

When data is read in from RAM to fill in data gaps, control signal BPR provides a zero input to gate 222 and the LDRAM signal will be in a zero state. Under these conditions, data input from the RAMD input will pass through the gating circuitry 226 into latch 228. The data in latch 228 is then available for reading out to the RAM data bus via the RAM controller 88 as shown in FIG. 7. Other such elements are combined to convert the pixel data as indicated by the X, Y pixel identification to character data compatible with the Super NES character format.

Figure 9:
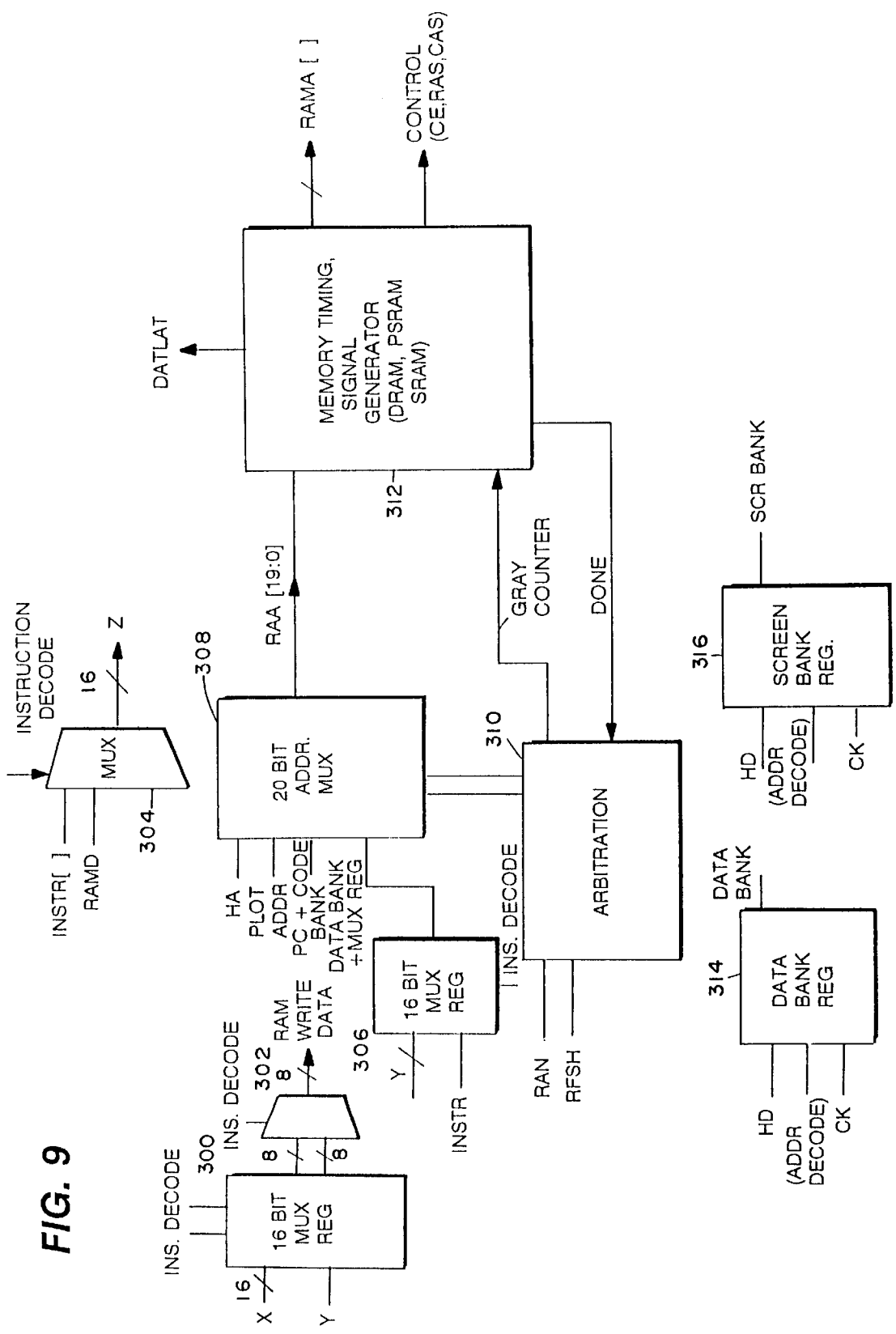
FIG. 9 is a more detailed block diagram of the RAM controller shown in FIG. 4A.

The RAM controller 88 shown in detail in FIG. 9 generates various control signals associated with accessing the game cartridge RAM(s). The cartridge RAM(s) must be shared between the Super NES, the plot hardware 52 within the Mario chip, and the data fetches from the Mario chip programs which are executed. The RAM controller 88 serves to insure that the appropriate address is sent to the RAM address bus at the appropriate times. The generation of RAM accessing signals at the appropriate time is controlled in part by arbitration logic 310 which is shown in further detail in FIG. 10.

The RAM controller 88 includes a multiplexer 304 which multiplexes between an input from the RAM data pins via the RAM D data bus and the instruction bus. The instruction bus or the RAM data bus is selected in response to signal received from the instruction decoder 60 and the appropriate RAM output is placed on the destination Z bus.

The RAM controller 88 also includes a 16-bit data register 300 which is reserved for data writes to RAM received from either the 16 bit X bus, or the 16 bit Y bus under the control of signals received from the instruction decoder 60. The data loaded into the data register 300 is divided into a low byte and a high byte and coupled to RAM data pins Via multiplexer 302 which outputs the low or high byte in response to a signal received from instructions decoder 60.

RAM controller 88 also includes a 20-bit address multiplexer 308. Multiplexer 308 selects an address input in response to a control signal received from arbitration circuit 310 which is derived from the code acknowledge CACK, data acknowledge DACK, or plot acknowledge PACK signals generated in the arbitration circuit 310. Address signals from the Super NES address bus HA are received by multiplexer 308 and are coupled to the RAM address bus, via memory timing signal generator 312, whenever the Mario "owner" status bit is set to a zero. The arbitration circuit 310 is informed of the status of the Mario chip RAM ownership via the signal RAN coupled to arbitration circuit 310 which also receives a RAM refresh control signal RFSH. The RAN and RFSH signals are "OR"ed together to form the "SUSPEND" signal shown in FIG. 10.

The address multiplexer 308 also receives an address input from the 16-bit multiplexer register 306. Multiplexer register 306 receives either the contents of the Y bus or the contents of the instruction bus depending upon a select signal generated by instruction decoder 60. Multiplexer 308 also receives the output of the data bank register 314 as an address input together with the contents of the program counter PC as shown in FIG. 9. The screen bank register 316 output is used to form the most significant bits of the plot address input to multiplexer 308, the least significant bits being input from the plot circuitry of FIG. 7. Both the screen bank register 316 and the data bank register 314 are loaded with data from the host data bus ED and are addressable by the host CPU. These registers, while shown in FIG. 9, are not necessarily embodied in the RAM controller 88 itself, but rather their contents are coupled to the RAM controller. The data bank register 314 may, for example, be in the ROM controller 104 described below and the screen bank register may be, for example, embodied in the plot hardware 52.

The multiplexer 308 input signal to be output is selected as follows. If the code acknowledge signal CACK is generated, then the code bank and program counter PC input is selected. If the data acknowledge signal DACK is generated, then the data bank plus multiplexer register input is selected. If the plot acknowledge signal PACK is present, the the plot address is selected. Finally, if neither then CACK, DACK or PACK signals are present, then the host (e.g., SNES) address input is selected.

The 20 bit address output of multiplexer 308 is coupled to memory timing signal generator 312 which couples these address signals to RAM 6, 8 at the appropriate time. The memory timing signal generator 312 receives the output from a gray counter in arbitration block 310. The memory timing signal generator 312 decodes the output from the gray counter and generates output signals for addressing RAM 6, 8 shown in FIG. 1 via the RAM address bus RAMA. Alternatively, timing signal generator 312 will generate control signals for accessing RAM 6, 8 including row address strobe RAS, column address strobe CAS, and write enable WE signals, as shown in FIG. 1.

Figure 9A:
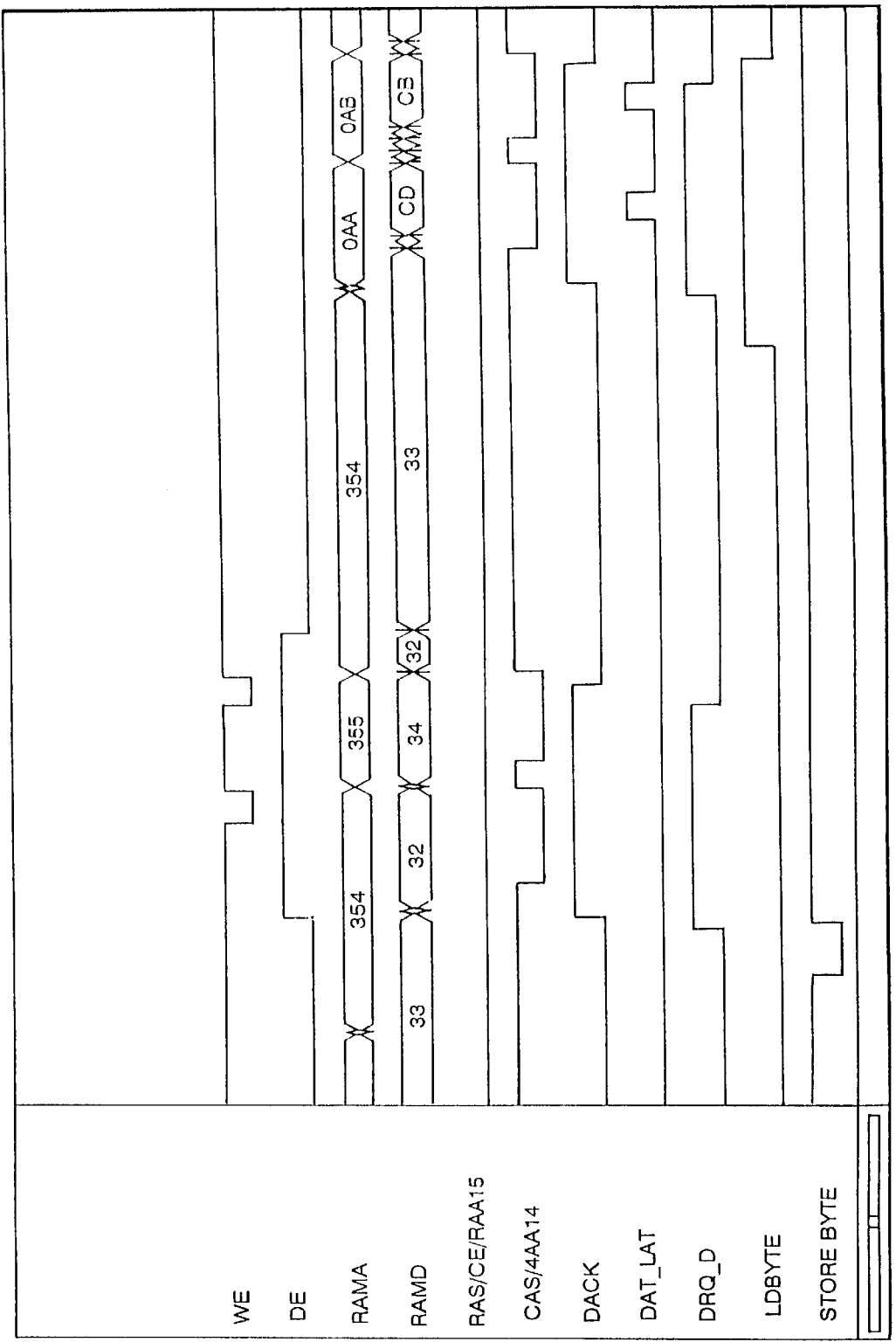
FIG. 9A shows exemplary timing, control and data signals associated with the RAM controller shown in FIG. 9.

The memory timing signal generator 312 generates a DONE signal which is fed back to arbitration logic 310 to indicate that the RAM cycle has been completed. The memory timing signal generator 312 also generates a data latch signal DATLAT which operates to latch data coming from the external RAM into data latches (not shown) in the RAM controller 88. Data from RAM is then coupled to the Mario chip circuitry via, for example, the RAM data bus RAMD_IN. The RAM A address signal output from timing signal generator 312 is coupled to any static RAM on the game cartridge. The control signals CES, RAS and WE are generated, if dynamic RAM is used in the game cartridge. The static or dynamic RAM signals will be appropriately generated depending upon the configuration of the Mario chip, as indicated by the option resistor settings described above. Exemplary timing signals generated by timing signal generator 312 and other related signals are shown in FIG. 9A. The exemplary address and data values shown are set forth for purposes of illustration only. The RAM DONE signal is shown in FIG. 5C.

Figure 10:
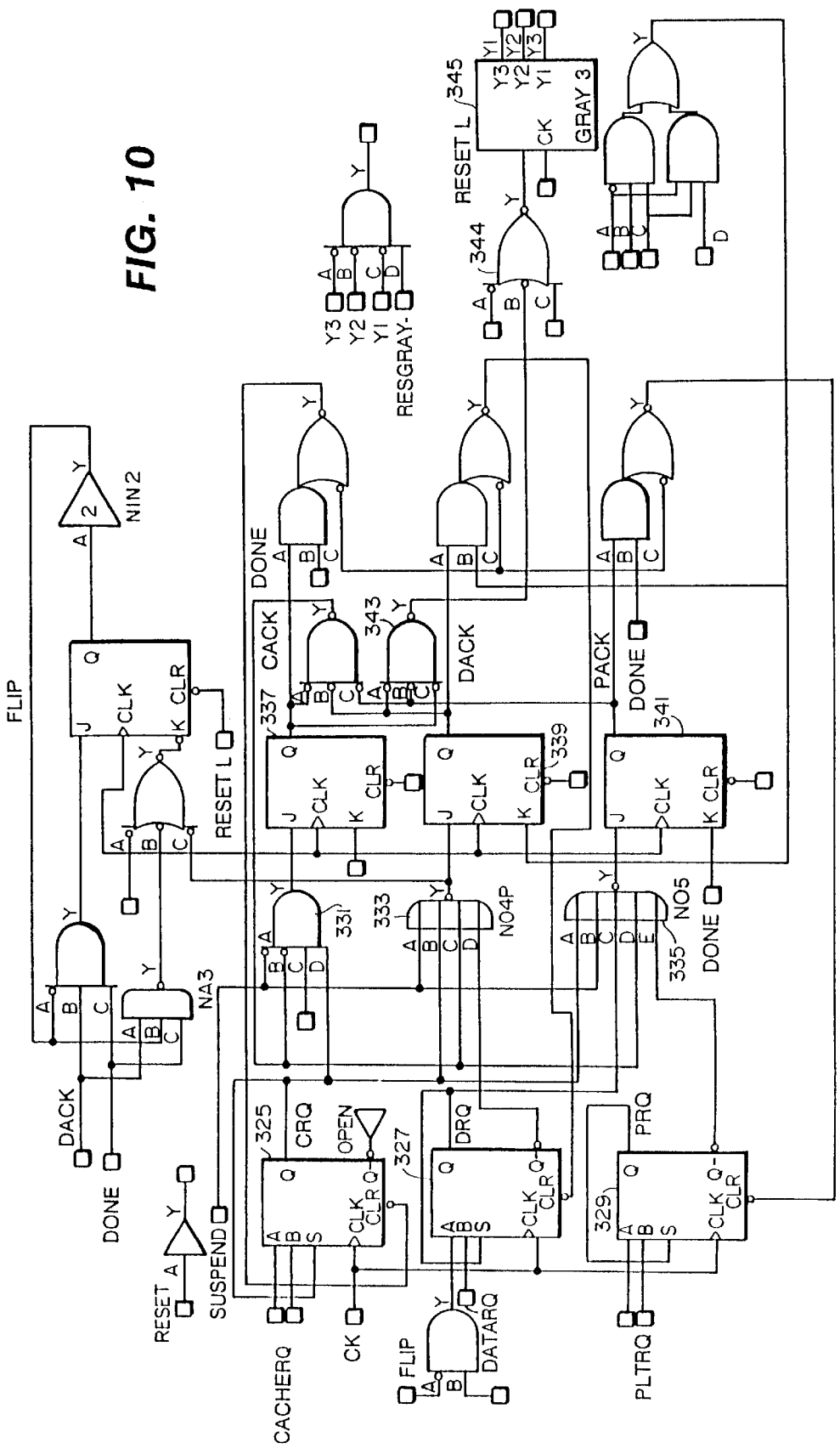
FIG. 10 is a circuit diagram illustrating the arbitration logic shown in FIG. 9.

The generation of RAM accessing signals at the appropriate time is controlled in part by arbitration logic 310. As shown in FIG. 10, arbitration logic 310 receives memory access input related signals CACHE request CACHERQ, data request DATRQ and plot request PLTRQ. Each of these input signals are temporarily stored in latches 325, 327, 329, respectively. If a Mario instruction is to be executed out of RAM or ROM, the process is initiated by the receipt of a CACHE request signal CACHERQ which is used in the context of FIG. 10 to confirm that the instruction is not being executed out of CACHE RAM and therefore must be executed out of RAM or ROM. Thus, the CACHE request CACHERQ signal indicates that the instruction can not be executed out of CACHE 94. The data request signal DATARQ is generated as a result of decoding an instruction requiring RAM access (e.g., the load byte, load word instructions). Additionally, the arbitration logic 310 receives a plot request signal PLTRQ which is generated by the plot controller 200 in response to the decoding of a plot command.

The arbitration logic 310 is only enabled (as indicated by a status register SUSPEND mode bit being in a "O" state) when the Mario chip is running and when the Mario owner bit is set. After receipt and storage of the CACHE request, data request, and plot request signals, latches 325, 327, and 329 generate CRQ, DRQ and PRQ signals, respectively. Gates 331, 333 and 335 receive these signals from the respective latch non-inverting output and establish the priority for these signals. In this regard, the CACHE request signal has the highest priority, the data request the second highest priority and the plot request signal has the lowest priority. The CACHE request signal is assigned the top priority since it indicates that an attempt has been made to execute an instruction out of CACHE and that it is necessary to access the instruction from RAM. The gating circuits 333 and 335 operate to ensure that a lower priority request does not operate to set latches 339 and 341, if a higher priority request has already set its respective latch. The latches 337, 339, 341 can only be set if the system is not in SUSPEND mode since the SUSPEND mode signal is input to each of gates 331, 333, 335. The SUSPEND mode signal will be at a low logic level state when the Mario chip owns, i.e., has free access to, RAM. The latches 337, 339 and 341 cannot be set if SUSPEND is set to "1" nor when any of the acknowledge latches 337, 339 and 341 are already at "1" (i.e., a cycle is already in progress). The gates 331, 333 and 335 establish the priority of RAM access. The Data acknowledge latch 339 will not be set if the CACHE REQUEST latch 337 is set, nor will the Plct acknowledge latch 341 be set if either CACHE or DATA request latches are set.

The cache acknowledge signal CACK is generated as soon as latch 337 is set by the cache request signal and as soon as it established by the logic circuitry in FIG. 10 that the CACHE 94 (or RAM) is available. The data acknowledgement signal DACK and plot request acknowledgment signal PACK are likewise generated to acknowledge the data request and plot request signals if the logic circuitry in FIG. 10 determines that the RAM is not otherwise busy.

The non-inverting output of latches 337, 339, and 341 are coupled to gating circuit 343 which in turn, via NOR gate 344 resets gray counter 345 which generates timing signals for RAM accesses. It will be appreciated by those skilled in the art, that a gray counter is a counter where only one output bit changes at one time, which conveniently may be used to control RAM access time.

A DONE signal generated by timing signal generator 312 is received by NOR gate 344, and latches 337, 339, 341. The DONE signal indicates that a RAM cycle has been completed. The generation of the DONE signal triggers the clearing of the appropriate latch in the arbitration logic 310 to clear the request that has been latched. The DONE signal is also coupled to the originating circuit, e.g., the cache controller 68 or plot controller 52, to indicate that the RAM access has been completed.

In accordance with an alternative embodiment of the present invention, the Mario chip may use a dual clocking system. Thus, Mario chip processor need not be driven by the same clock which drives, for example, the RAM controller circuitry identified above. The RAM controller 88 may, for example, be driven by the 21 MHz clock signal received from the Super NES and the Mario chip processor may be driven by another variable frequency clock. In this fashion, the Mario chip processor will not be constrained to operate at 21 MHz clocking rate.

Figure 11:
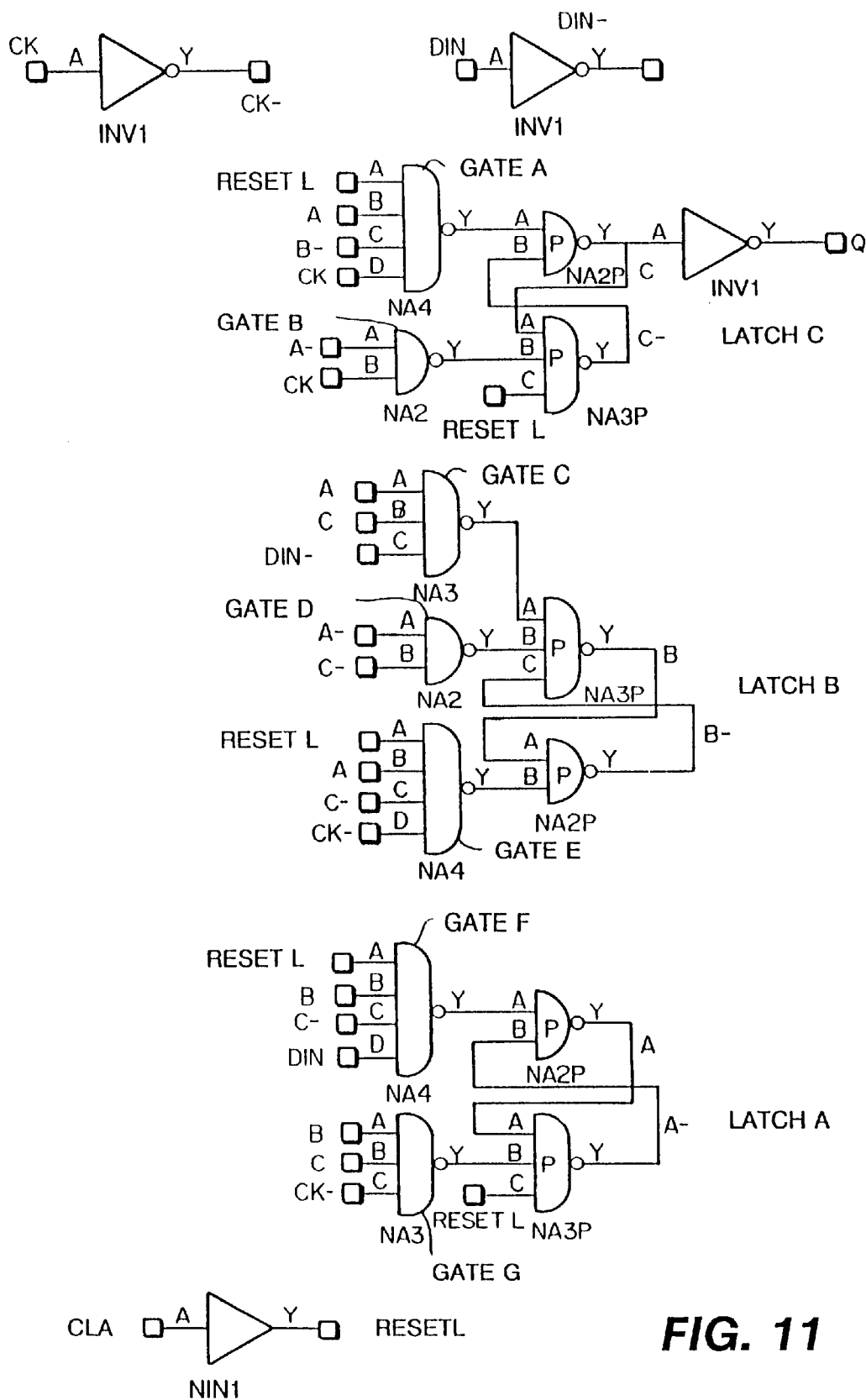
FIG. 11 is a diagram of resynchronizing circuitry in an exemplary embodiment of the graphics coprocessor of the present invention.

The Mario chip in accordance with this exemplary embodiment may use an asynchronous state machine control circuit such as that shown in FIG. 11 for performing a resynchronizing dual clock interfacing function. The FIG. 11 circuitry may be used to interface with Mario chip processor if it is implemented using a different clocking system than a memory controller operating at another clocking rate.

The resynchronization circuit shown in FIG. 11 receives an incoming clock signal DIN which is not synchronous with a clock signal CK. The resynchronizing circuitry generates a signal from DIN which is synchronous with CK, whether DIN is of higher or lower frequency than the clock rate CK.

As exemplified in FIG. 12, in response to the signal DIN, the circuitry shown in FIG. 11. Transitions through states 010, 110, 100, 101, 111, and back to the initial state 010. The FIG. 11 resynchronization circuitry may be employed in any interface circuit receiving dual clock signals such as ROM controller 104 and RAM controller 88.

The circuit shown in FIG. 11 responds to the incoming signal DIN by switching from its idle or reset state "010" to form state "110" due to latch A being set by gate F. As soon as the resynchronizing clock CK goes low (which may already be true), latch B is reset by Gate E forming state "100". When the clock goes high again, latch C is set forming state "101" by Gate A.

Latch C generates the output from the circuit as indicated at Q in FIG. 11. When the input signal goes low again, latch B is set again by Gate C forming state "111". When the clock CK goes low again after reaching state "111", then latch A is reset by Gate G forming state 011. Thereafter, clock CK goes high again and latch C is reset by Gate B returning the state machine to its idle state, then the output becomes inactive.

Figure 13:
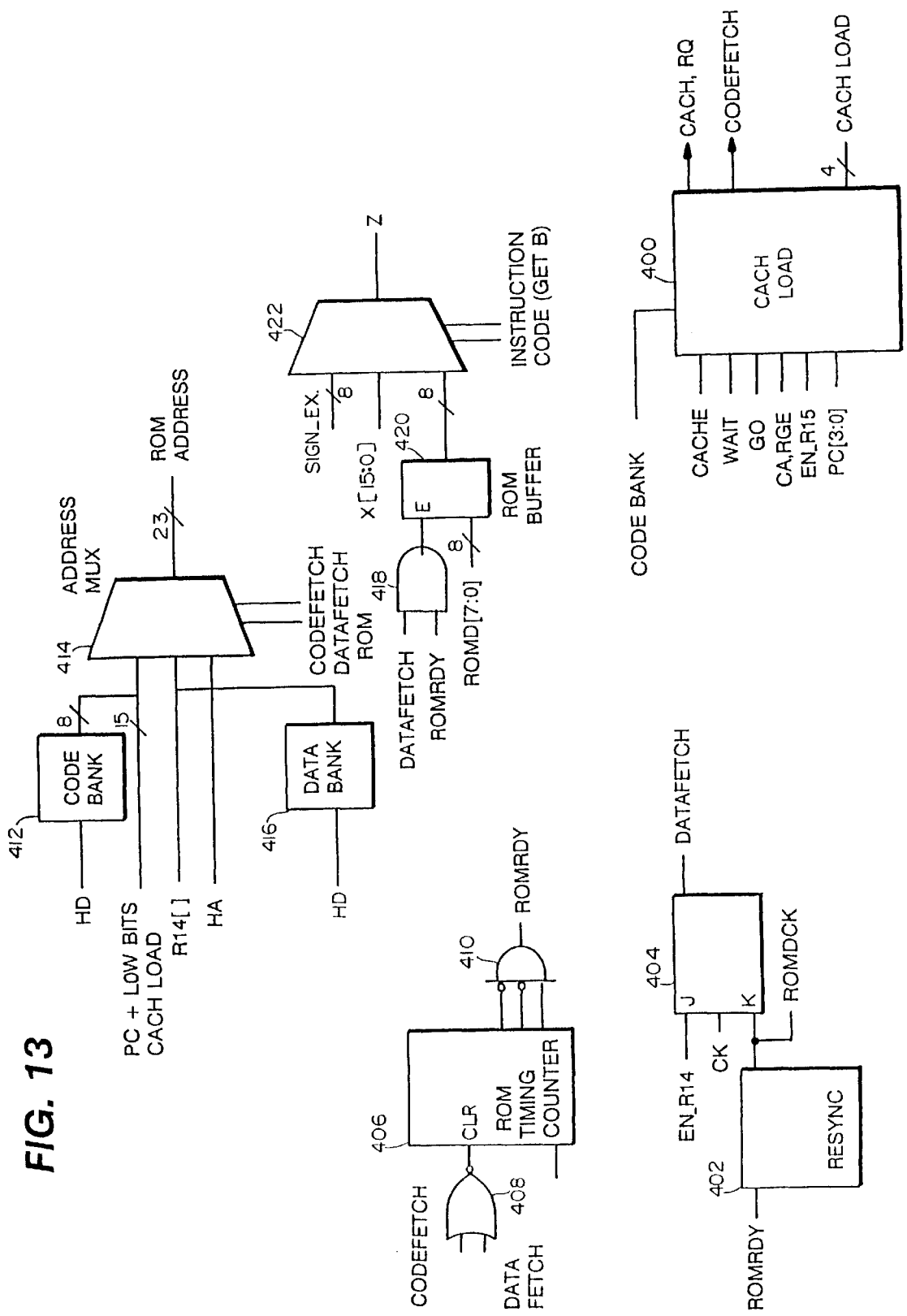
FIG. 13 is a more detailed block diagram of the ROM controller of the graphics coprocessor of the present invention.

FIG. 13 shows the FIG. 4B ROM controller 104 in further detail. The ROM controller 104 includes a cache loader 400 which controls in part the loading of the Mario chip cache RAM 94 with currently executing program instructions stored in ROM 10 or in the cartridge RAM. Instructions are loaded into cache RAM 94 in 16-byte groupings. When a jump instruction is encountered, in the middle of a 16 byte segment, a complete 16-byte segment must nevertheless be continued to be filled before the jump may be executed. The CACHE load circuit 400 includes a 2-bit state machine which responds to the decoding of the jump instruction by ensuring that the remaining bytes of the 16 byte CACHE segment are loaded into cache RAM 94. The first state of the cache loading logic state machine is the idle state which is true if either program execution is outside the range of cache or if the program data has already been loaded into cache. The second states indicates that the loading of cache and the executing the instructions from the cartridge ROM or RAM are occurring at the same time. The third state is triggered by the decoding of the jump instruction which state remains in effect until all the bytes in the 16 byte cache segment has been loaded. The fourth state is encountered when the jump is executed and the jump falls on an address which does not precisely correspond to a cache 16 byte boundary in which case the cache is filled from the beginning of the boundary to the part of the 16 byte segment corresponding to the address to which the program has branched.

The cache controller 68 shown in FIG. 4B generates a CACHE signal which is input to cache loader 400 and which indicates that the requested instruction is not presently available in the cache RAM 94. Accordingly, the instruction must be fetched from ROM. The code bank signal identifies the most significant three bits of the address to be accessed and indicates whether the program ROM or the RAM is to be accessed. Cache loader 400 also includes a counter (not shown) which during program execution maintains a count corresponding to the least significant bits of the program counter PC. This counter is loaded via the PC input of cache loader 400.

The cache load circuitry 400 in the ROM controller 104 also receives WAIT and GO control signals which indicate that the Mario processor is not being held in the WAIT state for any reason and that the Mario chip is in the "go" or "running" mode. Under such circumstances the cache loading circuit 400 generates a CODEFETCH control signal which is coupled to NOR gate 408 shown in FIG. 13, which, in turn, is coupled to the clear input of ROM timing counter 406. When cache load circuit 400 generates a code fetch signal CODE FETCH, logic circuitry within the ROM controller 104 initiates a code fetch on a higher priority then the data fetch as this code fetch must be initiated prior to data fetch. Arbitration circuitry incorporating priority logic such as shown in conjunction with FIG. 10 may be used to enable the generated signal to be given a higher priority than the DATA FETCH.

When the clear signal is removed from the ROM timing counter 406, a count cycle is initiated. ROM timing counter 406 is used to generate the ROMRDY timing signal which indicates that ROM data is available at ROM data pins, which signal is output from gating circuit 410.

The ROM data ready signal ROMRDY gating is coupled to the resynchronization circuit 402, which may, for example, comprise the resynchronization circuitry described above in FIG. 11. After synchronization is obtained with the processor clock, signal ROM DCK is generated to reset latch 404 and to generate a DATAFETCH signal indicative of a data fetch triggered by the accessing of register R14 which results in the EN_R14 signal. The DATAFETCH signal is generated when ROM timing counter 406 has reached a predetermined count to ensure that data is available at ROM data pins.

The ROM controller shown in FIG. 13 generates a ROM address at the output from multiplexer 414 which selects address information from one of the following inputs. The code bank register 412 is loaded from the Super NES data bus HD to define from which ROM program bank the Mario code is to be executed. The code bank register 412 provides 8 bits of a 23 bit ROM address to multiplexer 414. The least significant bits of the ROM address are obtained from the contents of the program counter PC. When data is being written into cache RAM, the least significant 4 bits from the CACHE LOAD signal are generated by cache load 400. An additional multiplexer 414 address input is generated from the contents of Mario general register R14 whenever register R14 is accessed.

The accessing of register R14 results in the data fetch latch 404 generating a DATAFETCH signal which is utilized as a control input for causing multiplexer 414 to select its R14 input (and the contents of the data bank register 416 which is loaded from the Super NES data bus HD). The data bank register 416 contains the most significant bits of the data bank associated with an R14 fetching operation.

The DATA FETCH signal additionally is coupled to gate 408 which will initiate counting by the ROM timing counter 406 which, in turn, generates a ROM ready signal ROMRDY via gate 410. When the ROMRDY signal is generated, data is available from the ROM data bus ROM D[7:0].

The address multiplexer 414 also receives a ROM address from the Super NES address bus HA. The Super NES address bus will be selected depending upon the state of the signal "ROM" which is coupled to multiplexer 414 control inputs. The "ROM" control signal indicates to the Mario ROM controller that the Super NES has control of the ROM address bus.

After a jump instruction is decoded, the address multiplexer 414 is fed the contents of the program counter plus the four least significant bits generated by the counter within the cache loader 400. This permits the cache segment to be loaded with the remainder of the 16 bytes which were being loaded prior to the jump being decoded.

The multiplexer 422 provides the data path within the ROM controller 104 from the ROM data pins ROMD to the Mario chip's destination bus Z. The DATAFETCH signal which has been generated by latch 404 and the ROMRDY signal generated by ROM timing counter 406 are coupled to gate 418 to enable the loading of ROM buffer 420. ROM data from the ROM data bus ROMD [7 . . . 0] is loaded into ROM buffer 420.

Figure 15A:
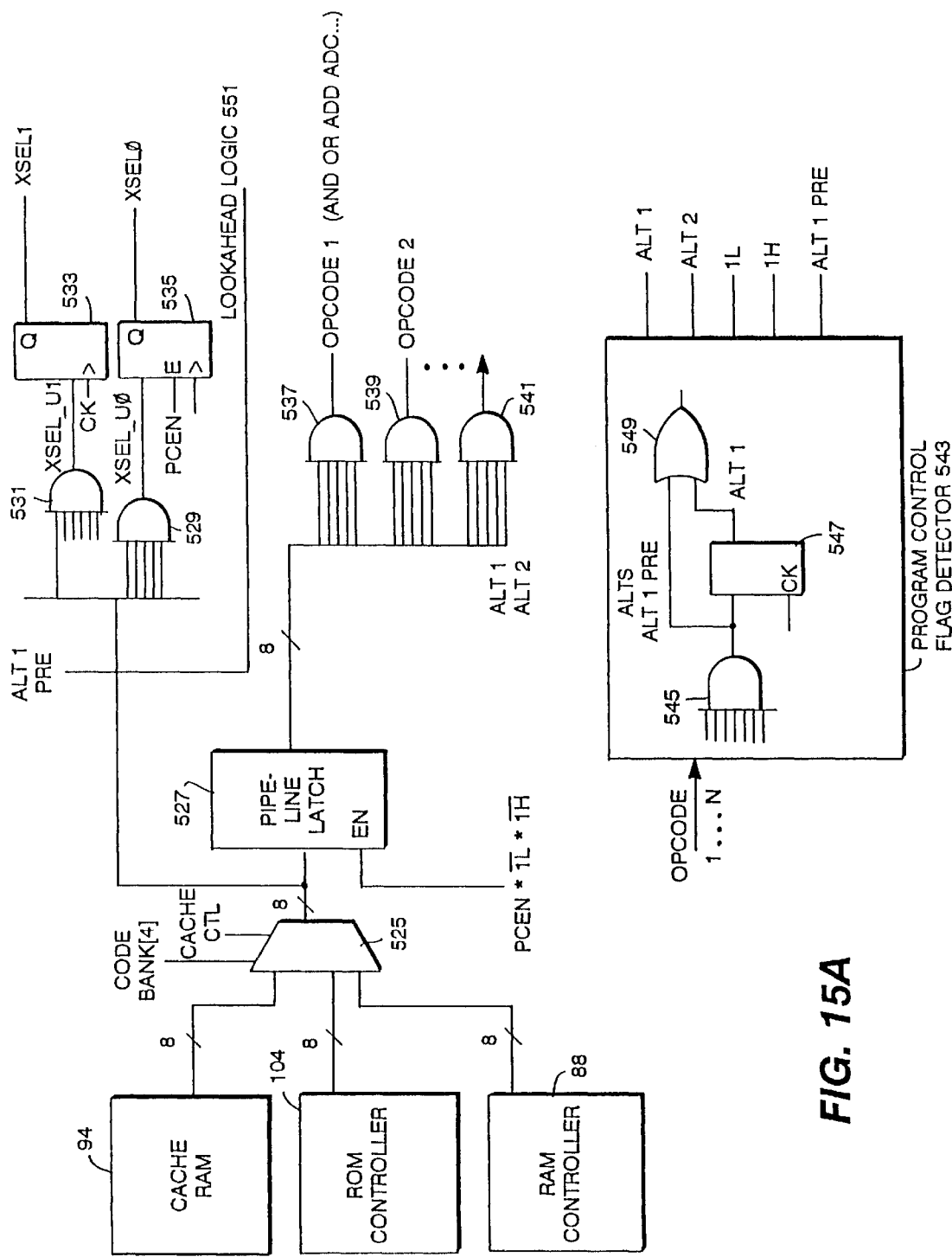
FIG. 15A is a block diagram showing the instruction decoding related circuitry of the graphics coprocessor of the present invention.

The multiplexer 422 selects an input in response to the decoding of an instruction code (such as GET B which is the automatic data fetch triggered by the accessing of register R14). If a code fetch operation is decoded, the ROM controller 104 will couple instructions to the instruction bus in the Mario chip as indicated in FIG. 15A. If a GET B instruction is decoded then the buffered byte stored in register 420 is placed on the Z bus. Certain GET B instruction operations involve data on the X bus as is indicated via the corresponding inputs to multiplexer 422 shown in FIG. 13. The data coupled to destination Z bus may then be loaded into one of the Mario general registers 76.

Figure 14:
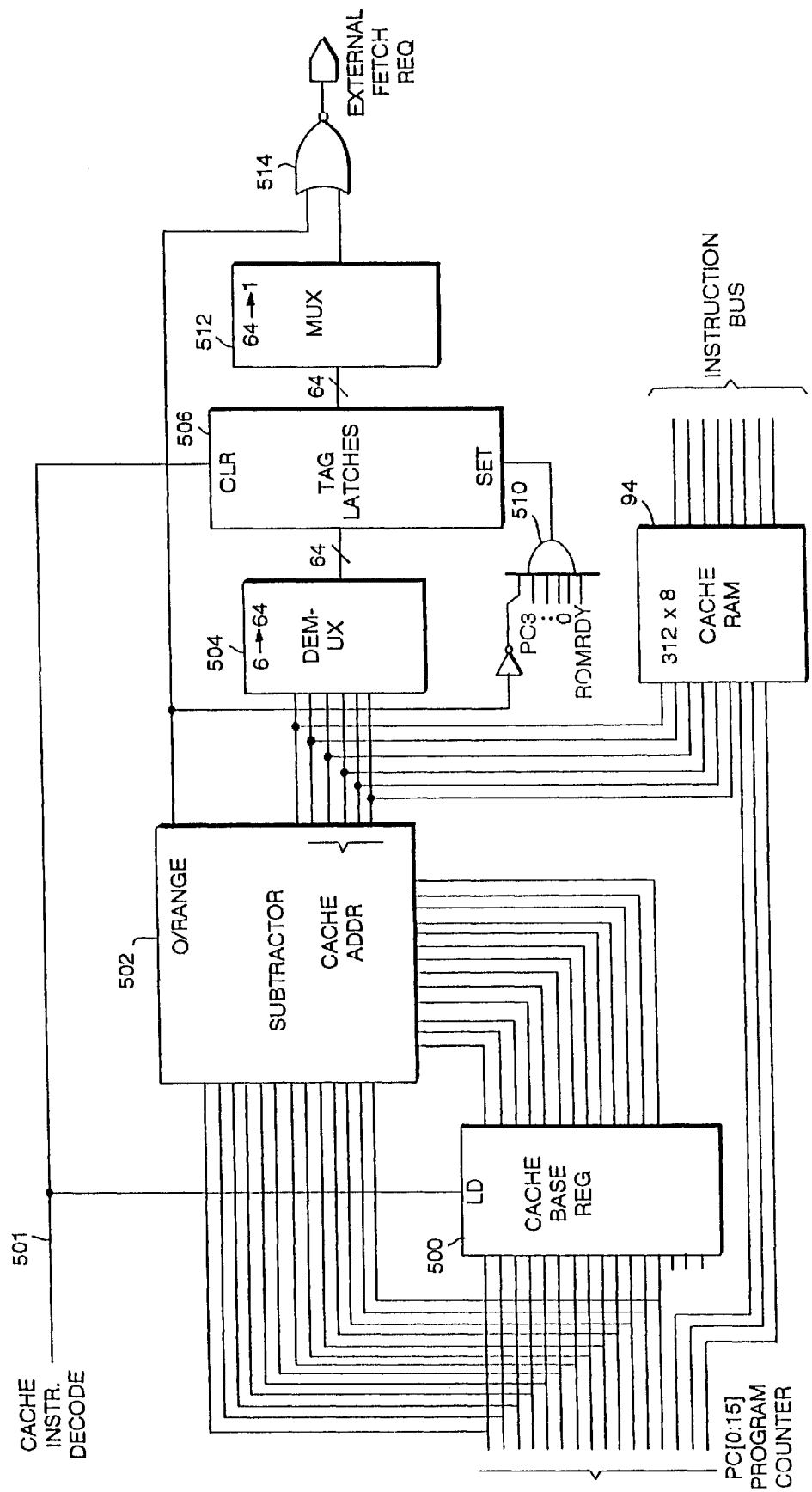
FIG. 14 is a block diagram of the cache controller of the graphics coprocessor in accordance with an exemplary embodiment of the present invention.

The cache controller 68 is shown in further detail in FIG. 14. Cache controller 68 includes a tag latch 506. Tag latch 506 includes, for example, 64 latches which indicate whether instructions are stored in the cache RAM 94 (which is shown for illustration purposes as being embodied in the cache controller).

Each of the 64 flags in tag latches 506 corresponds to 16 bits of information stored in the cache RAM 94. Cache RAM 94 is loaded with instructions at the same time instructions are being executed from ROM or RAM. When a jump instruction is executed, as noted above, the RAM 94 is loaded with the remaining bytes of the 16 byte segment via the cache loader 400 described in conjunction with the ROM controller 104 shown in FIG. 13. Until these remaining bytes are loaded, the entire 16 byte segment cannot be flagged as loaded via tag latch 506.

Focussing on gating circuit 510, when the program counter has counted from 0 to 15, the 14 bit subtractor 502 has output an out-of-range signal (which is inverted) and when the ROM controller has output its ROM data ready signal ROMRDY (indicating that a byte is ready to be output), gating circuit 510 sets the tag latch 506 at the location addressed by demultiplexer 504.

When a cache instruction is decoded, a control signal is generated on bus 501 which indicates that subsequent instructions are to be executed from the cache RAM memory 94. The control signal on bus 501 is coupled to the cache base register 500 load input and serves to load cache base register 500 with the 13 most significant bits of program counter PC. At the same time, as indicated in FIG. 14, the tag latches 506 are cleared.

The output of the cache base register 500 and the most significant bits of the program counter (e.g., bits 3–15) are coupled to subtractor 502, which determines whether the address input from the program counter PC is within the cache RAM 94 range. The subtractor 502 outputs, for example, its six least significant bits, as the most significant bits of the cache RAM address, the three least significant address bits being coupled from the program counter PC.

The out-of-range signal O/RANGE is generated from a carry output signal from the subtractor 502 and is inverted. The inverted out-of-range signal when high serves to initiate the setting of one latch in latch array 506. The latch set will depend upon the cache address output from subtractor 502 via demultiplexer 504 and corresponds to a 16-byte segment in cache RAM 94 to indicate that an instruction is stored in cache corresponding to the output cache RAM address. The tag latches 506 outputs are coupled to a multiplexer 512 which couples one of the 64 tag latch signals to NOR gate 514 based upon the multiplexer select input which selects one latch signal to be output corresponding to one of 64 select lines output from DEMUX 504. The other input to NOR gate 514 is the out-of-range signal which indicates that an external fetch is required since the desired instruction cannot be found in the cache RAM 94.

FIG. 15A shows a block diagram of the ALU controller/instruction decoder 60 shown in FIG. 4A. As indicated in FIG. 15, the ALU controller/instruction decoder 60 receives instructions from the cache RAM 94, ROM controller 104, and RAM controller 88. These Mario chip components are not part of the ALU/instruction decoder 60 but are depicted in FIG. 15 for illustration purposes only.

Multiplexer 525 selects an instruction output from either cache RAM 94, ROM controller 104, or RAM controller 88 and inputs the selected instruction to pipeline latch 527. Selection by multiplexer 525 between RAM or ROM based instructions depends upon the state of a predetermined bit in the code bank register, e.g., bit 4. Thus, depending upon the address information loaded into the code bank register, an instruction from ROM or RAM will be decoded. Alternatively, multiplexer 525 selects an instruction from cache RAM 94 depending on the state of a control signal CACHE CTL from the cache controller 68 which indicates that an instruction to be executed is within the range of cache RAM 94 and that an appropriate tag bit has been set as described in conjunction with the cache controller 68.

The pipeline latch 527 receives an 8-bit instruction from multiplexer 525 when enabled by a program counter enable signal PCEN.IL.IH which is generated by, for example, the ROM controller 104 (or the RAM controller 88) if an instruction is being fetched by the ROM (or RAM). Since it takes more than one processing cycle to fetch an instruction from RAM or ROM, the instruction decoding operations are triggered by the program counter enable signal PCEN generated by the respective ROM or RAM controllers 104, 88.

On the other hand, if the instruction is executed out of a cache RAM 94, the program counter enable signal PCEN is active at all times and the instruction execution is performed at the full processor clock rate. Since the ROM 10 access time is much slower than cache RAM 94 or cartridge RAM access times, it is necessary for the PCEN signal to be generated at less frequent intervals for ROM accesses than either the corresponding cache RAM, or the dynamic or static RAM decoding enable signal.

The instruction temporarily stored in the pipeline latch 527 is output to conventional instruction decoding circuitry, as schematically represented by gating circuitry 537, 539 and 541, to generate the signals indicative of operation codes 1, 2, . . . N.

The instruction which is loaded into pipeline latch 527 is also coupled to look-ahead logic 551. Look-ahead logic 551 serves to provide a predecoding indication of the operation code which will serve to select appropriate registers in the Mario chip register block 76. Thus, in order to optimize the speed of execution prior to decoding the opcode, the register required to be accessed is quickly determined to enable high speed access of data that is required by the instruction.

The look-ahead logic 551 is responsive to the instruction opcode bits as well as various program decoding control flags. The instruction decoding circuit 60 includes program control flag detector logic 543 which is responsive to previously decoded operation codes to generate ALT 1 and ALT 2 signals to indicate that the corresponding prefix instructions, as described above, have been decoded. A related ALT 1PRE signal described below is also generated by flag detector logic 543. Additionally, IL and IE signals are generated to indicate that instructions requiring immediate data have been decoded (where L and E refers to low byte and high byte, respectively). The IH and IL flags operate to preclude the immediate data related instructions from being decoded as operation codes. Accordingly, not IL ($\overline{IL}$) and not IH ($\overline{IH}$) signals are also required to enable pipeline latch 527. ALT 1 and ALT 2 signals, as previously described, serve to modify a subsequently generated opcode and are input to decoding logic 537, 539, 541, etc., as, for example, shown at gating circuit 541 to modify the output opcode in accordance with the previous discussion of these signals.

The look-ahead logic 551 generates register select signals based on the predecoded opcodes and signals which are generated when prior operation codes (e.g., prefix codes ALT 1 or ALT 2) are decoded. For example, as shown within program control flag detect logic 543, if an ALT 1 signal is decoded by decoding logic 545, an ALT 1 PRE signal is generated, which signal is output by program control flag detector logic 543 and which signal, in turn, is coupled to the look-ahead logic 531 via OR gate 549. The ALT 1 PRE signal also sets ALT 1 latch 547. OR gate 549 also outputs the ALT 1 signal from latch 547 and couples the ALT 1 signal to decoding logic 537, 539, 541, etc.

The look-ahead logic schematically represented in FIG. 15 illustrates how the four register select control bits XSEL0, XSEL1, XSEL2, and XSEL3 are generated. These four control bits are then coupled to multiplexers 620 and 622 described in conjunction with the register control logic 76 in FIG. 17 which selects the contents of one of the 16 registers to be output to the X bus for use by an instruction being executed.

Thus, an instruction prior to being loaded into the pipeline latch 527 is coupled to look ahead decoding logic element 529 which generates a register selection bit XSEL-U0 which, in turn, is latched in latch 535 and then output as signal XSELO. The latch 535 is enabled by the program counter signal PCEN. Similarly, logic circuit 531 generates XSEL_U1 which is latched in latch 533 which is output as signal XSEL1. The ALT 1 PRE signal is coupled to the various decoding logic circuits 529, 531, etc., in the look-ahead logic 551 and is utilized to define the appropriate register selected by the register control logic 76. For example, as shown in look-ahead circuit 551, the ALT 1 PRE signal is one of the signals coupled to logic circuit 531 which generates XSEL-U1, which is latched in latch 533 which, in turn, outputs signal XSEL1.

Figure 15B:
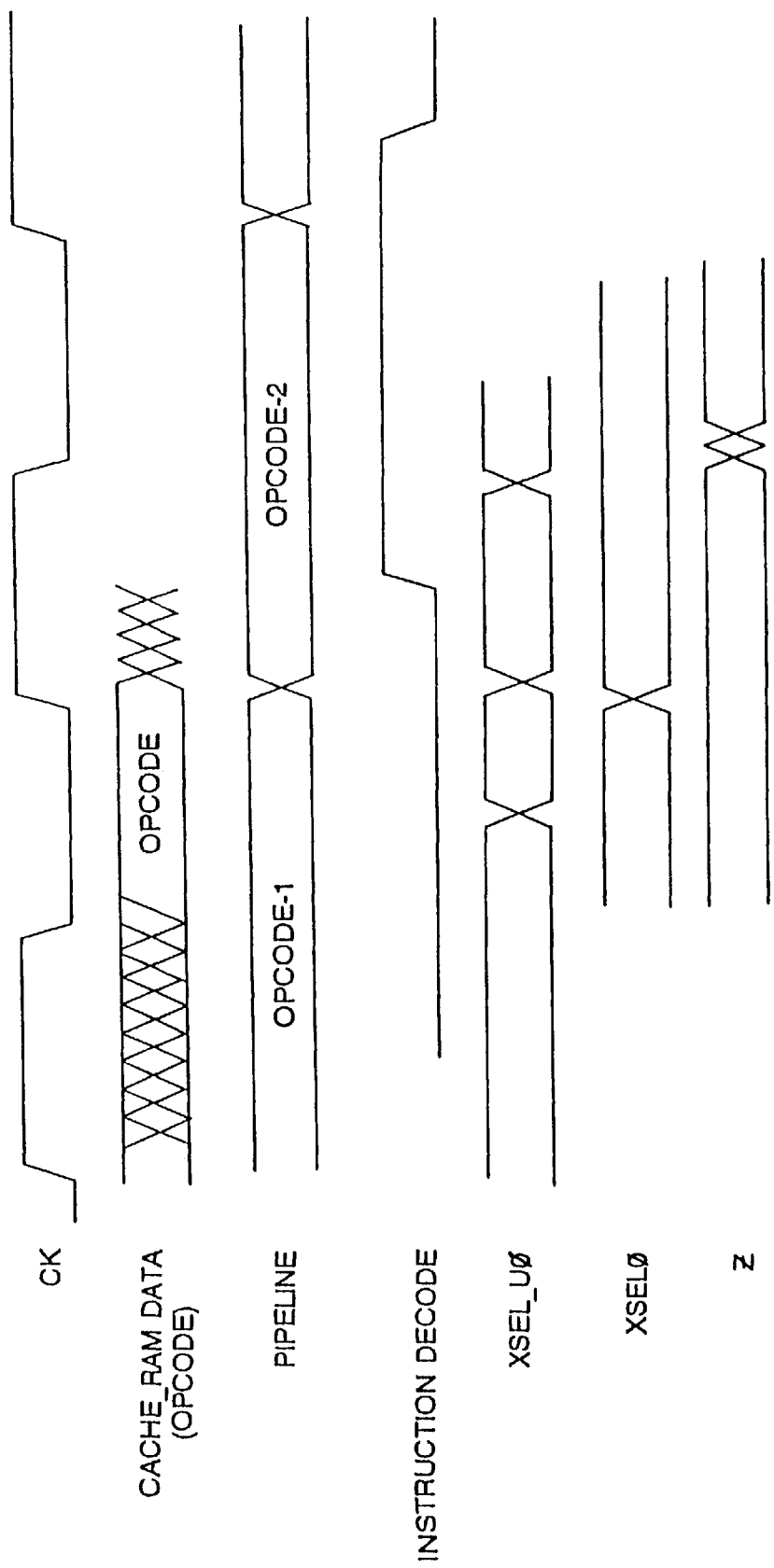
FIG. 15B shows exemplary timing signals demonstrating the operation of the look-ahead logic in FIG. 15A.

FIG. 15B shows exemplary timing signals for demonstrating the operation of look-ahead logic 551. FIG. 15B shows a clock signal CK, and an exemplary instruction opcode relating to cache RAM data accessing. Timing signals are also shown indicating when pipeline latch 527 is loaded, when the instruction decoding operation is to be performed, when register select signals are generated, and when the information from the registers are loaded on the destination Z bus.

As shown in FIG. 15B, the cache RAM data opcode (opcode 1) will become valid at some point in time after the rising edge of the clock pulse CK. The opcode is stored in pipeline latch 527 until, for example, the rising edge of the second clock pulse, at which time opcode 2 is loaded into the latch 527. The instruction decoder 60 begins decoding the instruction corresponding to opcode 1, just after receiving the output from latch 227 at a point in time schematically represented in FIG. 18. The result of the instruction decoding will, as described above, appropriately couple control signals to Mario chip components such as the ALU 50, cache controller 68, and plot hardware 52, etc.

The look-ahead circuit 551 shown in FIG. 15 begins the register select decoding process by generating a signal XSEL-U, at a point in time prior to the decoding of opcode 2. The XSEL-U0 signal represents the output of decoding logic 529 prior to being latched in latch 535. The XSEL-0 signal is output, for example, by latch 535 at a point in time so that the data required for the instruction will be accessible as early as possible in the instruction execution cycle for coupling to the appropriate bus as quickly as possible.

A portion of the register control logic 78 is shown in FIG. 16 for generating Y and Z bus related register select signals. Multiplexer 604 selects which of the 16 registers will be written from the Z bus. Multiplexer 606 selects which register feeds the Y bus.

Multiplexers 604 and 606 receive inputs from 4-bit registers 600 and 602, respectively. The registers 600 and 602 are utilized in implementing the "FROM" and "TO" prefix instructions described above. The registers 600 and 602 are respectively enabled by the decoding of "TO" and "FROM" prefixes which operate to couple the least significant bits of the instruction bus to registers 600 and 602. Register 600 and 602 are cleared in response to an instruction which serves to reset the control flags described above.

Multiplexers 604 and 606 additionally receive inputs from various registers in registers block 76. Additionally, the multiplexers 604, 606 receive an input from the least significant bits on the instruction bus to implement instructions whose least significant four bits define the instruction destination or source register. Additionally, predetermined least significant bits from the Super NES address bus are coupled to multiplexers 604 and 606 in order to provide the of Super NES with access to the register set. The multiplexers 604 and 606 select the register feeding the Z and Y bus, respectively.

Figure 17:
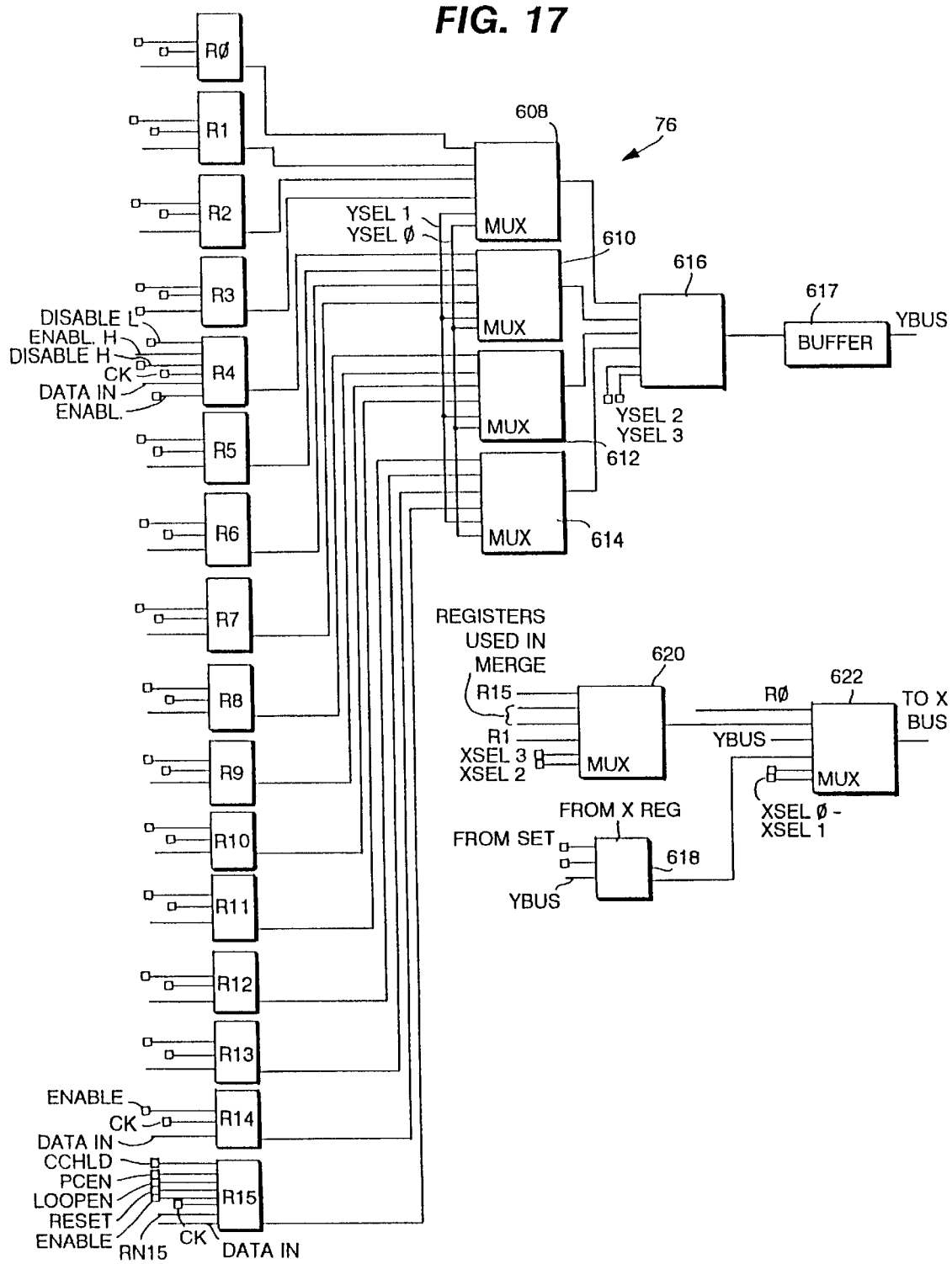

FIG. 17 shows register block 76 and additional register selection control logic embodied within the FIG. 4B register control logic 78. A FROMX register 618 is set by a FROMSET signal which is generated upon the decoding of a FROM instruction. Upon receipt of the FROMSET signal, the contents of the Y bus is loaded into register 618. The data loaded in register 618, then becomes the data which is used in subsequent instruction execution. The contents of register 618 is coupled as one of the inputs to multiplexer 622. Multiplexer 622 also receives the contents of register R0 (which is used as a default register) as one of its inputs.

Another input to multiplexer 622 is the output of multiplexer 620. Multiplexer 620 receives as input the contents of the program counter (i.e., register R15), inputs from registers used in executing the MERGE instruction, and register R1 (which is used, for example, in executing the plot instruction). The multiplexer 620 selects one of these inputs based on the state of the XSEL2 and XSEL3 bits generated by the look-ahead logic 551 shown in FIG. 15A.

An additional input to multiplexer 622 is coupled to the contents of the Y bus to place the same data on the X bus as is on the Y bus. As noted previously, another input to multiplexer 622 is the output of FROM X register 618 described above. The output of multiplexer 622 is selected based on the state of the XSEL0 and XSEL1 bits generated in FIG. 15A and is coupled to the X bus.

The special purpose functions associated with many of the register R0–R15 have been described in detail above and will not be repeated here. The output of registers R0–R3 are coupled to multiplexer 608, the outputs of registers R4–R7 are coupled to multiplexer 610, the outputs of registers R8–R11 are coupled to multiplexer 612 and the outputs of registers R12–R15 are coupled to multiplexer 614. One of the four respective inputs to multiplexers 608, 610, 612 and 614 are selected by the Y SEL 1 and YSEL0 bits which are output from multiplexer 606 shown in FIG. 16. The outputs from multiplexer 608, 610, 612, and 614 are, in turn, input to multiplexer 616. One of the four inputs to multiplexer 616 is selected based on the state of the Y SEL 2 and Y SEL 3 bits output from multiplexer 606 in FIG. 16. Multiplexer 616 has its output coupled to buffer register 617, whose output is, in turn, coupled to the Y bus.

Turning to the inputs to registers R0 to R15, each register has an enable input selected by ZSEL bits 0 to 3 which are generated as described above in conjunction with FIG. 16. Each register also has a clock input CK and a data input DATA-IN via which data is received from the Z bus after being appropriately buffered.

Register R4, which is used in conjunction with various multiply operation, also includes disable low and disable high bit inputs and enable low and enable high bit inputs. Register R15, the program counter PC, receives a signal CCHLD from the cache loader 400 in the ROM controller of FIG. 13 which inhibits a jump operation until the current 16 byte cache segment is loaded into cache RAM. The program counter additionally receives a program loop pending signal LOOPEN from the instruction decoder which indicates that a branch operation should take place and enables the loading of the PC with the contents of register R13. Register R15 additionally receives a power-on reset signal RESET and an input RN which loads the program counter with the contents of register R13 when a loop instruction is being executed.

Figure 18:
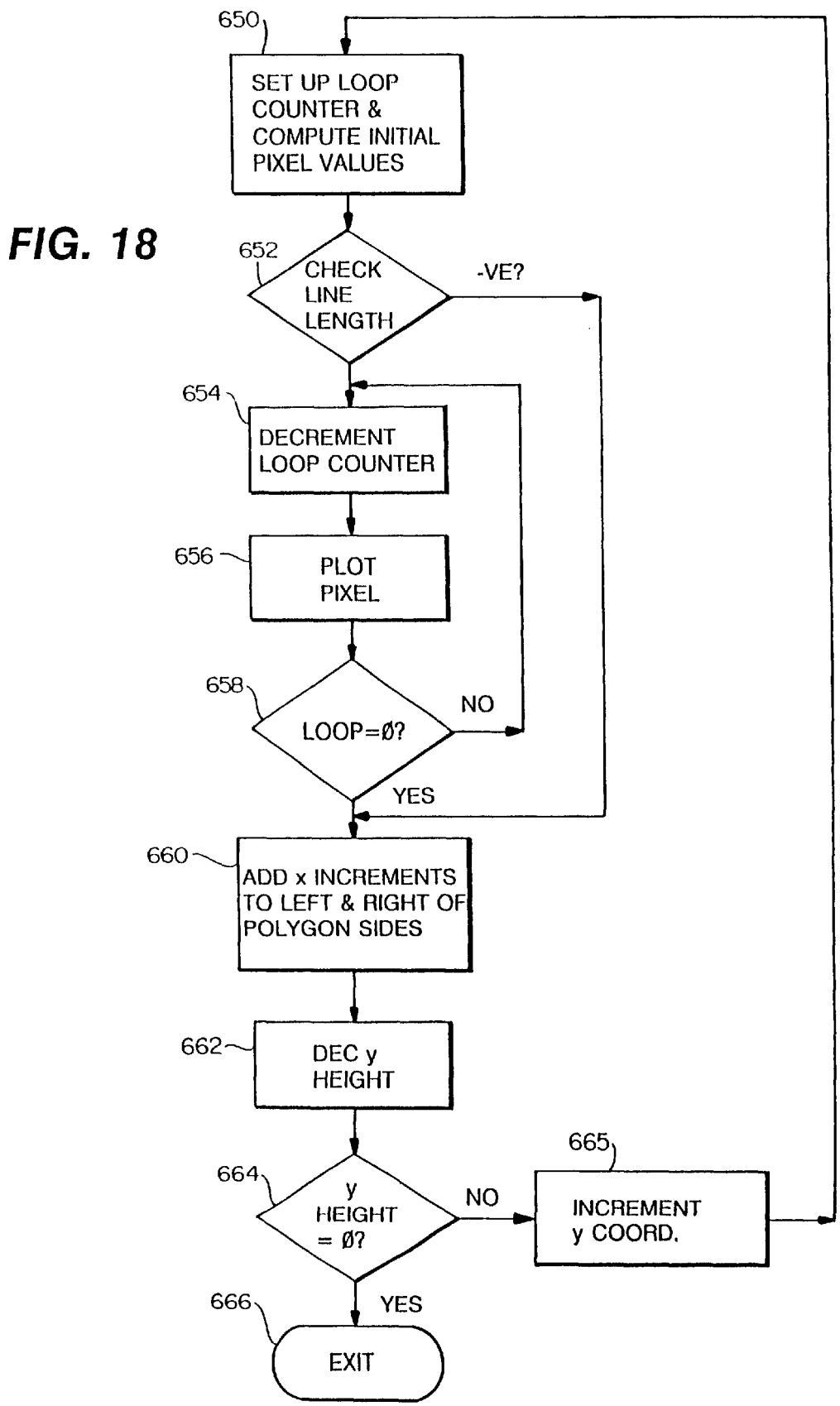
FIG. 18 is an exemplary flowchart delineating the sequence of operations of the graphics coprocessor in carrying out a polygon generating tasks.

As indicated above, the graphics coprocessor of the present invention in combination with the host video game system may be advantageously utilized to create a variety of special effects involving, for example, the rotation, enlargement, and/or reduction of polygon-based objects. FIG. 18 is a flowchart of an exemplary Mario chip program for drawing a trapezoid to illustrate how the Mario chip may be programmed to generate a portion of a polygon-based object to be displayed. A Mario program for generating such a polygon is set forth below together with a detailed explanation as to how the Mario hardware executes the program.

Turning first to the high level flowchart shown in FIG. 18, initially certain of the registers in register block R1 to R15 are associated with variables utilized in the generation of the trapezoid (e.g., register R1 stores the pixel X position, register R2 stores the pixel Y position line, register R7 stores the trapezoid height, etc.). Thereafter, as indicated in block 650, a loop counter is set up and initial pixel values are computed.

As indicated in block 652, a check is then made to determine the length of one of the trapezoid horizontal lines. If the result of subtracting the starting point of the line from the end point of the lines is a negative value (–VE), then the routine branches to block 660. If the result of subtracting the starting point of the line from the ending point of the line is a positive value which indicates that the length of the line has not been exceeded, then a loop counter is decremented (654) and a plot pixel instruction is executed to result in the plotting of the appropriate pixel (656).

As indicated in block 658, a check is then made to determine whether the contents of the loop counter is zero. If the loop counter is not zero, then a jump is effected to branch back to block 654 to decrement the loop counter (654) and plot another pixel (656).

If the loop counter is equal to zero, then the left polygon side X coordinate and the right polygon side X coordinate are updated (660). Thereafter, the Y HEIGHT of the trapezoid (662) is decremented (662) and if the result is not zero, then the routine will be reexecuted by branching back to block 650 (664) and the Y coordinate is incremented so as to move to the next scan line (665). If Y HEIGHT is equal to zero, then the routine will have been fully executed and the trapezoid will be complete (666).

In order to illustrate the use of the Mario chip instruction set to generate graphics, an exemplary program for drawing a trapezoid to implementing the FIG. 18 flowchart is set forth below.

```
; Draw trapezoid loop
    rx      =   1           ; plot x pos
    ry      =   2           ; plot y pos
    rx1     =   3           ; top left x pos
    rx1inc  =   4           ; top left x pos increment
    rx2     =   5           ; top right x pos
    rx2inc  =   6           ; top right x pos increment
    rdy     =   7           ; trapezoid y height
    rlen    =   12          ; loop count, hline length
    rloop   =   13          ; loop label
    hlines
            miwt    rloop,hlines 2   ; set start of
                                       hline loop
    hlines 1
            mfrom   rx1              ; x = (rx1)>> 8
            mto     rx
            mhib
            mfrom   rx2
            mhib
            mto     rlen
            msub    rx               ; length, rlen =
                                       (rx2>>8) –
                                       (rx1>>8)
            mbmi    hlines 3         ; if rlen<0 then
                                       skip hline
            mnop
            minc    rlen             ; always draw one
                                       pixel
    hlines2
            mloop
            mplot                    ; draw hline
    hlines3
            mwith   rx1              ; rx1+=rx1inc
            madd    rx1inc
            mwith   rx2              ; rx2+=rx2inc
            madd    rx2inc
            mdec    rdy              ; rdy-=1
            mbne    hlines1          ; repeat rdy time
            minc    ry               ; and next y down
```

To demonstrate how the Mario chip hardware operates to execute a program, the following explanation is directed to the trapezoid generating program set forth above. Prior to executing the trapezoid generating program, the host computer system, e.g., the Super NES, writes directly to the code bank register and into the screen base register, as explained above in conjunction with the description of the FIG. 5 flowchart. Additionally, the Super NES writes the low byte of the XEQ address to a local register in the ROM controller 104 which is decoded from the Super NES address bus HA. The Super NES then writes a high byte to the ROM controller 104 which is combined with the contents of the local register and coupled to the Z bus. Thereafter, the register RIS which operates as the Mario chip program counter is enabled.

Upon detecting the trailing edge of the above Super NES write operation to the ROM controller 104, the Mario "GO" flag is set. If the program counter minus the cache base register is greater than the cache size or if the cache flag times the program counter minus the cache base register divided by 16 is equal to zero, then the program counter contents are passed to ROM 10 and the ROM timing counter (FIG. 13 block 406) is started.

Initially, prior to executing the draw trapezoid subroutine, the variables used with the trapezoid loop program are associated with Super Mario registers as indicated in the initial portion of the trapezoid program listing, e.g., "rx" which is the "plot X position" is be associated with register R1 and variable the "rloop" is associated with register R13.

After these register assignments are made, the trapezoid program begins execution as follows. When the ROM timing counter 406 in the ROM controller 104 reaches a count of 5 (approximately 200 nanoseconds), the first instruction to be executed "IWT rloop, hlines 2" is latched into the pipeline register 62 shown in FIG. 4A from the ROM data bus. The data is simultaneously written into the cache RAM 94. In executing the instruction "IWT rloop, hines", the program counter is incremented. The "IL" and "IM" flags are set to signify that the following two bytes in the instruction stream are immediate data. When the ROM timing counter 406 reaches 5, the immediate data (low byte) is written to the cache RAM 94 and held in a temporary register in ROM controller 104. The ROM fetch mechanism is repeated and the high byte of the immediate data is combined with the low byte and routed to the Z bus. Register R13 is enabled and the Z bus contents is stored therein in order to set the loop counter. From this point on in the routine, each instruction is fetched from memory until the loop instruction is encountered.

In executing the instruction FROM RX1", the lowest four bits of the instruction code are loaded into the four bit "FROM Y" register 602 in the register controller (See FIG. 16). Additionally, the data from RX1 (register R3) is enabled onto the Y bus and is stored in the 16 bit "FROM X" register 618. In executing the "TO RX" instruction, the lowest four bits of the instruction code are loaded into the four bit "enable Z" register 600 in the register controller (See FIG. 16).

The "HIB" instruction is executed by placing the sixteen bit contents of the "FROM X" register onto the X bus. The ALU places the top byte of the X bus onto the low byte of the Z bus and sets the top byte of the Z bus to zero. This removes the fractional part of the X position and leaves the starting point for the first horizontal line in register RX (register R1).

In executing the instruction "FROM RX2", similar operations are performed as indicated above in executing "FROM RXI" instruction. The "HIB" instruction causes operations (similar to those described above) with respect to the top right X coordinate of the trapezoid leaving the end point of the first horizontal line in register R0 (the default register operating as the accumulator).

The "RLEN" instruction and the "SUB RX" instruction are executed by subtracting the start of the line from the end of line RLEN (R12)=R0-Rx. The sign flag will be set if there is a negative result to indicate an error condition.

The "BMI HLINES3" instruction is a two byte instruction, where the first byte sets a flag, if the sign flag is set. The second byte is the branch offset (where R15 equals R15 plus the instruction), if the conditional flag is set. If not, R15 remains unaltered and normal program execution continues.

The "INC RLEN" instruction is executed such that the line length register has one added to it to ensure that at least one pixel is plotted. The "LOOP" instruction operates to cause the computation of R12=R12−1. If R12 is not zero, then R15 (the program counter) is loaded with the contents of R13 to thereby effect a jump.

If the program at this point is in the range of the cache RAM 94, then the cache load circuit 400 will detect the jump and will continue to load the cache RAM 94 suspending execution as it does so. When it is completed, the program counter is loaded with its new value and the following instruction is fetched from cache RAM 94.

In order to execute the "PLOT" instruction, the loop/plot instruction pair form a horizontal line draw algorithm. The "PLOT" instruction will set the screen pixel addressed by R1, R2 (as X and Y coordinates) to the color set in the "COLOR register" 54 shown in FIG. 4A. The address of the character containing the pixel is computed by plot hardware 52. The new pixel data is held in a character line buffer (the color matrix), until the Mario chip moves onto plotting at a different character position. When all the color information is copied into the second level of the double buffer mechanism within the color matrix, then the information is written to the external RAM.

The "WITH RX1" and "ADD RXI INC" instructions are executed to update the left side X coordinate of the trapezoid. Similarly, the "WITH RX2" and "ADD RX2 INC" operates to update the right side of the trapezoid. The "DEC RDY", BNE, Hlines1" and "INC RY" instructions operate to move onto the next Y position (the next scan line) until the trapezoid is completed.

The following program listing exemplifies how the Mario chip may be programmed to rotate an array of 8-bit X, Y, and Z points. This routine illustrates programming for the graphics coprocessor in accordance with an exemplary embodiment of the present invention to perform rotation operations. The listing for this routine is set forth below:

Listing Rotate:

```
; Rotate an array of 8 bit x,y,z points
;
; by a rotation matrix in the registers
; rmat1211, rmat2113, rmat2322, rmat3231, rmat0033
;
; matrix elements are 8 bit signed fractions
; ie 127 =   127/128 = approx. 1
;   -128 =  -128/128 = -1
; these are stored compactly as 2 8 bit elements
   per register
rx          =     1        ; x
ry          =     2        ; y
rz          =     3        ; z
rt          =     4        ; temp
rmat1211    =     5        ; matrix elements 11 and 12
rmat2113    =     6        ; matrix elements 13 and 21
rmat2322    =     7        ; matrix elements 22 and 23
rmat3231    =     8        ; matrix elements 31 and 32
rmat0033    =     9        ; matrix elements 33
```

-continued

```
routptr     =      10         ; ptr to rotated points
                                 buffer
msh_rotpoints8
            miwt   r14,pointsaddr   ; ROM ptr to
                                      points to be
                                      rotated
            miwt   r12,numpoints    ; Number of
                                      points to
                                      rotate
            miwt   routptr,m_rotpnts ;RAM ptr to
                                      rotate points
                                      buffer
            mcache            ; set cache addr
            mmove  r13,pc     ;init loop addr
mmatrotploop
            mto    rx         ; get x
            mgetb
            minc   r14
            mfrom  rmat1211   ; 11
            mto    rt
            mmult  rx         ;m11*x
            mto    ry         ; get y
            mgetb
            minc   r14
            mfrom  rmat2113   ; 21
            mhib
            mmult  ry         m21*y
            mto    rt
            madd   rt
            mto    rz         ; get z
            mget b
            minc   r14
            mfrom  mat 3231   ; 31
            mmult  rz         ;m31*z
            madd   rt
            madd   r0
            mhib
            mstb   (routptr)  ; store rotated x
            minc   routptr
            mfrom  rmat1211   ; 12
            mhib
            mto    rt
            mmult  rx         ; m12*x
            mfrom  rmat2322   ;22
            mmult  ry         ;m22*y
            mto    rt
            madd   rt
            mfrom  rmat3231   ;32
            mhib
            mmult  rz         ; m32*z
            madd   rt
            madd   r0
            mhib
            mstb   (routptr)  ; store rotated y
            minc   routptr
            mfrom  rmat2113   ; 13
            mto    rt
            mmult  rx         ; m13*x
            mfrom  rmat2322   ; 23
            mhib
            mmult  ry         ; m23*y
            mto    rt
            madd   rt
            mfrom  rmat0033   ; 33
            mmult  rz         ; m33*z
            madd   rt
            madd   r0
            mhib
            mstb   (routptr)  ; store rotated z
            mloop
            minc   routptr
```

Figure 19:
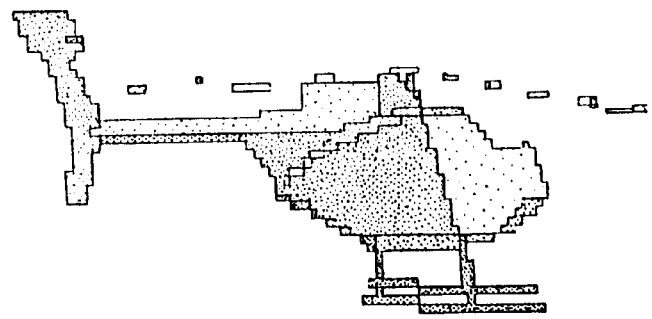
FIGS. 19, 20 and 21 are exemplary displays which may be generated of polygon-based objects to illustrate scaling and rotation features in accordance with an exemplary embodiment of the present invention
Figure 20:
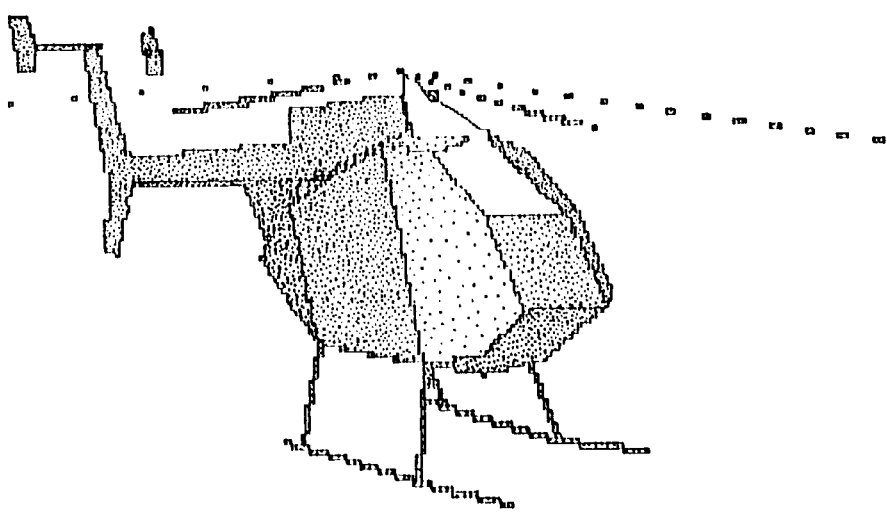
Figure 21:
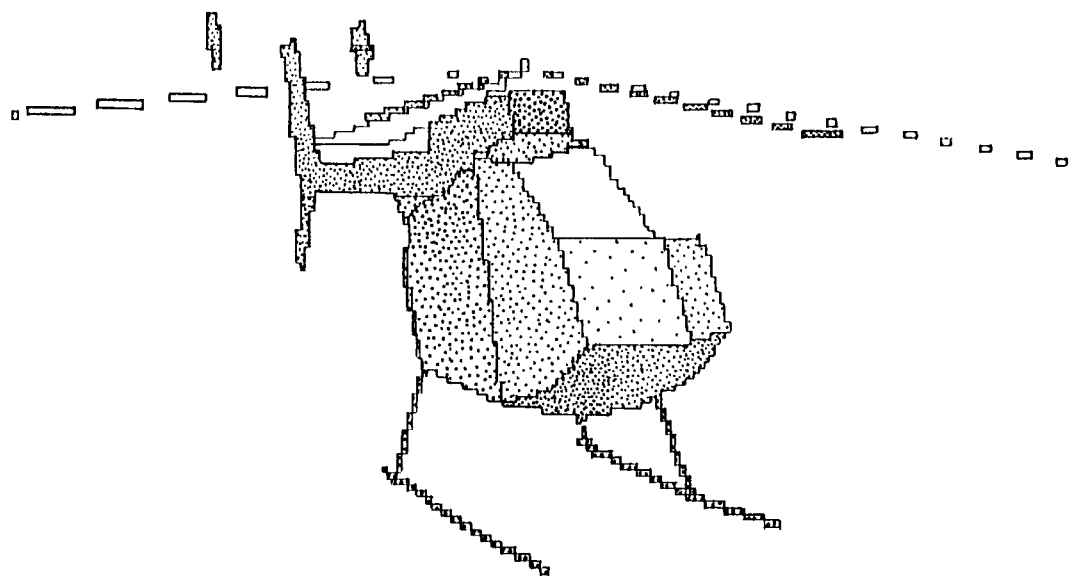

FIGS. 19, 20, and 21 exemplify some of the special effects which may be generated while using the programmable graphics coprocessor of the present invention in combination with the host computer system e.g., the Super NES. As shown in FIG. 19, the side view of an object ie., a helicopter, is portrayed. This figure is not intended to accurately reflect the high quality display that can be generated by using the Mario chip. FIGS. 20 and 21 show enlarged and rotated views of the helicopter set forth in FIG. 19. The graphics coprocessor of the present invention may be used to generate 3D type (and other) special effects including those involving rotated and scaled polygon-based objects at high speed, while only minimally burdening the host video game processing system.

While the invention has been described and illustrated in detail, it should be understood that the detailed disclosure is for purposes of illustration and example only. While the foregoing embodiment is considered to be an preferred embodiment, it should be understood that numerous variations and modifications may be made therein by those skilled in art and is intended that the following claims cover such variations and modifications within the spirit and scope of the present invention.

What is claimed is:

1. An information processing system including a display and a first processing unit for executing at least a first portion of a videographics program, said videographics program being received from an external source, and including a second portion having instructions relating to 3-D graphics operations, and a programmable graphics processor separate from said first processing unit comprising:

means for receiving instructions from said second portion of said videographics program; and means for executing said instructions from said second portion of said videographics program, whereby said graphics processor coacts with said first processing unit to control 3-D display of an object.

2. An information processing system according to claim 1, wherein said means for executing includes circuitry for converting pixel-based format data into character-based format data.

3. An information processing system according to claim 1, wherein said 3-D graphics operations comprise instructions relating to rotation of an object.

4. An information processing system according to claim 1, wherein said external source comprises an external memory.

5. An information processing system including a display and a first processing unit for executing at least a first portion of a videographics program, said videographics program being received from an external source, and including a second portion having instructions relating to 3-D graphics operations, and a programmable graphics processor separate from said first processing unit comprising:

a connection for receiving instructions from said second portion of said videographics program; and a processor for executing said instructions from said second portion of said videographics program, whereby said graphics processor coacts with said first processing unit to control 3-D display of an object.

6. An information processing system according to claim 5, wherein said 3-D graphics operations comprise instructions relating to rotation of an object.

7. An information processing system according to claim 6, wherein said processor includes circuitry for converting pixel-based format data into character-based format data.

8. An information processing system according to claim 5, wherein said external source comprises an external memory.

9. A method for operating an information processing system including a display and a first processing unit for executing at least a first portion of a videographics program, said videographics program being received from an external source, and including a second portion having instructions relating to 3-D graphics operations, and a programmable graphics processor separate from said first processing unit, the method comprising:

receiving instructions from said second portion of said videographics program; and executing said instructions from said second portion of said videographics program, whereby said graphics processor coacts with said first processing unit to control 3-D display of an object.

10. A method according to claim 9, said 3-D graphics operations comprise instructions relating to rotation of an object.

11. A method according to claim 8, further comprising converting pixel-based format data into character-based format data.

* * * * *